(12) United States Patent
Connelly et al.

(10) Patent No.: US 10,728,696 B2
(45) Date of Patent: Jul. 28, 2020

(54) SYSTEMS AND METHODS FOR LOW ENERGY BEACON MANAGEMENT

(71) Applicant: Comcast Cable Communications, LLC, Philadelphia Philadelphia, PA (US)

(72) Inventors: Michael Connelly, Philadelphia, PA (US); Franklyn Athias, Cherry Hill, NJ (US); Erami Botchway, New Castle, DE (US); John Hart, Philadelphia, PA (US); Michael Chen, Wallingford, PA (US); Corey Farrell, Lansdowne, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/261,252

(22) Filed: Jan. 29, 2019

(65) Prior Publication Data
US 2019/0394608 A1      Dec. 26, 2019

Related U.S. Application Data

(63) Continuation of application No. 15/047,238, filed on Feb. 18, 2016, now Pat. No. 10,251,022.

(51) Int. Cl.
*H04W 4/021*     (2018.01)
(52) U.S. Cl.
CPC .................... *H04W 4/021* (2013.01)
(58) Field of Classification Search
CPC ..................................... H04W 4/021
USPC ........ 455/9, 404.2, 456.1, 456.2, 456.3, 67.1
See application file for complete search history.

(56) References Cited

U.S. PATENT DOCUMENTS

| | | | |
|---|---|---|---|
| 8,181,211 B2 | 5/2012 | Olson et al. | |
| 8,489,738 B2 | 7/2013 | Sobotka et al. | |
| 8,611,519 B2 | 12/2013 | Shah et al. | |
| 8,634,533 B2 | 1/2014 | Strasters | |
| 9,420,336 B1 | 8/2016 | Woodhead et al. | |
| 9,521,648 B1 | 12/2016 | Kolekar et al. | |
| 10,251,022 B2 | 4/2019 | Connelly et al. | |
| 2007/0121678 A1 | 5/2007 | Brooks et al. | |
| 2008/0045232 A1 | 2/2008 | Cone | |
| 2009/0171780 A1 | 7/2009 | Aldrey et al. | |
| 2009/0199107 A1 | 8/2009 | Lewis et al. | |
| 2010/0120437 A1 | 5/2010 | Foster et al. | |
| 2010/0251314 A1 | 9/2010 | Olson et al. | |
| 2012/0278454 A1 | 11/2012 | Stewart et al. | |
| 2012/0303442 A1 | 11/2012 | Patwa et al. | |
| 2013/0049954 A1 | 2/2013 | Scannell | |

(Continued)

*Primary Examiner* — Congvan Tran
(74) *Attorney, Agent, or Firm* — Ballard Spahr LLP

(57) ABSTRACT

Methods and systems are disclosed relating to proximity detection of devices and targeted information services, such as information campaigns. Disclosed methods provide targeted campaigns to a user, such as targeted campaigns to presentation devices based on proximity of user devices near the information devices. Other methods provide targeted campaigns across various applications, while other methods provide for scheduling campaigns to premises device identifiers based on an event schedule, and other methods provide a hierarchal system for monitoring different sets of premises device identifiers when a user device can monitor for a limited number of premises device identifiers at a time.

20 Claims, 28 Drawing Sheets

(56) References Cited

U.S. PATENT DOCUMENTS

| | | |
|---|---|---|
| 2013/0144660 A1 | 6/2013 | Martin |
| 2013/0174223 A1 | 7/2013 | Dykeman et al. |
| 2014/0094575 A1 | 4/2014 | Van Der Schrick et al. |
| 2014/0106730 A1* | 4/2014 | Chatterjee ............ H04W 24/10 455/418 |
| 2014/0269657 A1 | 9/2014 | Kim et al. |
| 2014/0365304 A1* | 12/2014 | Showers ................ G06Q 30/02 705/14.55 |
| 2015/0029020 A1 | 1/2015 | Bailey et al. |
| 2015/0237386 A1 | 8/2015 | Sheehan et al. |
| 2015/0256985 A1* | 9/2015 | Kornafeld ............... H04W 4/12 455/466 |
| 2015/0269600 A1* | 9/2015 | Randle ................. H04W 4/021 705/14.14 |
| 2016/0050621 A1 | 2/2016 | Enomoto et al. |
| 2016/0088546 A1* | 3/2016 | Birch ..................... H04L 67/18 455/456.3 |
| 2016/0249315 A1 | 8/2016 | Venkatraman et al. |
| 2017/0010669 A1 | 1/2017 | Lim et al. |
| 2017/0019777 A1 | 1/2017 | Cole, Jr. et al. |
| 2017/0126800 A1 | 5/2017 | Koorapati et al. |
| 2017/0245105 A1 | 8/2017 | Connelly et al. |

* cited by examiner

1302 — Receive an indication of a detection between a user device and a premises device, wherein the user device is associated with a user and the indication comprises a user device identifier of the user device and a premises device identifier of the premises device 1304 — Associate a media device identifier of a media device to the user device identifier based on the premises device identifier 1306 — Receive a request to identify a user of the media device when the media device detects an interaction 1308 — Determine a confidence level that the user of the user device is the user of the media device 1310 — Send the user device identifier mapped with the media device identifier and the confidence level that the user of the user device identifier is the user of the media device

1402 — Receive an indication of a detection between a user device and a premises device, wherein the user device is associated with a user and the indication of the detection comprises a user device identifier of the user device and a premises device identifier of the premises device 1404 — Receive an indication from a media device when the media device detects an interaction of a user with the media device 1406 — Associate a media device identifier of the media device with the user device identifier based on the premises device identifier 1408 — Determine a confidence level that the user of the user device is the user of the media device performing the interaction 1410 — Determine user demographic information of the user if the confidence level indicates the user of the user device is the user of the media device 1412 — Determine, in response to the interaction, the action to perform at the media device based on the user demographic information 1414 — Cause the action to be performed at the media device

1502
Receive a first indication that a first media device has detected an interaction of a first user with the first media device

1504
Receive a second indication from a second media device indicating the second media device has detected an interaction of a second user with the second media device

1506
Determine user demographic information associated with the first user of the first media device and user demographic information associated with the second user of the second media device based on a proximity of a plurality of user devices to at least one of the first media device and the second media device

1508
Determine a first action in response to the interaction of the first user with the first media device and a second action in response to the interaction of the second user with the second media device

1602 — Receive an indication for each detection between at least one premises device and a plurality of user devices, wherein the indication for each detection comprises a user device identifier and a premises device identifier 1604 — Determine a confidence level for each of the plurality of user devices that each of the plurality of user devices is within a presentation area of a presentation device associated with the at least one premises device 1606 — Determine a user device of the plurality of user devices that is within the presentation area of the presentation device based on the confidence level 1608 — Determine, based on the user device identifier of the user device and the confidence level, a campaign to be presented on the presentation device 1610 — Transmit the campaign to the presentation device

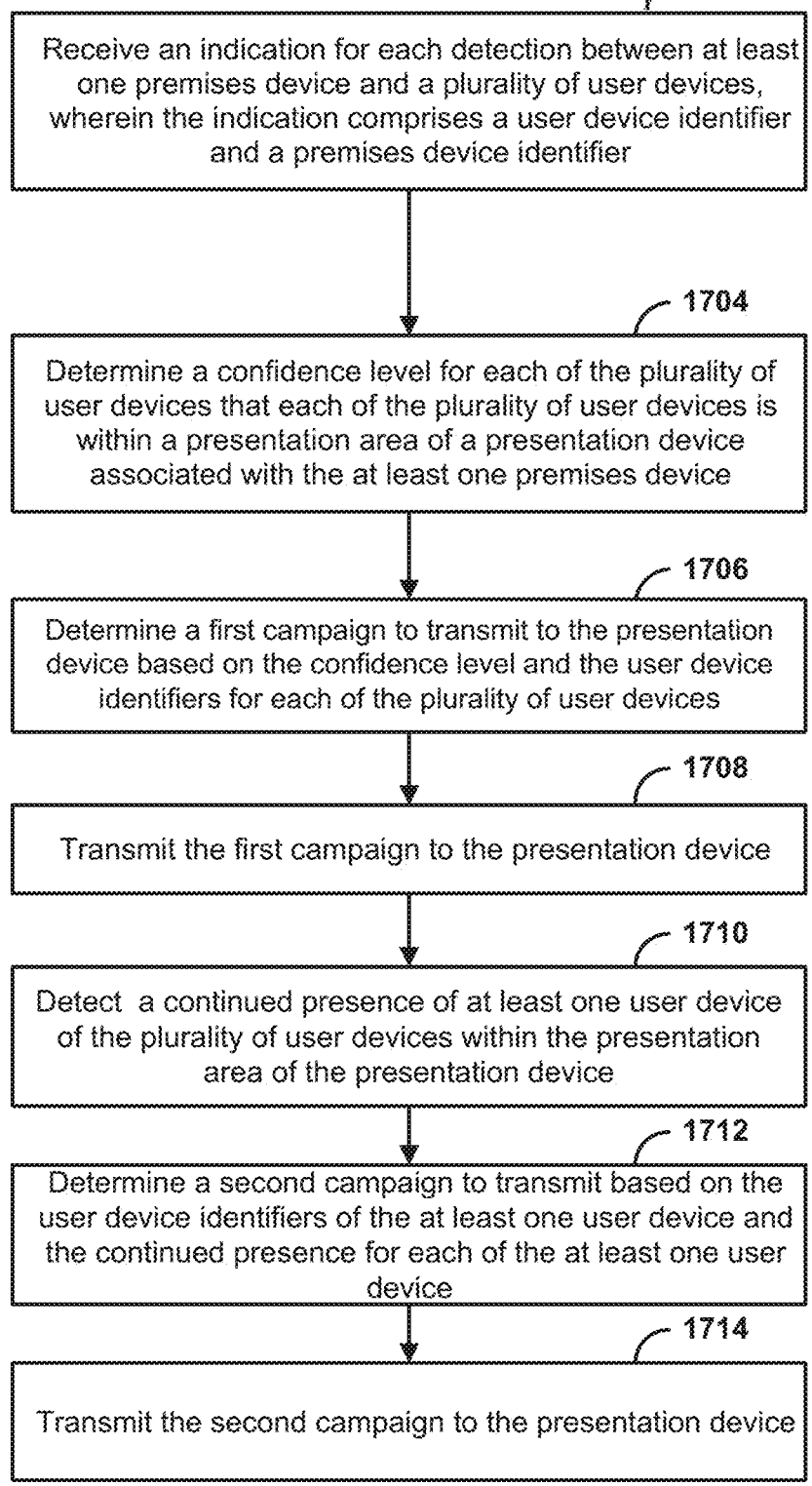

1802
Receive an indication for each detection between at least one premises device and a plurality of user devices, wherein the indication for each detection comprises a user device identifier of a user device of the plurality of user devices and a premises device identifier of a premises device of the at least one premises device

1804
Determine a confidence level for each of the plurality of user devices that each of the plurality of user devices is within a presentation area of a presentation device associated with the at least one premises device

1806
Determine, based on the user device identifiers of the plurality of user devices and the confidence level for each of the plurality of user devices, a campaign to be presented at the presentation device

1808
Transmit the campaign to the presentation device

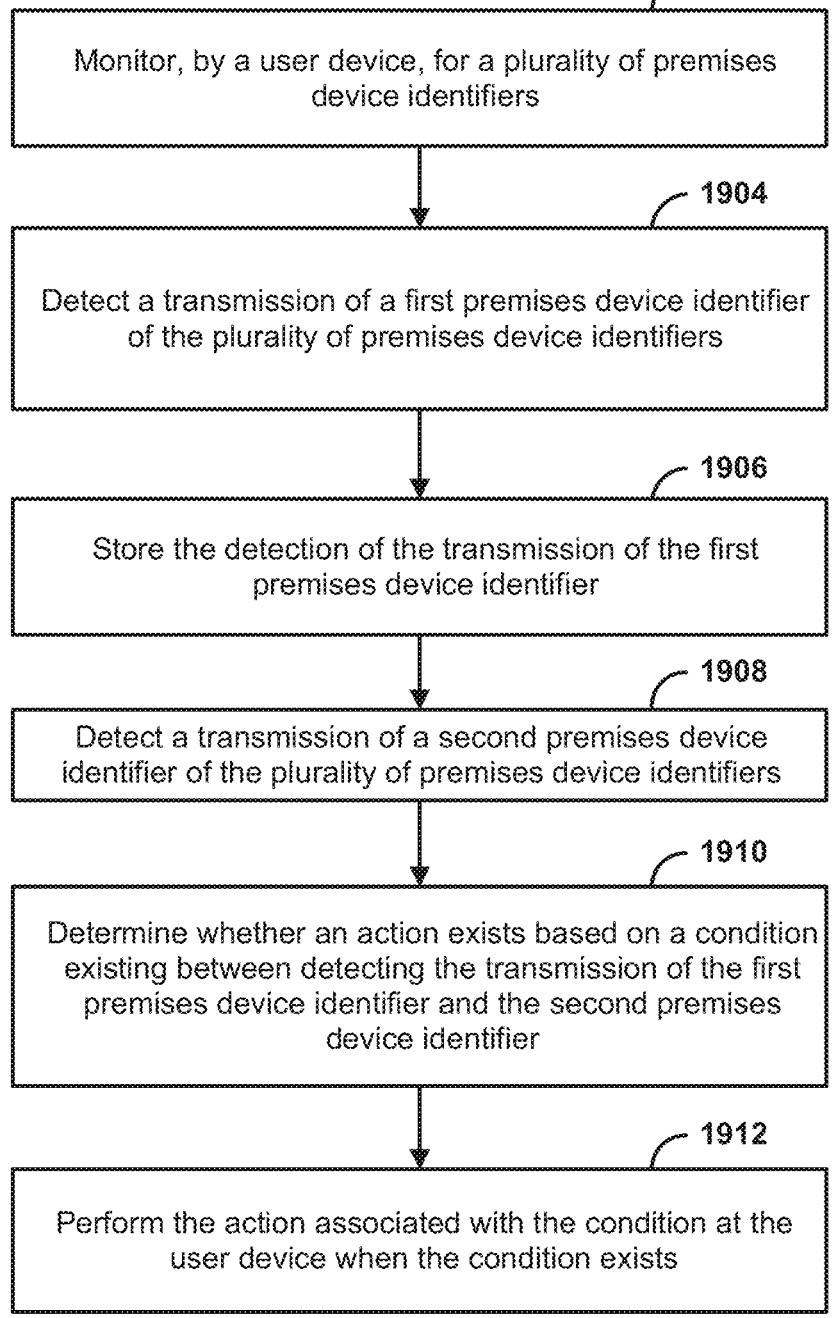

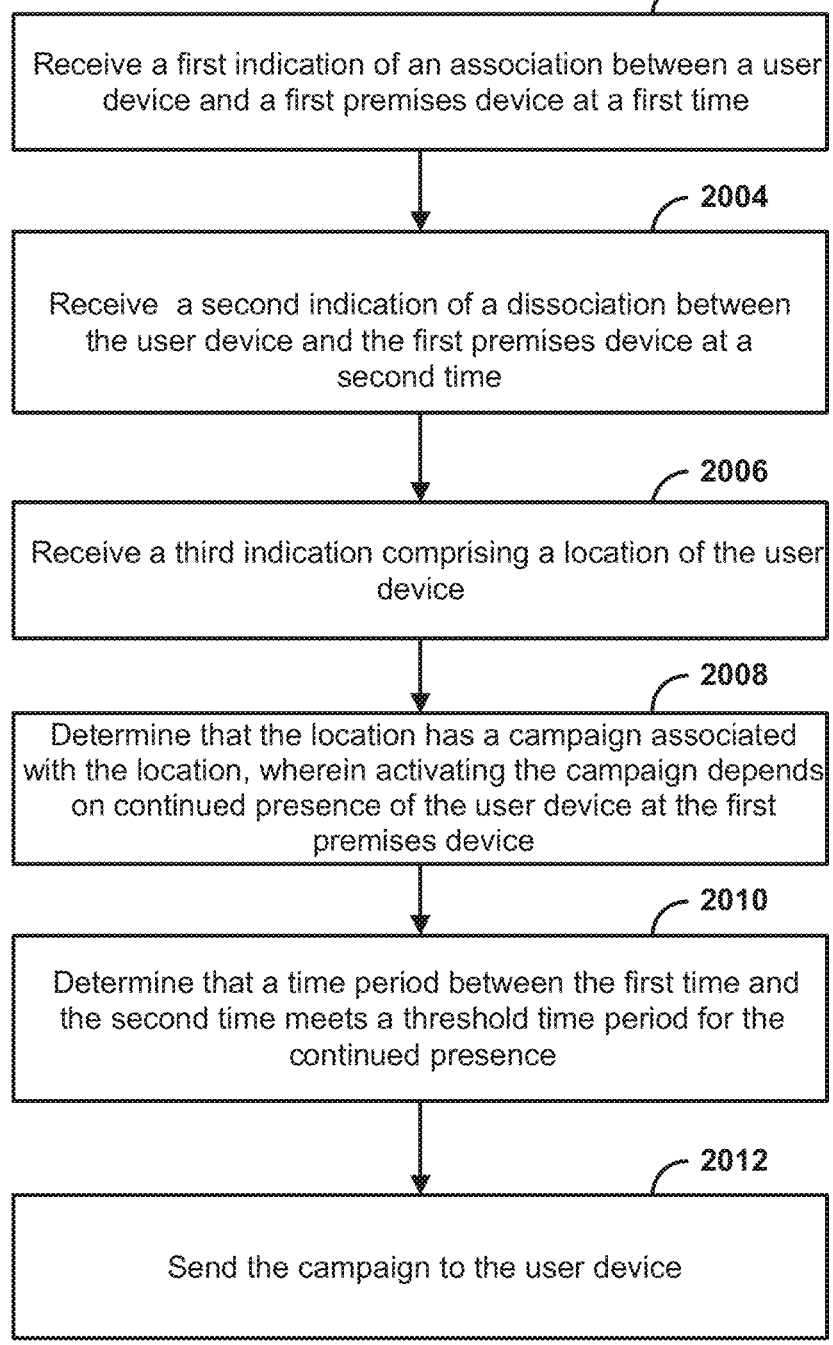

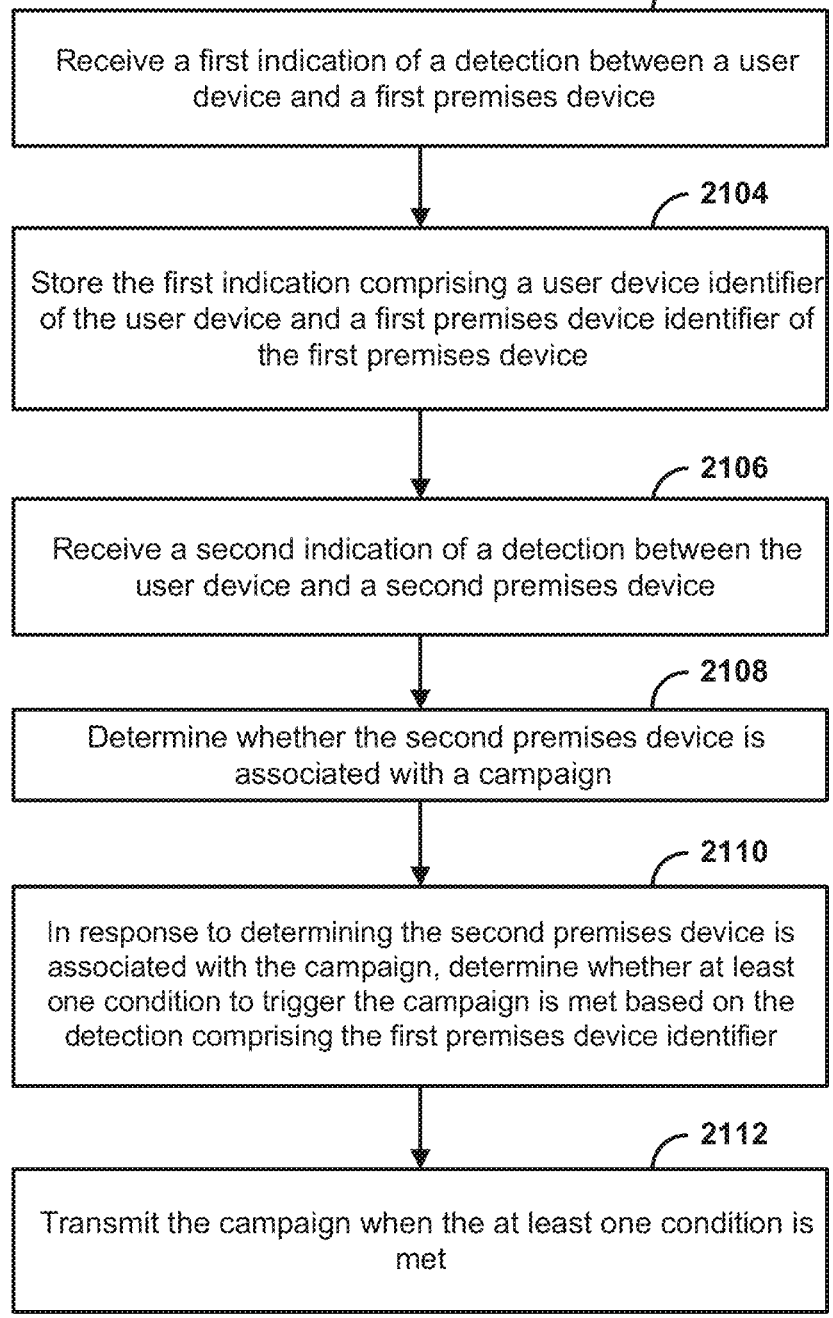

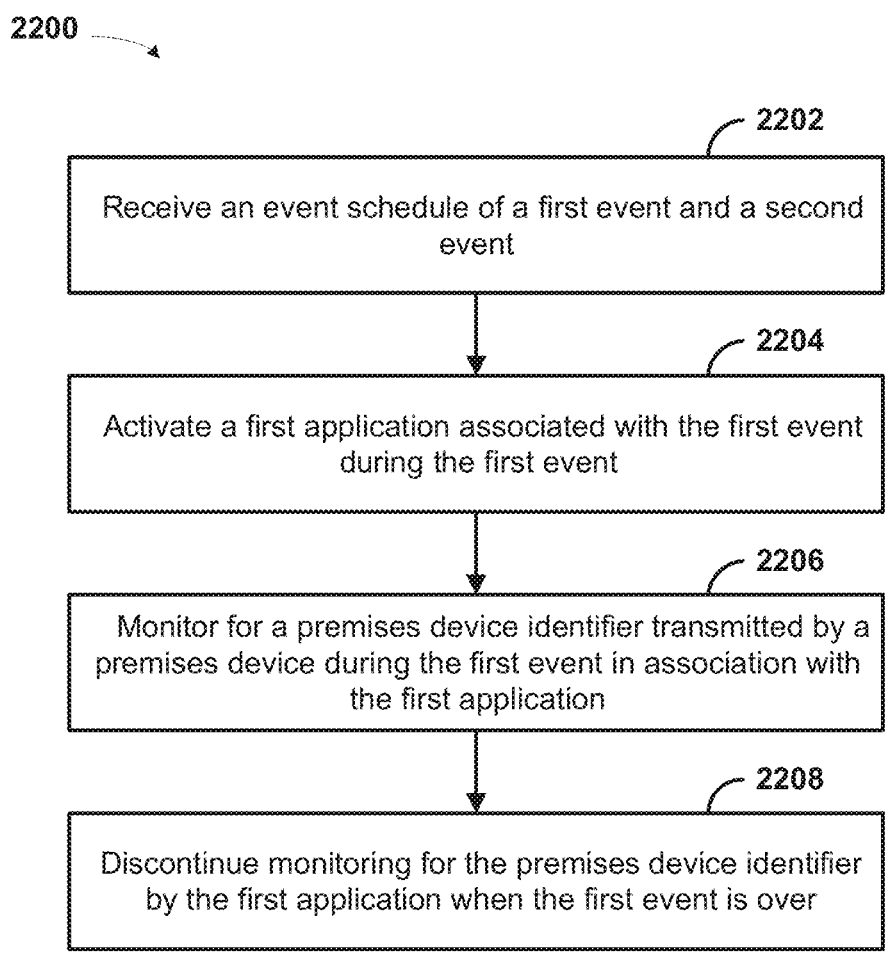

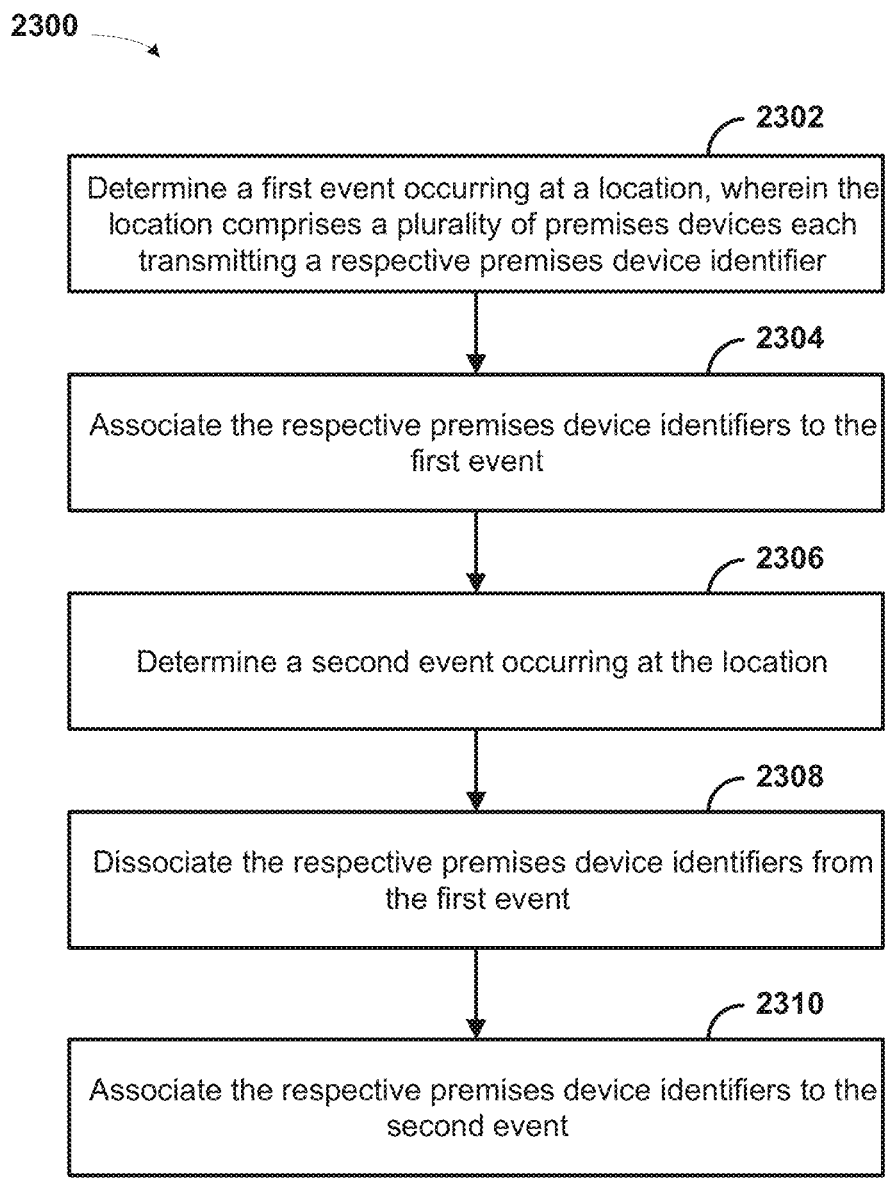

SYSTEMS AND METHODS FOR LOW ENERGY BEACON MANAGEMENT

CROSS REFERENCE TO RELATED PATENT APPLICATION

This application is a continuation of U.S. application Ser. No. 15/047,238 filed Feb. 18, 2016, which is herein incorporated by reference in its entirety.

BACKGROUND

Information providers, such as network operators, content providers, or advertisers, try to increase demand for products by influencing the behavior of a target demographic through use of adverting strategies advertisers, for example, may try to optimize advertising focus by targeting a specific demographic that represents a high opportunity to influence consumer behavior by, e.g., by raising consumer awareness. What is lacking, however, are technologies related to intelligent analyses of location and presence of users relative to information providing devices at venues or other public or private locations These and other shortcomings of the prior art are identified and addressed by the present disclosure.

SUMMARY

It is to be understood that both the following general description and the following detailed description are exemplary and explanatory only and are not restrictive, as claimed. Provided are methods and systems for low energy beacon management and providing targeted campaigns, such as an advertisement campaign. An advertisement campaign can be delivered through numerous mechanisms such as television, digital signage at venues, through applications on mobile devices, and the like.

In one aspect, disclosed are methods and systems that enable targeted campaigns directed to a user by inserting a targeted into content presented to the user. Also disclosed are methods and systems that provide targeted campaigns to presentation devices based on proximity of user devices to the presentation devices. Further disclosed are methods and systems that provide targeted campaigns to a user device based on proximity of the user device to a premises device. Also disclosed are methods and systems that provide targeted campaigns across various applications. Disclosed are methods and systems that provide for scheduling a plurality of campaigns at a location using the same premises devices based on an event schedule of when the campaigns are to take place. Further disclosed are methods and systems that provide a hierarchal system of geofences where each geofence is defined by a location and a premises device identifier of a first set of premises device identifiers for which a user device monitors. If the user device detects a premises device identifier of the first set of premises device identifiers, the targeted communication service can determine which geofence the user device is located in and activate a second set of premises device identifiers for which the user device can monitor within the geofence.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 13 is a flowchart illustrating an example method;
FIG. 14 is a flowchart illustrating another example method;
FIG. 15 is a flowchart illustrating another example method;
FIG. 16 is a flowchart illustrating another example method;
FIG. 17 is a flowchart illustrating another example method;
FIG. 18 is a flowchart illustrating another example method;
FIG. 19 is a flowchart illustrating another example method;
FIG. 20 is a flowchart illustrating another example method;
FIG. 21 is a flowchart illustrating another example method;
FIG. 22 is a flowchart illustrating another example method;
FIG. 23 is a flowchart illustrating another example method.

DETAILED DESCRIPTION

Figure 1:
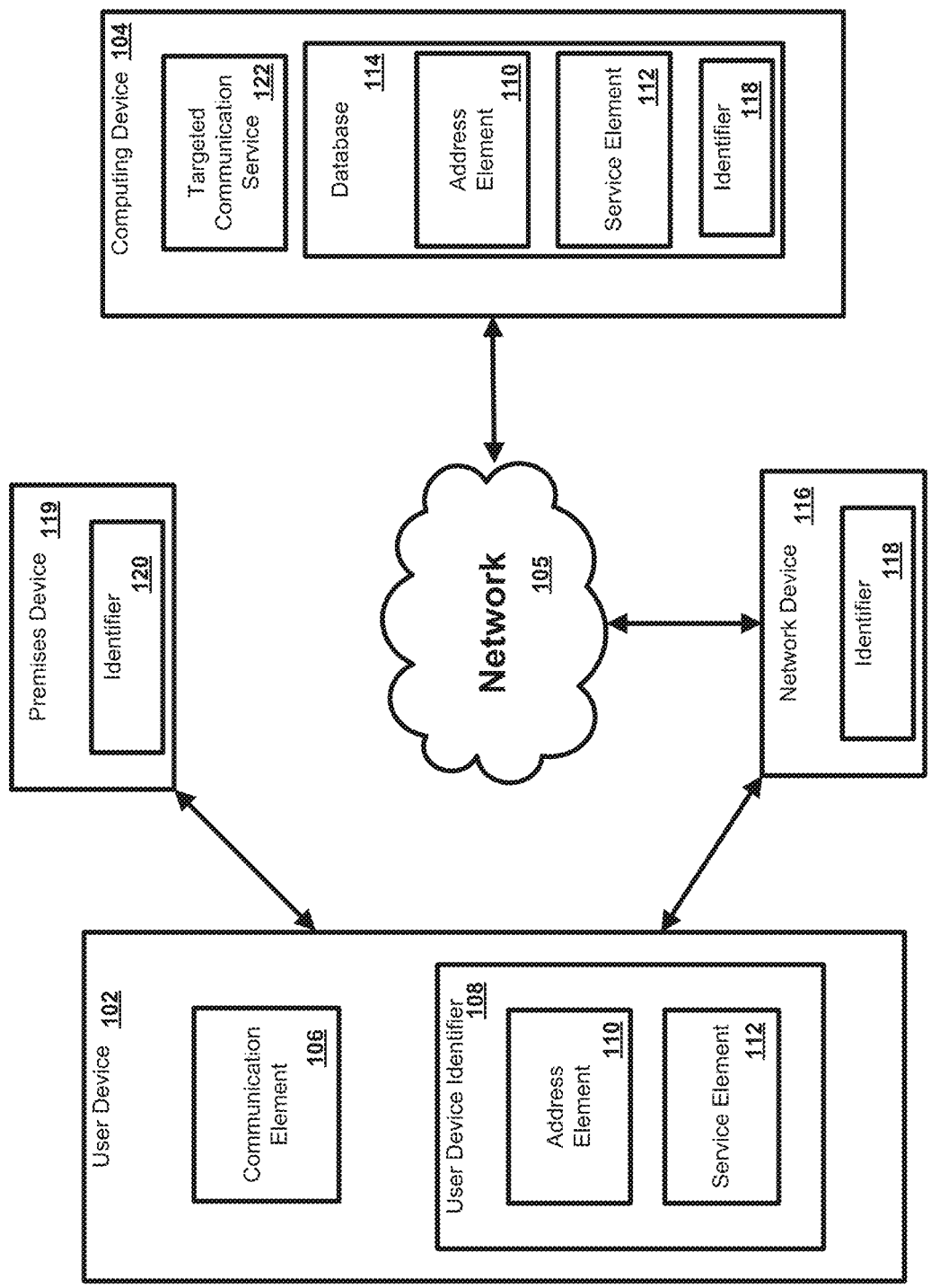
FIG. 1 is a block diagram of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of" and is not intended to convey an indication of a preferred or ideal embodiment. "Such as" is not used in a restrictive sense, but for explanatory purposes.

Throughout the description and claims of this specification, the word "stationary" and variations of the word, can mean staying in a particular position for a prolonged period of time. A "stationary" device can be associated with the particular location.

Throughout the description and claims of this specification, the words "migrant" and "mobile" and variations of the words, can mean not "stationary." However it is specifically contemplated that "migrant" and "mobile" can include aspects that may be temporarily stationary. A "migrant" device and/or a "mobile" device can be a device that is not associated with a particular location.

Throughout the description and claims of this specification, the word "peripheral" and variations of the word, can be used to describe a device that transmits information (data). For example, a "peripheral" can transmit advertisements, location information, network information, identifiers, and the like. A "peripheral" can have data that is needed by other devices.

Throughout the description and claims of this specification, the word "central" and variations of the word, can be used to describe a device that receives information (data) transmitted from a peripheral. In an aspect, a "central" can attempt to connect to a peripheral to further communicate with the peripheral in response to receiving information transmitted from the peripheral. The central can use the data from the peripheral to accomplish a task. In an aspect, the central can passively interact with a peripheral by detecting a transmission of information. Based on recognizing the information, such as an identifier, the central can perform some task. A device can serve as a central, a peripheral, or both, depending on a role needed for a particular implementation.

As used herein, "macro-location" and variations thereof, can be used to describe a range in which a person or thing is located. For example, a Wi-Fi access point may be used to determine a device's macro-location; if the device is connected to the Wi-Fi access point, then the device can be said to be in the Wi-Fi access point's range or "macro-location."

As used herein, "micro-location" and variations thereof, can be used to describe a range in which a person or thing is located, and is relatively more precise than a "macro-location." For example, a first low energy device (such as a first Bluetooth low energy (BLE) enabled device) can determine a second low energy device's micro-location (such as a second BLE-enabled device); if the first BLE-enabled device is able to communicate to the second BLE-enabled device through a BLE protocol, then the first BLE-enabled device can be said to be in the second BLE-enabled device's range or "micro-location."

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Users of user devices (such as a laptop, a mobile phone, a tablet, a wearable device, and the like) often carry the user devices to various locations and the user devices are often used by a single user. Therefore, a unique user can be associated with an identifier of a user device. Detection of the identifier of the user device can be used to identify the user device and thus the associated user of the user device. Targeted campaigns, based on demographics of the user, can then be provided to the user either at the user device or some other output device. A campaign can be content (e.g. video, audio, and the like), actions on interactive applications, ticketing for events, point of sale integration and ordering, loyalty/shopping rewards programs, advertisement content, combinations thereof, and the like.

In an aspect, the present methods and systems disclose a targeted campaign service, for example, a targeted advertisement campaign service. The targeted campaign service can comprise a network (e.g., cloud) based platform that comprises a plurality of computing devices and services that can determine a presence of a user, identify the user, and provide campaigns to the user based on the demographics of the user at various media devices and/or the user device that receive service from the targeted campaign service. Media devices can take many forms, example media devices can be a set-top box, a digital streaming device, a gaming device, a media storage device, a digital recording device, a digital sign, a speaker, various presentation devices, combination thereof, and/or the like. In an aspect, the media device can be the user device. In an aspect, the targeted campaign service can comprise a proximity platform. The proximity platform can be used to determine whether a user device is proximate to a specific location and also identify nearby media devices (available both in real-time and asynchronously).

In an aspect, the methods and systems disclosed can be configured to determine whether a user device is proximate to a specific location and thereby identify the user of the user device based on the identifier of the user device. To determine whether the user device is proximate to the specific location, the proximity platform can receive an indication of a detection between a user device and a premises device. A premises device can be known by the targeted campaign service to exist at the specific location and can be associated with one or more campaigns and media devices. The premises device can comprise a low energy communication element that uses a low energy communication protocol such as WiFi (IEEE 802.11ah), Bluetooth® Low Energy (BLE), near field communication (NFC), infrared data association (IrDA), ANT, Zigbee, Z-Wave, ultrasound, and the like. In another example, the premises device can be a wireless access point comprising a WiFi communication protocol. Likewise, the user device can comprise one or more communication elements that utilize one or more forms of wireless communication protocols. A communication element of a user device or a communication element of a premises device, utilizing a wireless communication protocol, can comprise an identifier specific to the communication element. In an aspect, the communication element can transmit the identifier specific to the communication element and/or the communication element can be utilized by the operating system of the user device or premises device to monitor for transmitted identifiers and detect a transmission of an identifier from another device using the same communication protocol as the communication element. The user device can detect one or more premises devices or vice versa, and/or establish a communication session with the one or more premises devices. The manner in which the user device and the premises device detect each other can depend on the wireless communication protocol each device is using and in what role (e.g., peripheral device or central device) the user device and premises device are serving.

In an aspect, the methods and systems disclosed can comprise a beacon using a low energy communication protocol to determine proximity of a user device. A beacon can be configured as a peripheral device. The beacon can be the user device or the premises device. In an aspect, the user device, configured as a central device, can monitor/scan for transmissions from the premises device configured as a beacon. The premises device transmission can comprise a premises device identifier. If the user device is monitoring for the particular premises device identifier and the user device detects the premises device identifier, then the user device can perform an action and/or establish a communication session with the premises device. Upon detecting the premises device identifier of the premises device, the user device can transmit an indication to the targeted campaign service. The indication can comprise a user identifier of a user that is associated with a user device identifier of the user device. In another example, the indication can comprise the premises device identifier. In another example, the indication can comprise the premises device identifier and the user device identifier. The targeted campaign service can use the user device identifier to retrieve a user identifier/user demographic information from a database of user device identifiers that are associated with a particular user. User demographic information can comprise, for example, age, sex, address, pre-defined interests, gathered interests, education level, occupation, religion, ethnicity, education, and the like. Targeted campaigns can then be selected based on at least the user identifier. Targeted campaigns can also be selected based on the premises device identifier that was detected. The targeted campaign can be sent to the user device or a nearby media device.

In an aspect, the methods and systems disclosed can utilize a WiFi access point to determine proximity of a user device. WiFi can be used to detect the presence of a user device in several ways. In one example, the user device can connect to a wireless access point acting as a premises device. In another example, the wireless access point can detect a user device through passive listening. User devices, having WiFi capability, can constantly send out packets searching for access points with which the user device is familiar. A wireless access point can listen for those packets and may respond, letting the user device know that the access point is within range. The user device need not actually connect with the wireless access point for the wireless access point to detect the user device. The wireless access point can also monitor for user devices that are connected to other wireless access points. The wireless access point and supporting WiFi infrastructure can send an indication of a presence of the user device to the targeted campaign service. The indication can comprise the user device identifier (e.g., SSID). The indication can also comprise an identifier of the WiFi access point. The targeted campaign service can use the user device identifier to retrieve a user identifier/user demographic information from a database of user device identifiers that are associated with a particular user. Targeted campaigns can then be selected based on at least the user identifier. Targeted campaigns can also be selected based on the premises device identifier that was detected. If a WiFi access point is used to determine proximity of the user device and an application is not on the user device or if the user device is acting as the peripheral beacon, then an alternative media device (e.g., a digital sign, a set top box) can be used to communicate the targeted campaigns to the user of the user device. If the user device is configured as a low energy communication protocol central device, then the application is assumed to be on the user device and no alternative content device is required for two-way communication with the user. However, additional media devices may optionally be used either exclusively or in conjunction with the user device.

In an aspect, in the methods and systems disclosed, the premises device can be associated with a media device. For example, the media device can comprise a set-top box, a digital streaming device, a gaming device, a media storage device, a digital recording device, a digital sign, a combination thereof, and/or the like. In an example, the media device can comprise the premises device. In another example, the premises device can be nearby the media device and may or may not be in communication with the media device. Associations (e.g., pairing, being in signal communication, mapping, detection between, and the like.) can be made between the media device and the premises device. The associations can be stored on the targeted campaign service in a database. The associations can be based on a media device identifier of the media device and a premises devices device identifier of the premises device. The association of the media device identifier with the premises device identifier can indicate the premises device is located near the media device. When the user device detects a premises device or vice versa and the proximity platform of the targeted campaign service determines the user of the user device based on user device identifiers, the proximity platform can associate the user and/or user device identifier to the media device by common premises device identifiers associated with both the user device and the media device. The association can indicate that the user is in proximity of the media device. The proximity platform, after receiving an indication comprising the premises device identifier and the user identifier of the user of the user device, can determine which of one or more media devices the premises device is associated with by retrieving associations of premises device identifiers and media device identifiers from the database. The proximity platform can then associate the user detected by the premises device to the media device(s) associated with the premises device. In addition, association of a user to media devices need not be 1:1. The proximity platform can associate one or more groups or a plurality of users at a location to one or a plurality of media devices. A group demographic profile or a demographic profile of the combination of the plurality of individuals can be used to display group appropriate campaigns and/or provide campaigns to all media devices in the location.

In an aspect, the methods and systems disclosed can detect when a user begins interacting with the media device and the proximity platform of the targeted campaign service can receive a request to identify the user of the media device. For example, the proximity platform can receive a request from a user information system (UIS) of the targeted campaign service when the media device detects a content request or other user interaction with the media device. The media device can send a request to a campaign management system of the targeted campaign service for the requested content. A campaign can be customizable by a campaign manager. A campaign can be content (e.g. video, audio, and the like), actions on interactive applications, ticketing for events, point of sale integration and ordering, loyalty/shopping rewards programs, advertisement content and the like. The campaign can be inserted into the requested content. For example, a campaign can be an advertisement that can be customizable by an advertising decisioning system (ADS) based on the user of the media device. The ADS can comprise a list of all the possible advertisements that can be inserted for a piece of content (e.g., video). The ADS can determine what ads to insert and when. The ADS can query the UIS for information regarding which advertisements to insert. The UIS can comprise information such as demographic information on users. The UIS can receive, from the proximity platform, identifiers of user(s) interacting with the media device. The ADS can determine which advertisement from the list of all the possible advertisements to be inserted into the piece of content requested and either insert the advertisement or send the advertisement to be inserted by the media device.

In an aspect, the methods and systems disclosed can determine a confidence level that the current user of the user device is also the user of a media device. In an aspect, a proximity platform can determine the confidence level. The confidence level can comprise an identity confidence level of a particular user of the user device. The identity confidence level can be a measure of a likelihood that a particular user is the current user of the user device. The confidence level can comprise a proximity confidence level. The proximity confidence level can be a measure of how close the current user of the user device is to the media device and a likelihood that the current user is in that range. The confidence level can comprise both the identity confidence level and the proximity confidence level. With respect to the identity confidence level, one or more factors can be considered when determining the identity confidence level. For example, the type of user device detected can be a factor in determining the identity confidence level. Certain types of devices such as a tablet or laptop are more likely to be shared devices amongst members of a family while wearable devices or smart phones are more likely to be associated with one user. Therefore, the user devices detected that are more likely to be associated with one user can be given a higher identity confidence level than those that are more likely to be associated with more than one user. With respect to the proximity confidence level, the proximity platform can be in communication with one or more premises devices comprising one or more communication elements utilizing one or more communication protocols. The media device can be associated with more than one premises device. For example, the media device can be associated with an SSID of a wireless access point and a UUID of a low energy communication protocol device. The user device can establish a communication session with the wireless access point and can detect a transmission from a low energy communication protocol device. The low energy communication protocol device may have a shorter communication range than the wireless access point and if the low energy communication protocol device itself is in close proximity to the media device, then there is a high proximity confidence level that the user of the user device is using the media device. However, if the wireless access point is only detecting the user device, then there would be a lower proximity confidence level that the user of the user device is using the media device as well. If the one or more premises devices detect a second user device associated with a second user, then a proximity confidence level can be determined for both the first user and the second user based on which premises devices are detecting which user devices.

In an aspect, the methods and systems disclosed can associate a user identifier with the media device based on the user device identifier and the confidence level. In an aspect, the proximity platform can associate the user identifier to the media device. In an aspect, the proximity platform can send the user identifier associated with the media device and the confidence level that the user associated with the user identifier is the user of the media device to the SIS. Based on the confidence level of the user or other users that are determined to be associated with the media device, then the UIS can determine which user demographic information to access from a database comprising user demographic information and send the determined user demographic information to the ADS. For example, if there is a higher confidence level that one user is the user of the media device over another user then user demographic information for the user having the higher confidence level can be accessed and sent to the ADS to determine a campaign to provide to the media device. If both users have a similar confidence level, then the user information of both users can be accessed and sent to the ADS and the campaign relevant to both users can be provided to the media device.

In an aspect, in the methods and systems disclosed, the proximity platform can be utilized in a system that does not require user interaction with the media device. For example, a location/venue such as a stadium can utilize the proximity platform to deliver targeted campaigns to media devices (e.g., a display device, digital signage, a presentation device, and the like) scattered throughout the location. In the methods and systems disclosed at least one premises device can be associated with at least one media device. Each of the premises devices can comprise one or more wireless communication elements. The one or more wireless communication elements can use a wireless communication protocol. The premises device can detect a plurality of user devices and/or establish a communication session with the plurality of user devices. A transmission from a user device of the plurality of user devices can comprise a user device identifier. The user device can be configured as a peripheral device and the premises device can be configured as a central device. If the premises device is monitoring for a particular user device identifier of a user device or vice versa and the premises device detects the user device identifier, then the premises device can perform an action and/or establish a communication session with the user device. In the methods and system disclosed, a targeted campaign service can monitor for a user device identifier via the premises device. As an example, the premises device configured as a central device can act as a relay for the BLE communication to the targeted campaign service. Similarly, for WiFi analytics, a gateway at the location can aggregate WiFi association, authentication, and traffic data, which can be relayed to the targeted campaign service.

In an aspect, the methods and systems disclosed can comprise detection of a user device identifier of a user device by a premises device (using WiFi or BLE) and/or detection of the premises device identifier of the premises device by the user device (when the user device is a BLE central). Upon detecting the user device identifier or the premises device identifier, an indication can be transmitted to the proximity platform. The indication can comprise a user identifier of a user that is associated with the user device identifier (e.g., MAC address for WiFi, BLE, Zigbee; an operating system device identifier, and the like), the user device identifier, and/or the premises device identifier. In an aspect, the proximity platform can use the user device identifier to retrieve a user identifier from a database of user devices that are associated with a particular user. In an aspect, the user identifier can be initially of an anonymous user with a known user device identifier. Over time, one or more email address, other personally identifiable information, and the like can be linked to the user device identifier to determine a user identifier. Since linking personally identifiable information over time can result in duplicate records for a given user and the user's devices, as a user identifier is progressively built, the records can be merged with common data entries between the duplicate records.

In an aspect, the methods and systems disclosed can determine a confidence level that a user device of a plurality of user devices is within a presentation area of a media device (e.g., a display device, a digital sign, a presentation device, a speaker, and the like) associated with a premises device. For example, the proximity platform can determine the confidence level. The proximity platform can be in communication with one or more premises devices comprising one or more communication elements utilizing one or more communication protocols. The media device can be associated with more than one premises device. For example, the media device can be associated with an SSID of a wireless access point and a UUID of a BLE device. The user device can establish a communication session with the wireless access point and be detected by the BLE device. In the methods and systems disclosed, the user device can detect the BLE device. The BLE device may have a shorter communication range than the wireless access point and if the BLE device is in close proximity to the media device, then there is a high confidence level that the user of the user device is within a presentation area of the media device. However, if only the wireless access point is detecting the user device, then there would be a lower confidence level that the user of the user device is within the presentation area of the media device. If a detection is made between at least one premises device and a second user device associated with a second user, then a confidence level can be determined for both the first user and the second user based on the detections between premises devices, the user device, and the second user device. Therefore, the more premises devices that detect the user device, a more accurate confidence level can be determined that the user of the user device is within the presentation area of the media device.

In an aspect, the methods and systems disclosed can determine, based on the user identifier associated with the user device and the confidence level, a campaign to be presented on one or more media devices. The proximity platform can transmit the campaign, which may comprise content, overlays, audio, video, text, advertisements, and the like to media device. In an aspect, the proximity platform can cause a campaign management system to transmit the campaign to the media device. In another example, the proximity platform can send the user identifier information and the confidence level to a third party content server, an advertisement engine, an offer management system, a game engine, combinations thereof, and the like to determine the content to transmit to the media device.

In an aspect, the methods and systems disclosed can cause the user device configured as a peripheral device can to be configured as the central device. One or more premises devices configured as a peripheral device or combination of premises devices acting as peripheral devices and central devices can be associated with one or more media devices of a plurality of media devices. A user device can act as a mobile central device. The user device can have an application installed comprising at least one premises device identifier registered with the user device's operating system so that the operating system can monitor for the at least one premises device identifier of a premises device. For example, the operating system of the user device can monitor for premises device identifiers, such as UUIDs, of premises devices that are of interest to the application installed on the user device. As the user device traverses space, the user device can detect transmissions from one or more premises devices that may be associated with the media devices. When the user device detects a premises device identifier for which the operating system is monitoring, the user device can transmit an indication that the user device detected the premises device identifier. In an aspect, the user device can transmit the indication comprising the user device identifier, user identifier, premises device identifier, combinations thereof, and the like over the network to the proximity platform of the targeted campaign service.

In an aspect, the methods and systems disclosed can comprise a presence engine that can register when the detection of a premises device occurred. The proximity platform can associate the user device with the premises device when the proximity platform receives a first indication comprising a user device identifier of the user device and a premises device identifier of the premises device. The indication indicates detection between the user device and the premises device. When the user device no longer detects the premises device, then a second indication can be sent to the proximity platform that the user device no longer detects the premises device. The presence engine can de-register a user when the user device no longer detects the premises device. Furthermore, the proximity platform can dissociate the user device with the premises device. The proximity platform dissociates the user device from the premises device to maintain accuracy of who is currently within a presentation area of a media device. In an aspect, even if a user device is still associated with a premises device, the presence engine can de-register a given user after a defined timeout period where no subsequent proximity data has been received to prevent false positives of presence. For example, a user device may be left at a location to charge. Therefore, the user of the user device is likely not present and therefore not within the presentation area of the media device so the targeted campaign service should not provide a targeted campaign based on that user device. In an aspect, the presence engine can register and de-register events of association and dissociation of the user device from one or more premises devices as the user device traverses space. The registered and de-registered events can be used to establish a continued presence of a user device at various media devices. A continued presence can be used as a factor in determining which campaign to present to a media device. The continued presence of a user device can indicate that the user of the user device is interested in something being presented by the media device or something that is near the media device.

In an aspect, the methods and systems disclosed can comprise a targeted campaign service that can comprise cross platform campaigns. A user device can comprise one or more applications that provide the user device with one or more premises device identifiers. The user device can monitor for transmission of the premises device identifiers. The user device can detect a transmission of a first premises device identifier from a first premises device. The user device can log/store the detection of the first premises device identifier. In an aspect, the user device can detect a transmission of a second premises device identifier from a second premises device. The application on the user device can determine whether a condition exists between the detection of the transmission of the first premises device identifier and the second premises device identifier. Example conditions can comprise one or more of, order of detection of the first premises device identifier and the second premises device identifier, time between detection of the first premises device identifier and the second premises device identifier, whether an event occurred between the detection of the first premises device identifier and the second premises device identifier, and the like. If the condition exists, the user device can receive a campaign on the user device. The campaign can be associated with the condition. In the methods and systems disclosed, alternatively, the user device can relay detection of the transmission of the first premises device identifier and/or the second premises device identifier to the targeted campaign service. The targeted campaign service can determine whether a condition exists between the detection of the transmission of the first premises device identifier and the second premises device identifier. In the methods and systems disclosed, if the user device is within reception of both a first premises device identifier corresponding to a first campaign and a second premises device identifier corresponding to a second campaign, the user device can relay the identifiers to the targeted campaign service. The targeted campaign service can determine which campaign takes priority. The priority of the campaign can be based on a global priority and/or based on the user of the user device such as user history, preference, a user profile, defined thresholds of number of campaigns, combinations thereof, and the like. For example, the user may have already viewed a particular campaign or the user has received a maximum number of campaigns in an hour.

As an example of the methods and systems disclosed, a user of a user device can enter a first location/venue such as a sports arena. The user device can have one or more applications that register at least one premises device identifier for the user device's operating system to monitor. As the user moves around the first location, the user device can detect transmission of at least one premises device identifier of one or more premises devices. A condition may exist that if the user attended the first location, when the user visits a second location the user will get a coupon for the second location at the user device. An application (e.g., a mobile application, a plurality of mobile applications, or a cloud service) associated with campaigns for the first location, the second location, or both can determine whether the condition exists. The targeted campaign service can determine whether the condition exists. Once the user enters the second location with the user's user device acting as a central device, the user device can monitor for the one or more premises device identifiers. If the user device detects/discovers one of the premises device identifiers, then the user device can determine whether there is a condition for the detected/discovered premises device identifier. Example conditions can comprise one or more of, order of detection of a first premises device identifier and a second premises device identifier, time between detection of the first premises device identifier and the second premises device identifier, whether an event occurred between the detection of the first premises device identifier and the second premises device identifier, and the like. If there is a condition, then the user device or targeted campaign service through the proximity platform can determine whether or not the condition is met. In an aspect, the application can signal to the targeted campaign service that the condition is met and the targeted campaign service can provide the coupon or other campaign that is associated with the condition (e.g., whether or not the user attend the first location).

In an aspect, upon detecting a transmission of a first premises device identifier, a condition in the application can be met which can unlock additional premises device identifiers for which the user device can monitor. In an aspect, the user device can relay the first premises device identifier to the targeted campaign service that can unlock additional premises device identifiers for which the user device can monitor. In an aspect, the condition can be based on proximity and confidence levels determined by the proximity platform. In an aspect, the condition can be based on continued presence. In an aspect, the condition can be met based on location rather than detecting a second premises device identifier.

In an aspect, in the methods and systems described, the targeted campaign service can comprise an event scheduler. The event scheduler can be used for a location/venue that can have one or more events that are occurring at the same time or at different times. The event scheduler can be referenced by the proximity platform to identify which campaigns are currently active for a set of premises device identifiers and/or which premises device identifiers are currently active. In another aspect, user devices that are monitoring for premises device identifiers need to know which premises device identifiers to monitor for and which applications need to be active when the user is present at the location/venue. In an aspect, the event scheduler can receive an event schedule of a first event and a second event occurring at the location. The location can have one or more premises devices each comprising a premises device identifier that can be the same or different. A user device can have an application for each event, an application for an organization (e.g., sports team), and/or an application for the venue such that the application is associated with a given event. The proximity platform can provide a list of at least one premises device identifier for which the user device to monitor. In an aspect, the list of at least one premises device identifier can be based on a given active campaign that is scheduled by the event scheduler. In an aspect, the premises device identifiers can be static in that they do not change. Certain premises devices and corresponding premises device identifiers can therefore be assigned to the first event while other premises devices and corresponding premises device identifiers can be assigned to the second event. The event scheduler can communicate to the user device which premises device identifiers are active. In an aspect, a campaign manager can cause the proximity platform to assign the premises device identifiers to specific applications within a timeline defined in the event scheduler. For example, an application associated with a first event or features of an application associated with the first and second events can monitor for the premises device identifiers at a first time when the first event is occurring. The targeted campaign manager can then dissociate the premises device identifiers with the first event and associate them with a second event when the second event begins. In an aspect, more than one application can be eligible for a campaign at the same location. The proximity platform can then determine which campaign takes precedence. An application on the user device associated with the second event or associated with both the first and second event can monitor for the premises device identifiers at a second time when the second event is occurring. The targeted campaign service can dissociate the premises device identifiers from the second event when the second event has ended. In an aspect, the proximity platform can end the campaign for the second event when the second event has ended.

In an aspect, the methods and systems can comprise premises devices that can comprise dynamic premises device identifiers. The proximity platform can assign new premises device identifiers to the premises devices depending on which event is taking place according to the event scheduler. In an aspect, the proximity platform can assign a first set of premises device identifiers at a first time to a plurality of peripheral devices at the location/venue. The first set of premises device identifiers can be associated with a first application and a first event. In an aspect, the proximity platform can assign a second set of premises device identifiers at a second time to the plurality of premises devices at the location/venue. The second set of premises device identifiers can be associated with a second application and a second event. The second set of premises device identifiers can replace the first set of premises device identifiers.

In an aspect, the targeted campaign service can provide one or more campaigns to a plurality of locations. In an aspect, a user device can monitor for a finite number of identifiers. In an aspect, the user device can monitor for a finite (e.g., maximum) number of premises device identifiers per application. For example, a user device can monitor for 20 UUIDs for a first application and 20 UUIDs for a second application. As an example, the user device can monitor for 20 UUIDs total. The monitoring for premises device identifiers can be performed by the application while the application is in the background. Monitoring for a finite number of premises device identifiers can reduce the power consumption of the user device in comparison to continuous monitoring for any number of premises device identifier. In an aspect, each location can be associated with a premises device identifier. In an aspect, because the user device can only monitor for a finite number of premises device identifiers, the premises device identifier can be the same for one or more of the plurality of locations if there are more locations than the finite number of premises device identifiers.

In an aspect, as a user device traverses space, an application running in the background can monitor for a first set of premises device identifiers. Each of the premises device identifiers can have one or more locations associated with the premises device identifiers in a database. Each premises device identifier of the first set of premises device identifiers can represent a different category. For example, a premises device identifier of the first set may define a category of sports venues, residential location, restaurants, department store, and the like. The premises device identifier for each category can be associated with location information for each location utilizing the application. Location information can be determined based on GPS or other secondary communications channels such as WiFi. The user device can transmit the premises device identifier and the location information to the proximity platform. The proximity platform can use the location information and the premises device identifier to determine a second set of premises device identifiers for which the user device to monitor. The targeted campaign service can then send the user device the second set of premises device identifiers. The user device can replace the first set of premises device identifiers with the second set of premises device identifiers. The user device can then monitor for the second set of premises device identifiers in the background. The second set of premises device identifiers can include the detected premises device identifier of the first set of premises device identifiers. The first set of premises device identifiers can then be monitored for again when the user device no longer detects a premises device identifier of the second set of premises device identifiers. In an aspect, the user device can switch back to monitoring the first set of premises device from the second set of premises device when the location information is determined to no longer be in a range of the location associated with the premises device identifier of the first set of premises device identifiers. In an aspect, the user device can switch back to monitoring the first set of premises device identifiers from the second set of premises device identifiers when the detected premises device identifier of the first set is no longer detected when leaving the location. By performing the preceding actions, an application can monitor for an unlimited number of premises device identifiers while the application is in the background and is not limited to the finite number of premises device identifiers.

In an aspect of the disclosure, a system can be configured to provide services, such as network-related services, to a user device. FIG. 1 illustrates various aspects of an exemplary environment in which the present methods and systems can operate. The present disclosure is relevant to systems and methods for providing services (e.g., targeted campaign service) to a device, for example, a user device 102. In an aspect, one or more network devices 116 can be configured to provide various services to one or more devices, such as devices located at or near a premises. In another aspect, the network devices 116 can be configured to recognize an authoritative device for the premises and/or a particular service or services available at the premises. As an example, an authoritative device can be configured to govern or enable connectivity to a network 105 such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The networks and systems can comprise a user device 102 in communication with a computing device 104, such as a server, for example. The computing device 104 can be disposed locally or remotely relative to the user device 102. As an example, the user device 102 and the computing device 104 can be in communication via a private and/or public network 105 such as the Internet or a local area network. Other forms of communication can be used such as wired and/or wireless telecommunication channels, for example. In an aspect, the computing device 104 can comprise a targeted communication service 122, such as a targeted campaign service.

In an aspect, the user device 102 can be an electronic device such as a computer, a smartphone, a laptop, a tablet, a set-top box, a display device, a presentation device, a media device, or other device capable of communicating with the computing device 104. In an aspect, the user device 102 can be configured as a central device and/or a peripheral device. In an aspect, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). In an aspect, the communication interface can comprise a mobile application. Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or user device identifier 108. As an example, the user device identifier 108 can be any identifier, token, character, string, or the like, for differentiating one user or user device (e.g., user device 102) from another user or user device. In a further aspect, the user device identifier 108 can identify a user or user device as belonging to a particular class of users or user devices. As a further example, the user device identifier 108 can comprise information relating to the user device such as a manufacturer, a model or type of device, a service provider associated with the user device 102, a state of the user device 102, a locator, and/or a label or classifier. Other information can be represented by the user device identifier 108.

In an aspect, the user device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network 105.

In an aspect, the service element 112 can comprise an identification of a service provider and/or manufacturer associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can be a server associated with a service provider. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As yet another example, the computing device 104 can be configured as a component of a cloud network, such as a server or a router.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the user device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing device 104 or some other device or system.

In an aspect, the computing device 104 can comprise the targeted communication service 122. The targeted communication service 122 can comprise a plurality of modules to determine proximity of a user device 102 to a premises device 119 and/or a network device 116, identify a user of the user device, and provide a targeted campaign to the user of the user device at the user device and/or a media device associated with the premises device 119. A campaign can comprise content (e.g. video, audio, and the like), actions on interactive applications, ticketing for events, point of sale integration and ordering, loyalty/shopping rewards programs, advertisements, and the like. The targeted communication service 122 and the modules of the targeted communication service 122 are described in more detail below in the description for FIG. 2.

In an aspect, one or more network devices such as a network device 116 can be in communication with a network such as network 105. As an example, the network device 116 can facilitate the connection of a device, such as user device 102, to the network 105. As a further example, the network device 116 can be configured as a wireless access point (WAP). In an aspect, the network device 116 can be configured to allow one or more wireless devices to connect to a wired and/or wireless network using Wi-Fi, Bluetooth, BLE, NFC, IrDA, ANT, Zigbee, Z-Wave, ultrasound, or any desired method or standard. In an aspect, the network device 116 can be configured as a peripheral device and/or a central device.

In an aspect, the network device 116 can be configured as a local area network (LAN). As an example, the network device 116 can comprise a dual band wireless access point. As an example, the network device 116 can be configured with a first service set identifier (SSID) (e.g., associated with a user network or private network) to function as a local network for a particular user or set of users. As a further example, the network device 116 can be configured with a second service set identifier (SSID) (e.g., associated with a public/community network or a hidden network) to function as a secondary network or redundant network for connected communication devices.

In an aspect, the network device 116 can comprise an identifier 118. As an example, one or more identifiers 118 can be or relate to an Internet Protocol (IP) Address IPV4/IPV6 or a media access control address (MAC address) or the like. As a further example, one or more identifiers 118 can be a unique identifier for facilitating communications on a physical network segment. In an aspect, each of the one or more network devices can comprise a distinct identifier 118. As an example, the identifiers 118 can be associated with a physical location of the network devices.

In an aspect, one or more premises devices such as a premises device 119 can be in communication with a user device 102. In an aspect, the premises device 119 can be in communication with the network 105 and can be configured such as the network device 116. The premises device 119 can be a low energy device, such as Bluetooth® Low Energy (BLE) device. BLE is a protocol that allows for long-term operation of Bluetooth® devices in low-volume data transmission. BLE can enable smaller form factors, better power optimization, and power cells that last for years on a single charge. BLE can function by transmitting brief bursts of low-bitrate data. BLE devices can operate for significantly longer periods of time with the same total power usage by drastically reducing the time spent at peak power consumption. The central-peripheral relationship described throughout the application can be accomplished using the BLE protocol. In various aspects, the premises device 119 can be configured with other low energy protocols such as near field communication (NFC), infrared data association (IrDA), ANT, Zigbee, Z-wave, ultrasound, and the like. In some aspects, a low energy device can be characterized as using less than about 200 microwatts per bit of data transmission, having a maximum current draw of less than about 50 milliamps, and/or less than about 0.2 milliwatts of power usage. Other low energy devices are specifically contemplated.

In an aspect, the premises device 119 can be configured as a peripheral device. For example, the premises device 119 can be configured as a beacon where the premises device 119 transmits packets that include an identifier 120 (e.g., premises device identifier) of the premises device 119. As an example, the premises device 119 can be configured as a BLE beacon. The premises device 119 can broadcast the identifier 120 which can be a universal unique identifier (UUID). In an aspect, the user device 102 can be configured as a central device that monitors for one or more identifiers. If the identifier 120 is an identifier for which user device 102 monitors and the user device 102 detects the identifier 120, then the user device 102 can perform an action based on the identifier 120 the user device 102 detected. The user device 102 may be monitoring for the identifier 120 based on an application installed on the user device 102. As an example, the action can be to establish a communication session between the premises device 119 and the user device 102. As another example, the action can be performed at the user device such as "waking up" the application and/or performing a function (e.g., provide content) of the application.

In an aspect, alternatively or in combination, the premises device 119 can be configured as a central device and the user device 102 can be configured as a peripheral device. The user device 102 can be transmitting an identifier such as the user device identifier 108. In an aspect, the user device identifier 108 can comprise a UUID (e.g., MAC address). The premises device 119 can monitor for one or more user device identifiers. If the premises device 119 detects a user device identifier for which the premises device 119 monitors, then the premises device 119 can perform an action as above where the user device 102 was the central device.

Figure 2:
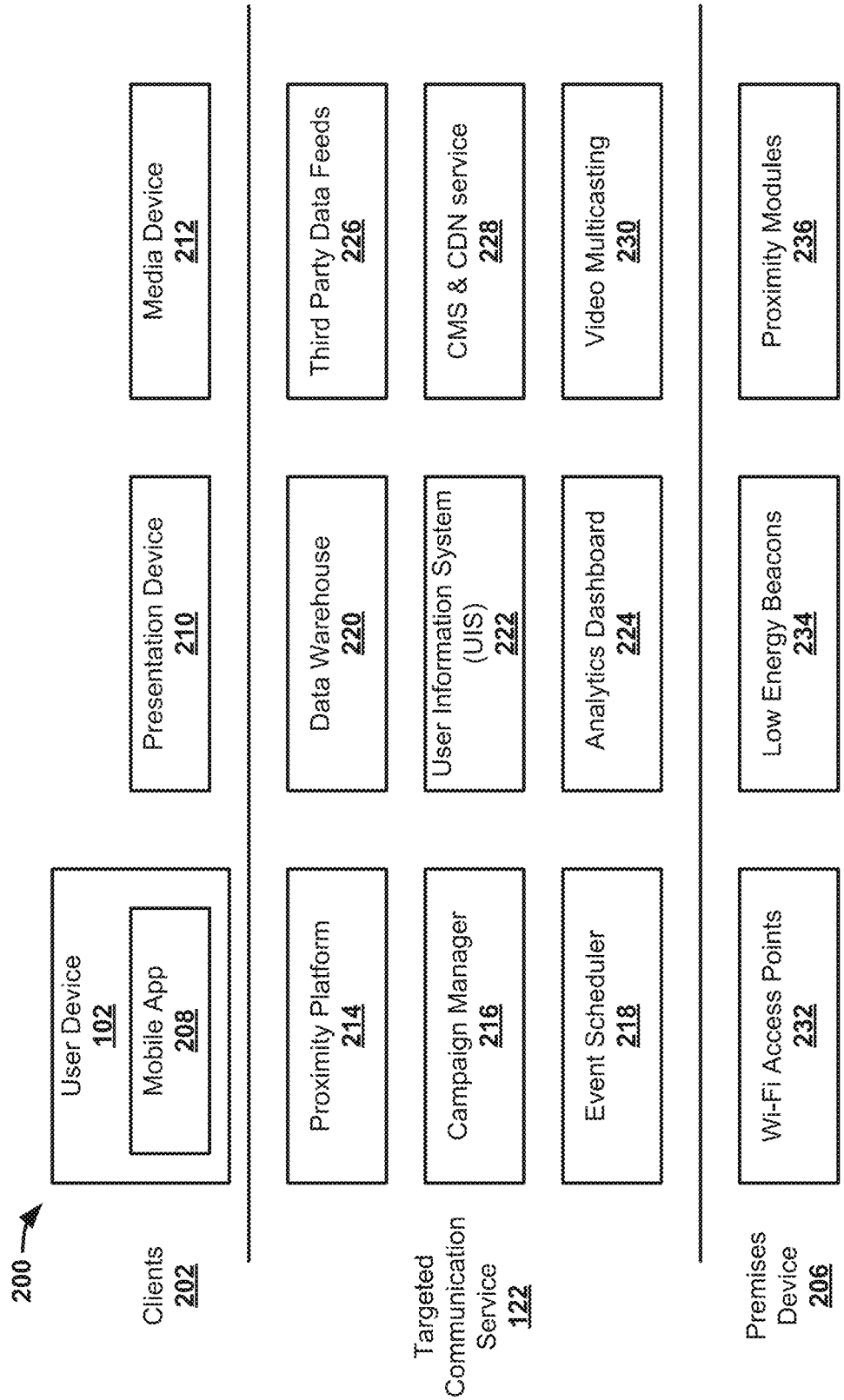
FIG. 2 is a block diagram of an example system.

FIG. 2 is a block diagram of an exemplary system 200 for proximity detection and providing targeted campaigns. The system 200 can comprise a client component 202, a targeted communication service 122, and a premises device 206. The client component 202 can comprise one or more user devices such as user device 102 of FIG. 1. A user of client components 202 can receive a targeted campaign and receive a unique user experience through one or more sources such as a mobile application 208, a presentation device 210, a media device 212 (e.g., a gateway, a television set top box, a game console, and the like), combinations thereof, and the like. The targeted communication service 122 can be configured on one or more computing devices such as computing device 104 of FIG. 1. The targeted communication service 122 can comprise a proximity platform 214, a campaign manager 216, an event scheduler 218, a data warehouse 220, a user information system 222 (e.g., a subscriber information system), a Wi-Fi and a analytics dashboard 224, one or more third party data feeds 226, a campaign management system (CMS) and a content delivery network (CDN) service 228, a video multicasting module 230, combinations thereof, and the like. In an aspect, the premises device 206 can comprise network devices and premises devices such as the network device 116 and/or the premises device 119 of FIG. 1. In an aspect, the premises device 206 can comprise one or more wireless (e.g., Wi-Fi) access points 232, one or more low energy beacons 234, one or more proximity modules 236, combinations thereof, and the like. The one or more Wi-Fi access points 232 can comprise a communication element that uses a WiFi communication protocol. The one or more low energy beacons 234 can comprise a low energy communication element that uses a low energy communication protocol such as WiFi (IEEE 802.11ah), Bluetooth® Low Energy (BLE), near field communication (NFC), infrared data association (IrDA), ANT, Zigbee, Z-Wave, ultrasound, and the like.

As an example, the proximity module 236 can comprise one or more of temperature sensors, proximity sensors, user recognition sensors, humidity sensors, thermostats, motion sensors, contact sensors, microphones for audible or ultrasonic cues, a camera, stereoscopic camera, wide-angle camera, biometric sensor, user tracking device, RF sensor, and/or any other device for determining a user state or condition. In an aspect, the proximity module 236 (or a combination of multiple sensors) can be configured to determine (e.g., capture, retrieve, sense, measure, detect, extract, or the like) information relating to one or more users. As an example, the proximity module 236 can be configured to determine the presence of one or more users within a field of operation of the proximity module 236. As a further example, the proximity module 236 can be configured to determine a user state, such as behavior, biometrics, movement, physical and/or chemical characteristics, facial recognition location, reaction, body heat analysis, behavioral analysis, eye tracking, head tracking and other characteristics relating to one or more users. Other characteristics, identifiers, and features can be detected and/or monitored by the proximity module 236 such as gestures, sounds (e.g., voice, laughter), and environmental conditions (e.g., temperature, time of day, date, lighting, and the like).

In an aspect, the premises device 206 comprising the Wi-Fi access points 232, the low energy beacons 234, and the proximity modules 236 can comprise software, hardware, algorithms, processor executable instructions, and the like to enable the premises device 206 to process, route, and/or broadcast any data captured or retrieved by the premises device 206. As a further example, the premises device 206 can transmit data captured or retrieved thereby to a device or system in communication with the premises device 206.

In an aspect, the client component 202 can comprise a user device such as the user device 102 of FIG. 1. As an example, the user device 102 can be a user device such as a smartphone, a tablet, a laptop, a wearable device, and the like. The user device can comprise one or more mobile applications 208. The mobile application 208 can comprise a provider's application developed with a targeted campaign software development kit (SDK) and/or third party applications developed using the targeted campaign SDK. The mobile application 208 can cause an operating system of a user device to monitor for identifiers of low energy beacons 234. Upon detecting a low energy beacon 234, the user device 102 can perform an action and/or receive a campaign from the targeted communication service 122. An action can be "waking up" the mobile application 208, causing a function of the mobile application 208 to be performed, and the like. A campaign can comprise content (e.g. video, audio, and the like), actions on interactive applications, ticketing for events, point of sale integration and ordering, loyalty/shopping rewards programs, advertisements, and the like. In an aspect, the action can be the mobile application 208 causes the user device 102 to transmit an identifier of the user device and/or an identifier of the premise device to the targeted communication service 122 to determine an identity of a user of the user device and campaigns to be presented to the user of the user device based on the premises device detected and/or user demographic information of the user. In an aspect, the mobile application 208 can be configured to archive all campaigns in a central area in the mobile application 208 for later viewing or later use of a coupon. In an aspect, the mobile application 208 can remove campaigns from the central location based on an expiration of time. The expiration of time can be user specified and/or campaign specified.

In an aspect, the premises device 206 can monitor for identifiers of clients 202 (e.g., user devices 102). Upon detection of an identifier, the premises device 206 can signal the targeted communication service 122 to perform a service and/or cause an action to be performed by the premises device 206, and/or any of the clients 202. A service can be providing a targeted campaign to a client 202. An action can be "waking up" the mobile application 208, causing a function of the mobile application 208 to be performed, causing the premises device 206 to establish a communication session between a user device 102 and premises device 206.

In an aspect, the client component 202 can comprise a presentation device 210. The presentation device 210 can be a television, an LCD display, a monitor, a projector, a jumbotron, an audio device, an interactive device, combinations thereof and the like. In an aspect, the client component 202 can comprise a media device 212 such as a set top box, a computing device, a gaming console, and the like that can provide an output to the presentation device 210. In an aspect, the media device 212 can comprise the presentation device 210. In some aspects, the media device can also comprise the presentation device 210. In an aspect, the media device can comprise the user device 102. Any step and/or result of the methods directed toward the media device 212 can be output in any form to an output device. Such output can be any form of visual representation, including, but not limited to, textual, graphical, animation, audio, tactile, and the like. In an aspect, the media device 212 can receive targeted campaigns from the targeted communication service 122 based on the users that are in proximity to the presentation device 210 and/or media device 212. Proximity can be determined through a combination of user devices and one or more premises devices 206 that are associated with the presentation device 210 and/or media device 212.

In an aspect, the targeted communication service 122 can comprise a proximity platform 214. The proximity platform 214 can be used to determine a location of a user based on the user's user device with respect to a presentation device 210, media device 212, other user devices, premises device 206, combinations thereof, and the like. The proximity platform 214 can determine location of the user's user device based on known locations of premises device(s) 206 that can be associated with various client components 202. The proximity platform 214 is described further herein.

In an aspect, the targeted communication service 122 can comprise a campaign manager 216. The campaign manager 216 can be used to manage campaigns on the targeted communication service 122. A campaign can comprise content (e.g. video, audio, and the like), actions on interactive applications, ticketing for events, point of sale integration and ordering, loyalty/shopping rewards programs, and the like. The campaign manager 216 can comprise one or more business rules, conditions, criteria, and the like for each campaign. The proximity platform 214 can be used in conjunction with the campaign manager 216 in determining whether a business rule has been met.

For example, the campaign manager 216 can have a business rule for when a user device is within range of a premises device 206, a campaign can be initiated for that user device. The proximity platform 214 can make a determination that the user device is within range of the premises device 206 when the user device notifies the proximity platform 214 that the user device has detected a premises device 206 such as a low energy beacon 234 for which the user device is monitoring. The proximity platform 214 can notify the campaign manager 216 of the proximity of the user device to the low energy beacon 234. The campaign manager 216 can determine whether any business rules are met based on the proximity of the user device to the low energy beacon 234. If the business rule is satisfied, the campaign manager 216 can provide the campaign to the user device.

In aspect, the proximity of the user can comprise a confidence level of the proximity of the user to the premises device 206. A business rule can be based on the confidence level of proximity as well as the confidence level of an individual or group of individuals' demographics. The proximity platform 214 of the targeted communication service 122 can determine a confidence level that a particular user is interacting with the media device 212. The targeted communication service 122 can provide campaigns such as targeted advertisements to the media device 212, for the particular user(s) determined to be interacting with the media device 212.

In an aspect, the confidence level can comprise an identity confidence level of a particular user of the user device 102. The identity confidence level can be a measure of the likelihood that a particular user is the current user of the user device 102. In an aspect, the confidence level can comprise a proximity confidence level. The proximity confidence level can be a measure of how close the current user of the user device 102 is to a media device 212 and/or a premises device 206 and a likelihood that the current user is in that range. The confidence level can comprise both the identity confidence level and the proximity confidence level. With respect to the identity confidence level, one or more factors can be considered when determining the identity confidence level. For example, the type of user device 102 detected can be a factor in determining the identity confidence level. Certain types of devices such as a tablet or laptop are more likely to be shared devices amongst members of a family while wearable devices or smart phones are more likely to be associated with one user. Therefore, user devices detected that are more likely to be associated with one user can be given a higher identity confidence level than those that are more likely to be associated with more than one user.

With respect to the proximity confidence level, the proximity platform 214 can be in communication with one or more premises devices 206 comprising one or more communication elements utilizing one or more communication protocols. The media device 212 can be associated with more than one premises device 206. For example, the media device 212 can be associated with an SSID of a wireless access point 232 and a UUID of a low energy communication protocol device (e.g., low energy beacon 234). A first user device can establish a communication session with the wireless access point 232 and can detect a transmission from a low energy beacon 234. The low energy beacon 234 may have a shorter communication range than the wireless access point 232 and if the low energy beacon 234, itself, is in close proximity to the media device 212, then there is a high proximity confidence level that a first user of the first user device is using the media device 212. However, if the wireless access point 232 is only detecting the first user device, then there would be a lower proximity confidence level that the first user of the first user device is using the media device 212 as well. If the one or more premises devices 206 detect a second user device associated with a second user, then a proximity confidence level can be determined for both the first user and the second user based on which premises devices 206 are detecting which of the first user device and second user device.

In an aspect, the targeted communication service 122 can interact with an event scheduler 218. In an aspect, the event scheduler 218 can manage or define events within which a campaign is active. The proximity platform 214 can manage premises devices 206 and premises device identifiers based on which campaigns are active. In an aspect, the premises device 206 can be at a location that has more than one event. For example, some arenas can be used for professional basketball games, professional hockey games, and concerts. In some aspects, the events can be at different times during the same day. A first event can occur for a first time duration and a second event can occur for a second time duration at the location. In an aspect, the event scheduler 218 can cause the proximity platform 214 to associate the premises device identifiers of the premises device 206 with the particular event that is occurring at the location at a particular time. In an aspect, the proximity platform 214 can activate or deactivate campaigns based on the events defined by the event scheduler 218. For example, an hour before a basketball game and an hour after the basketball game the event scheduler 218 can have scheduled one or more campaigns. The event scheduler 218, based on the scheduled campaigns can cause the proximity platform 214 to associate premises device identifiers of the premises device 206 with a mobile application associated with the basketball game. A first mobile application for the basketball game can be activated at that time and monitor for identifiers of the premises device 206 during the scheduled time. The campaign manager 216 can provide campaigns based on the basketball game and the mobile application for the basketball game. In an aspect, a second mobile application (e.g., application for a hockey team) can use the same premises device 206 comprising the same identifiers. However, the proximity platform 214 may have no campaigns scheduled at the time when there are campaigns scheduled for the first mobile application. Therefore, the proximity platform 214 will not deliver any campaigns relating to the second mobile application for the hockey team when the basketball game is occurring at the scheduled time. In an aspect, the proximity platform 214 can reassign identifiers to the premises device 206 when the first event is occurring so that the premises device 206 has a first set of identifiers detectable by the first mobile application. When the second event begins or for a period of time before or after the second event, the event scheduler 218 can cause the proximity platform 214 to assign a second set of premises device identifiers to the premises device 206 detectable by the second mobile application. Furthermore, the event scheduler 218 can provide information to the campaign manager 216 to determine which business rules and campaigns are active.

In an aspect, the targeted communication service 122 can comprise one or more data warehouses 220. The data warehouse 220 can comprise one or more databases such as database 114 of FIG. 1. The data warehouse 220 can store premises device identifiers for the premises device 206, associated client components 202 with premises device, profiles of users based on identifiers of user devices comprising demographic information, campaigns received by a user, content received by user, tracking of associations and dissociations times with the premises device 206, business rules for campaigns, combinations thereof, and the like.

In an aspect, the targeted communication service 122 can interface with a user information system (UIS) 222. The UIS 222 can maintain user-level demographic information of users of client components 202. The UIS 222 can request/receive user-level demographic information from one or more third party data feeds 226 described further below. The UIS 222 can manage user demographics in the data warehouse 220. The UIS 222 can retrieve user demographic information from the data warehouse 220 to provide user demographic information to other services to help determine a campaign for a particular user. The user demographic information can be organized in the data warehouse 220 under one or more identifiers of one or more user devices associated by the user. In an aspect, the UIS 222 can communicate with the proximity platform 214 to help determine what user demographic information to obtain.

In an aspect, the targeted communication service 122 can comprise an analytics dashboard 224 for a targeted campaign service administrator to manage and analyze data. The analytics dashboard 224 can be used to manage and create campaigns. In an aspect, the analytics dashboard 224 can comprise a behavioral analytics dashboard. The behavioral analytics dashboard can be used to visualize activity of end users and measure goals of the campaign directed toward the end users. Administrators can create a budget for a campaign and measure the efficacy of a campaign against those goals. End users can be segmented into control and exposed groups to determine and measure efficacy. In an aspect the behavioral analytics dashboard can be used to manage content and mobile applications as well as usage of the content and mobile applications. The analytics dashboard 224 can also comprise a Wi-Fi and location analytics dashboard. The Wi-Fi and location analytics dashboard can be used to provide analytics for Wi-Fi network performance and usage, foot traffic analytics, number of users, number of service provider users, heat maps of locations of users, websites visited, length of time at a location and/or interacting with a campaign, repeat visitors to a venue, combinations thereof and the like. The analytics dashboard 224 can also comprise analytics to analyze multicast video consumption and social networking usage of the end users. In an aspect, the analytics dashboard 224 can be configured to export user identifiers for given events, as defined by the event scheduler 218, from the analytics dashboard 224 manually or via an application program interface for integration with third party tools for analysis and customer relation management (CRM).

In an aspect, the targeted communication service 122 can comprise an interface to a third party data feed 226. In an aspect, the third party data feed 226 can comprise data of end users from third party sources such as data enrichment clearinghouses (e.g., credit reporting agencies). The third party data feed 226 can provide data of users of the targeted communication service 122 to better customize the user's experience. In an aspect, the third party data feed 226 can comprise third party services integrated with the targeted communication service 122. The campaigns of the targeted communication service 122 can invoke a third party ad engine, a ticketing platform, a game engine, a campaign measurement platform, combinations thereof, and the like.

In an aspect, the targeted communication service 122 can comprise a campaign management system (CMS) and a content delivery network (CDN) service 228. The CMS can allow for management of content provided in campaigns such as publishing content, editing content, modifying content, organizing content, deleting content, combinations thereof and the like. The CDN can comprise a system of servers deployed at multiple data centers to serve content to end users with high availability and high performance. The campaign manager 216 can interact with the CMS and the CDN services 228 to control which content is consumed by an end user or group of end users. In an aspect, the CMS and the CDN services 228 can be set as to how often an end user sees the same campaign or asset within a campaign (e.g., content or offer) within a time period or based on past viewing. For example, if a user of mobile application 208 receives an offer for a vendor at a location when the user detects a low energy beacon at a first time, then at a second time when the user detects the same low energy beacon the user can receive a different campaign. In an aspect, the CMS and the CDN services 228 can be throttled so that a user device does not receive a campaign every time the user device encounters a premises device. In an aspect, the CMS and the CDN services 228 can prioritize campaigns over one another based on factors such as type of campaign (e.g., ticketing over advertising), revenue for campaign, prior user history, and the like.

In an aspect, the targeted communication service 122 can comprise video multicasting 230. The video multicasting 230 can be used to send video to multiple users using the same bitstream which conserves network resources by reducing a number of unicast bitstreams to multiple users consuming the same content. The video multicasting 230 can be scalable in that the video multicasting 230 comprises a scalable video coding (SVC) technique. A SVC can encode a video multicast into one base layer and one or more enhancement layers. The base layer can ensure the basic video quality of all users and each additional enhancement layer enhances the quality of the video depending on the capabilities of the end user device. Video multicast consumption can be managed and analyzed by the various dashboards such as the behavioral analytics dashboard. In an aspect, multicasting can permit content to be received and cached until a condition occurs. In an aspect, the content can be associated with a location. The content can be stored for a period of time and removed from storage after the period of time outside the location.

Figure 3:
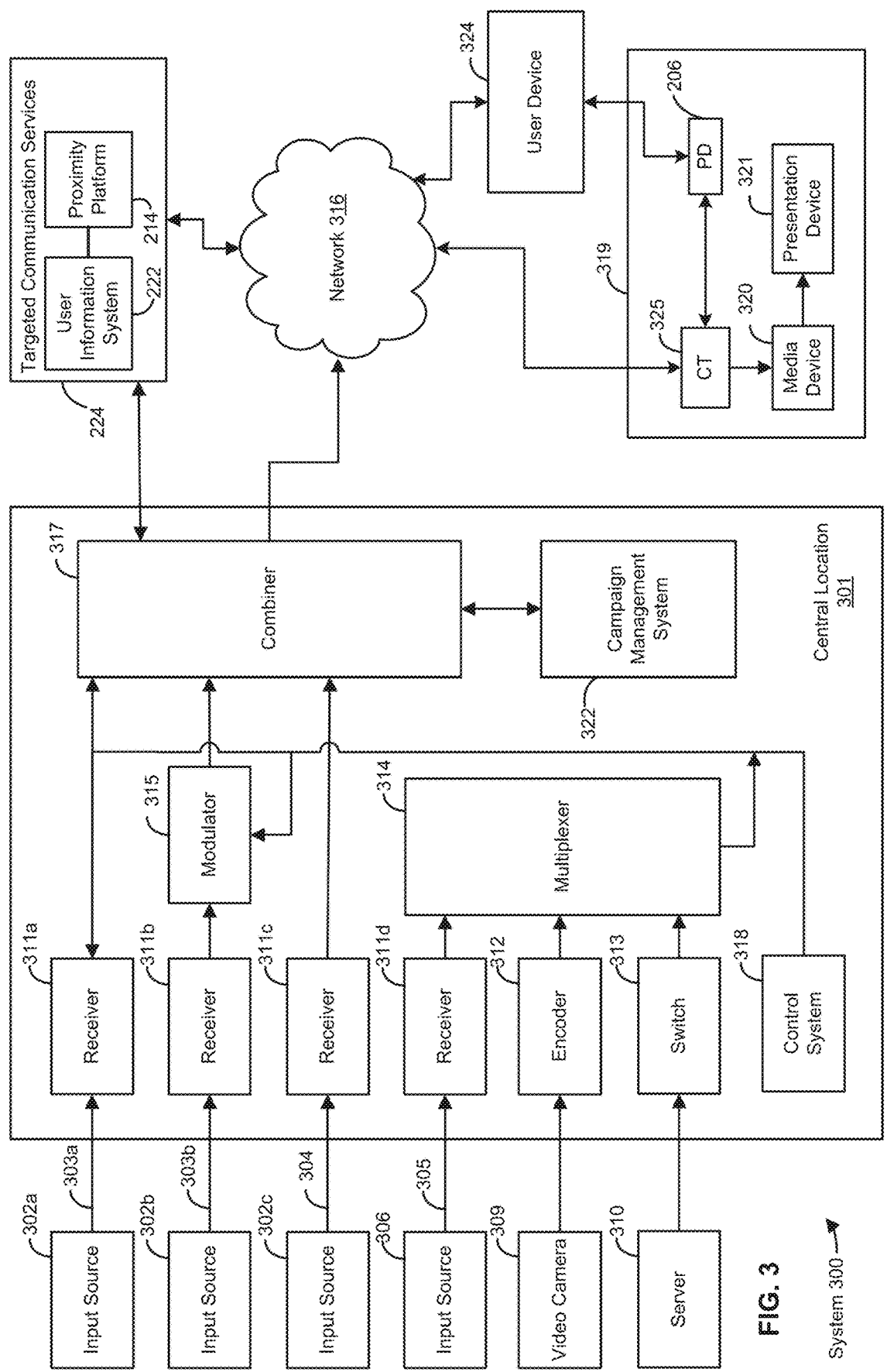
FIG. 3 is a block diagram of an example system.

FIG. 3 illustrates various aspects of an exemplary system in which the present methods and systems can operate. The present disclosure relates to a method for detecting user presence and absence and delivering campaigns based on the detected presence or absence. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 300 can comprise a central location 301 (e.g., a headend), which can receive content (e.g., data, input programming, and the like) from multiple sources. The central location 301 can combine the content from the various sources and can distribute the content to user (e.g., subscriber) locations (e.g., location 319) via a network 316.

In an aspect, the central location 301 can receive content from a variety of sources 302a, 302b, and 302c. The content can be transmitted from the source to the central location 301 via a variety of transmission paths, including wireless (e.g. satellite paths 303a, 303b) and terrestrial path 304. The central location 301 can also receive content from a direct feed source 306 via a direct line 305. Other input sources can comprise capture devices such as a video camera 309 or a content server 310. The signals provided by the content sources can include a single content item or a multiplex that includes several content items.

The central location 301 can comprise one or a plurality of receivers 311a, 311b, 311c, 311d that are each associated with an input source. For example, MPEG encoders, such as encoder 312, are included for encoding local content or a video camera 309 feed. A switch 313 can provide access to the content server 310, which can be a Pay-Per-View server, a data server, an internet router, a network system, a phone system, a Video On-Demand (VOD) server, a content server, and the like. Some signals may require additional processing, such as signal multiplexing, prior to being modulated. Such multiplexing can be performed by multiplexer (mux) 314.

The central location 301 can comprise one or a plurality of modulators 315 for interfacing to a network 316. The modulators 315 can convert the received content into a modulated output signal suitable for transmission over a network 316. The output signals from the modulators 315 can be combined, using equipment such as a combiner 317, for input into the network 316. In an aspect, the network 316 can comprise a content delivery network, a content access network, and/or the like. For example, the network 316 can be configured to provide content from a variety of sources using a variety of network paths, protocols, devices, and/or the like. The content delivery network and/or content access network can be managed (e.g., deployed, serviced) by a content provider, a service provider, and/or the like.

A control system 318 can permit a system operator to control and monitor the functions and performance of system 300. The control system 318 can interface, monitor, and/or control a variety of functions, including, but not limited to, the channel lineup for the television system, billing for each user, conditional access for content distributed to users, and the like. Control system 318 can provide input to the modulators for setting operating parameters, such as system specific MPEG table packet organization or conditional access information. The control system 318 can be located at central location 301 or at a remote location.

The network 316 can distribute signals from the central location 301 to user locations, such as a user location 319. The network 316 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 316 at one or more of the user locations. At the user location 319, a media device 320 can demodulate and/or decode, if needed, the signals for display on a presentation device 321, such as on a television set (TV) or a computer monitor. For example, the media device 320 can comprise a demodulator, decoder, frequency tuner, and/or the like. The media device 320 can be directly connected to the network (e.g., for communications via in-band and/or out-of-band signals of a content delivery network) and/or connected to the network 316 via a communication terminal 325 (e.g., for communications via a packet switched network). The media device 320 can comprise a set-top box, a digital streaming device, a gaming device, a media storage device, a digital recording device, a combination thereof, and/or the like. The media device 320 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 325, a computer, a TV, a monitor, or satellite dish.

In an aspect, the communication terminal 325 can be located at the user location 319. The communication terminal 325 can be configured to communicate with the network 316. The communications terminal 325 can comprise a modem (e.g., cable modem), a router, a gateway, a switch, a network terminal (e.g., optical network unit), and/or the like. The communications terminal 325 can be configured for communication with the network 316 via a variety of protocols, such as internet protocol, transmission control protocol, file transfer protocol, session initiation protocol, voice over internet protocol, and/or the like. For example, for a cable network, the communication terminal 325 can be configured to provide network access via a variety of communication protocols and standards, such as Data Over Cable Service Interface Specification.

In an aspect, the user location 319 is not fixed. By way of example, a user can receive content from the network 316 on a user device 324. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like.

In an aspect, the user device 324 can be located at or near the user location. The user device can comprise a user device identifier. The user device can also comprise one or more wireless communication elements. The one or more wireless communication elements can each implement a wireless communication protocol. For example, a first wireless communication element can be configured with a low energy communication protocol such as BLE. As an example, a second wireless communication element can be configured with a Wi-Fi protocol. Each wireless communication element can comprise an identifier that can be a user device identifier. As an example, the user device 324 can be an Internet Protocol compatible device for receiving signals via the network 316 such as the Internet or some other communications network for providing content to the user.

In an aspect, the location 319 can comprise a premises device 206. For example the location can have one or more wireless access points 232, one or more low energy beacons 234, and other proximity modules 236. Each premises device 206 can comprise a premises device identifier. In an aspect, the premises device 206 can be associated with one or more media devices 320. For example, a wireless access point for the location 319 can be associated with each media device for each presentation device 321 at the location 319. As another example, a low energy beacon can be associated with the media device 320. The low energy beacon 234 can be near the media device 320 such that the low energy beacon 234 represents the media deice 320 and/or the presentation device 321 when another device communicates with the low energy beacon 234. The premises device 206 and the media device 320 can be associated by premises device identifiers mapped with media device identifiers. The mappings of the premises device identifiers and the media device identifiers can be stored locally at storage in the media device 320 and/or premises device 206. In an aspect, the mappings of the premises device identifiers and the media device identifiers can be stored in database such as the data warehouse 220 of FIG. 2.

In an aspect, the premises device 206 and/or the user device 324 can be in communication with a proximity platform 214 of a targeted communication service 122 through the network 316. In an aspect, the premises device 206 and/or the user device 324 can communicate with each other when the user device 324 is within range of the premises device 206. The premises device 206 and/or the user device 324 can transmit to the proximity platform 214 when one of the premises device 206 and the user device 324 detects the other. As an example, the user device 324 can enter the location 319 and connect with a premises device 206 such as a wireless access point. An indication comprising the user device identifier and a wireless access point identifier can be sent to the proximity platform 214. The proximity platform 214 can map the user device identifier to the wireless access point identifier. In an aspect, the proximity platform 214 can also receive a mapping of the wireless access point identifiers with the media device identifiers that are at the location 319. The proximity platform 214 can obtain the mapping through the network 316, a database, combinations thereof and the like. The proximity platform 214 can use the mapping of the user identifier with the wireless access point identifier and the mapping of the wireless access point identifier and the media device identifier to associate the user identifier to the media device identifier. The proximity platform 214 can dynamically associate the user identifier to the media device identifier based on the association and dissociation of the user device 324 to the wireless access point 205.

In an aspect, the user device 324 can be configured as a central device monitoring for communications from the premises devices 206, such as low energy beacons configured as peripheral devices. Although the following describes the user device 324 as the central device and the low energy beacon as the peripheral device, in other aspects the user device 324 can be the premises device 206 and the low energy beacon can be the central device. In an aspect, the user device 324 can detect a low energy beacon transmission which can comprise a beacon identifier. In response to detecting the low energy beacon transmission comprising the beacon identifier, the user device 324 can send an indication to the proximity platform 214 over network 316 The indication can comprise the user identifier of the user device 324 and the beacon identifier. The proximity platform 214 can map the user identifier to the beacon identifier. In an aspect, the proximity platform 214 can also receive a mapping of the beacon identifier with the media device identifier of the media device 320 that is at the location 319. The proximity platform 214 can obtain the mapping through the network 316, a database, combinations thereof and the like. The proximity platform 214 can use the mapping of the user identifier with the beacon identifier and the mapping of the beacon identifier and the media device identifier to associate the user identifier to the media device identifier. The proximity platform 214 can dynamically associate the user identifier to the media device identifier based on the association and dissociation of the user device 324 to the beacon identifier.

In an aspect, the media device 320 can comprise logic. The logic in the media device 320 can monitor campaigns presented on the presentation device 321. In an aspect, the media device 320 can comprise the low energy beacon. The low energy beacon of the media device 320 can detect the one or more user devices 324 present. The logic in the media device 320 can create and/or access one or more profiles corresponding to one or more user devices 324 based on the content presented on the presentation device 321 when the one or more user devices 324 is determined to be present. In another aspect, the one or more profiles can reside on a campaign management system (CMS) 322. In an aspect the CMS 322 can be an advertisement decisioning system that can determine which advertisements to present at the presentation device 321 through the media device 320. In another aspect, the profiles can reside in a database such as the data warehouse 220 of FIG. 2, which can be accessed and analyzed by a user information system 222. The logic in the media device 320 can be in communication with the CMS 322 and can deliver targeted campaigns such as advertising to the media device 320 based on the one or more profiles associated with the one or more user devices 324 determined to be near the media device 320.

In an aspect, a media device 320 can receive signals from the network 316 for consuming content on the media device 320. As an example, consuming content can comprise providing audio and/or video, displaying images, facilitating audio or visual feedback, tactile feedback, and the like. However, other content can be consumed via the media device 320. In an aspect, the media device 320 can be a set-top box, a television, a computer, a smartphone, a laptop, a tablet, a multimedia playback device, a portable electronic device, and the like. As an example, the media device 320 can be an Internet Protocol compatible device for receiving signals via the network 316 such as the Internet or some other communications network for providing content to the user. It is understood that other presentation devices 321 and networks can be used. It is further understood that the media device 320 can be a widget or a virtual device for displaying content in a picture-in-picture environment such as on the presentation device 321, for example.

Figure 4:
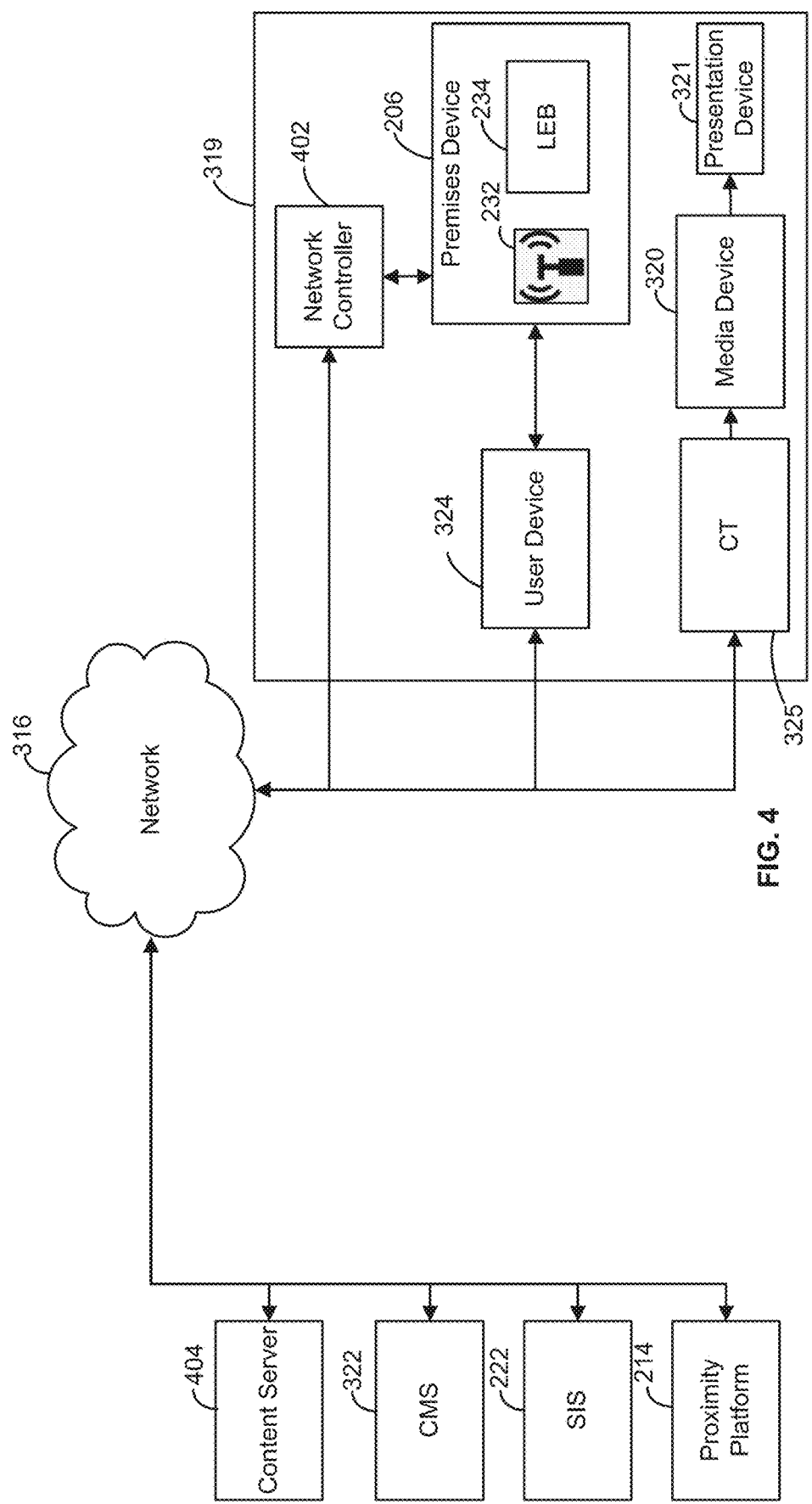
FIG. 4 is a block diagram of an example system.

FIG. 4 illustrates a block diagram of the system 300. In an aspect, a user having a user device 324 can enter a location such as location 319. In an aspect, at the location 319, a peripheral device can transmit a peripheral identifier and a central device can monitor for transmitted peripheral identifiers. In an aspect, the central device can comprise a central identifier. In an aspect, the user device 324 can be the central device, peripheral device, or both. In an aspect, where the user device 324 is the peripheral device, a premises device 206 can be a central device. In an aspect, the premises device 206 can comprise a wireless access point 232. In an aspect, the premises 206 device can comprise a low energy beacon 234 and/or the proximity module 236 of FIG. 2. In an aspect, the central devices such as the wireless access point 232, the low energy beacon 234, and/or the proximity module 236 can monitor for a user or a transmission of a peripheral identifier of the user device 324. In an aspect, the peripheral identifier can be the user device identifier. A premises device identifier associated with the premises device 206 can be the central identifier.

In various aspects, the user device 324 can be configured as the central device and the premises device 206, such as the low energy beacon 234, can be configured as the peripheral device. In various aspects, the user device 324 can monitor for transmissions of peripheral identifiers (e.g., beacon identifiers) from one or more low energy beacons 234. In an aspect, the user device 324 can monitor for one or more premises device identifiers. An application on the user device 324 can communicate to an operating system of the user device 324 to monitor for the one or more peripheral identifiers. In an aspect, the user device 324 can comprise a user device identifier which can be the central identifier.

In an aspect, the user device 324 can be configured as the central device and the peripheral device. For example, the wireless access point 232 can be configured as a central device and the user device 324 can be configured as the peripheral device. The wireless access point 232 can detect the peripheral identifier (e.g., user device identifier) of the user device 324. The wireless access point can comprise a premises device identifier that can be the central identifier. The wireless access point 232 can be in communication with a network controller 402 (e.g., network device 116 of FIG. 1) which can be in communication with the proximity platform 214 over network 316. As a further example, the user device 324 can also be configured as the central device and one or more low energy beacons 234 can be configured as peripheral devices. Each of the one or more low energy beacons 234 can transmit a peripheral identifier (e.g., beacon identifiers). The user device 324 can monitor for the peripheral identifier. The user device 324 can be in communication with the proximity platform 214 over the network 316.

In an aspect, the proximity platform 214 can receive an indication of detection between the user device 324 and the premises device 206. Which of the user device 324 and the premises device 206 that detects the other can depend on which of the user device 324 and the premises device 206 is the central device and the peripheral device. The detection can occur when the user device 324 is within communication range of the premises device 206 so as to detect a transmission of an identifier or a communication session is established between the premises device 206 and the user device 324. In an aspect, the proximity platform 214 can receive the indication from the central device which can be in communication with the proximity platform 214 via network 316. The indication can comprise the user device identifier and the premises device identifier. The proximity platform 214 can associate the user device identifier to the premises device identifier. Associating the user device identifier to the premises device identifier can indicate that the user of the user device 324 is in proximity to the premises device 206. The proximity platform 214 can monitor for associations and dissociations between one or more user devices 324 and premises devices 206 and store the associations and dissociations in a database such as the data warehouse 220.

In an aspect, the proximity platform 214 can receive a mapping of the media device 320 to one or more premises device 206. In an aspect, the media device identifier can be mapped to one or more premises device identifiers. The proximity platform 214 can receive the mapping from a request for proximity data which can be derived from a content request at the media device 320. In an aspect, the premises device 206 and the media device 320 can be mapped when installed and the mapping between the premises device 206 and the media device 320 can be stored in the data warehouse until the proximity platform 214 requests the mapping. In an aspect, upon receiving the association of the user device identifier to the premises device identifier, the proximity platform 214 can associate the user device identifier to the media device identifier by comparing and matching the premises device identifier mapped with the user device identifier to the premises device identifier mapped with the media device identifier. Correlating the user device identifier to the media device identifier can be performed when the proximity platform 214 receives the indication comprising the user device identifier or when a request is made to the proximity platform 214 to identify a user of the media device 320.

In an aspect, the proximity platform can receive a request to identify a user of the media device 320 when the media device 320 detects a content request. A user of the media device 320 can request content to be displayed on the presentation device 321. The media device 320 can send a request via the network 316 to receive the content that was requested by the user of the media device 320 from a content server 404. The content server 404 can be configured as the content server 310 of FIG. 3. In an aspect, the content from the content server 404 can comprise content slots such as advertising slots. The content server 404, components of the central location 301, the media device 320, and the like can request from the campaign management system 322 content that can fill the content slot or other campaigns that can be combined with the content requested. In an aspect, the campaign management system 322 can determine the campaign/content to fill the content slot based on user demographic information. The campaign management system 322 can request demographic information from the user information system 222 of the user interacting with the media device 320 and ultimately consuming the content presented at the presentation device 321.

In an aspect, the user information system 222 can access stored user demographic information from the data warehouse 220 and/or third party data feeds 226. In an aspect, users and user demographic information can be associated with one or more user device identifiers of one or more user devices. To determine which user demographic information to access and send to the campaign management system 322, the user information system 222 can request to identify the user of the media device 320. Based on mappings of proximity between the user device 324 and one or more premises device 206 and the mappings of the media device 320 and one or more premises device, the proximity platform can determine which user devices are in proximity to the media device 320. Proximity platform 214 can also determine the user of the user device 324. The proximity platform 214 can access stored associations of users to user devices 324 from the data warehouse. The proximity platform 214 can send the user device identifier and identifications of users of the user device 324 which are also using the media device 320.

In an aspect, the proximity platform 214, upon receiving the request to identify a user of the media device 320, can determine a confidence level that the user of a user device 324 that is detected to be in proximity to the media device 320 is the actual user of the media device 320. In an aspect, the confidence level can comprise an identity confidence level of a particular user of the user device 324. The identity confidence level is a measure of the likelihood that a particular user is the current user of the user device 324. In an aspect, the confidence level can comprise a proximity confidence level. The proximity confidence level is a measure of how close the current user of the user device 324 is to a media device 320 and/or a premises device 206 and a likelihood that the current user is in that range. The confidence level can comprise both the identity confidence level and the proximity confidence level. Based on the confidence level, the campaign management system 322 and/or user information system 222 can select which campaign is most appropriate to fill the slots of the requested content. The confidence level can be based on one or more factors. In an aspect, a factor can be the number of user devices that are mapped with one or more premises devices associated with a media device 320. For example, if there is one user device associated with media device 320, then there is a high probability that a user associated with the user device is the user interacting with the media device 320. For example, if the only user device belonging to "Mom" is detected and one of the TVs is active, then there is a high confidence level that "Mom" and her associated demographic segment is watching the presentation device 321. In some aspects, the more user devices associated with the media device 320 the confidence level is lower. However, in other aspects, more user devices do not alter the confidence level but instead alters the aggregate demographic because the proximity platform 214 assumes a composite of users.

In an aspect, a factor for determining a confidence level may be the type of premises device that is mapped with a user device 324 and media device 320. For example, a wireless access point comprising a WiFi communication protocol can have a greater range of coverage than a low energy beacon comprising a BLE communication protocol. Therefore, the wireless access point may be able to connect to a user device of a user when the user device enters the location 319 and stay connected to the user device while the user is within the location 319. However, because a low energy beacon 234 has a shorter range of coverage the low energy beacon can provide more granularity as to which user device is near the media device 320.

Furthermore, using a low energy protocol can be used to establish distance ranges of where a user device is located in comparison to the low energy beacon. For example, the ranges can be intermediate, near, and far. The distance for intermediate can be within a few centimeters, (1 cm, 2 cm, 10 cm, 100 cm, and the like) however other distances can be within the intermediate range. The distance for near can be a distance of a few meters between the low energy device and user device (e.g., 1 m, 2 m, 5 m, 10 m, and the like). However, other distances are contemplated to fall in the near range. The distance for far can be greater than 10 m (e.g., 10 m, 15 m, 20 m, 70 m, 50 m, 100 m, 450 m, and the like). However, other distances and ranges are contemplated to define the far range.

Wireless access points using protocols such as WiFi can also be used to determine the approximate distance from the wireless access point to the user device. Like low energy beacons, signal strength can be used to determine distance. A user device can detect a received signal strength indication (RSSI) of the power of received radio signals from the premises device 206 such as a wireless access point 232 or low energy beacon 234. In an aspect, the premises device 206 can detect an RSSI of the of the user device. RSSI can vary significantly based on interference from other radio waves, weather, obstructions at the location, and the like. Therefore, the RSSI levels at a location 319 can be mapped to the location 319 to help better define the distance of the user device to the premises device 206. In an aspect, approximate position of a user device can be determined based on more than one premises device RSSI measurement. The greater number of RSSI measurements from varying premises devices can be used to better approximate the actual position of the user device. For example, having three distances derived from the RSSIs of three premises devices can triangulate a location of the user device. In an aspect, inaudible tones can also be transmitted with the signal for ultrasonic confirmation of presence of a user device in a given location 319. Because ultrasound does not readily penetrate objects such as walls as RF signals do, ultrasound can be used to determine a presence within a room. In an aspect, audible sounds through automatic content recognition can also be used to determine distance.

In an aspect, a factor used to determine a confidence level by the proximity platform 214 that a user is interacting with the media device 320 can be a continued presence. In an aspect, more than one indication can be received by the proximity platform 214 of mappings between a user device identifier and a premises device identifier. An indication can be received from a first user device and an indication can be received from a second user device when the first user device and the second user device are configured as central devices. In an aspect, the indications can comprise RSSI values to the proximity platform 214. If the RSSI values are changing, the changing RSSI values could indicate that the first user device is moving around the location 319. Therefore, the user associated with the first user device having the changing RSSI values is likely not the user interacting with the media device 320 and requesting content.

In an aspect, the indication can comprise associations and dissociations between the premises device and the user devices to determine whether there is a continued presence. The proximity platform 214 can receive an indication from the user device 324 comprising the communication between the user device 324 and the premises device 206. The indication can comprise a time when the detection between the premises device 206 and the user device 324 occurred. The user device 324 can also send the proximity platform 214 an indication when the user device 324 is no longer detecting the premises device 206 or vice versa. The indication can comprise a time stamp when the user device 324 no longer detects the premises device 206 or the proximity platform 214 can log a time when the proximity platform 214 received the indication of the dissociation. In an aspect, the proximity platform 214 can comprise logic that can log a continued presence based on a threshold time period where the proximity platform 214 does not receive a dissociation indication. If the proximity platform 214 does not detect a dissociation indication from the user device 324 within the threshold time period the proximity platform 214 can log that the user device 324 has had a continued presence at the location of the premises device 206. If the there is a dissociation indication within the time threshold the proximity platform 214 can log the dissociation indication in the data warehouse 220 without a continued presence. In an aspect, the proximity platform 214 can retroactively determine whether there was a continued presence by a user based on a time threshold the time between an association indication and a dissociation indication. In an aspect, continued presences can be determined based on other methods for detecting a presence. In an aspect, continued presence can be determined based on a combination of presence detection methods such as RSSI and association/dissociation logs. In an aspect, if the user device 324 has a continued presence that exceeds a certain time threshold, the confidence level can be lowered. For example, too long of a continued presence can indicate that the user device 324 is merely charging or left somewhere for later use by the user.

In an aspect, a factor used to determine a confidence level can be the type of user device 324 that is being detected. For example, if the user device 324 is a smart phone there is a higher confidence level that when the smart phone is detected that the owner of the smart phone is the user in proximity to the premises device. This is because smart phones are mostly used by one person. If the user device detected is a tablet, the proximity platform 214 can have a lower confidence level that a particular user is using the media device 320 because a tablet can be a communal user device between many people in a household. In another example, the confidence level can be based on whether the user device 324 detected is a wearable device versus just a mobile user device. The proximity platform 214 can assume that a wearable device is more personal and therefore there is a higher confidence that the wearable device is attached to the user.

In another aspect, if there are two or more user devices associated with a single user, and two or more of those user devices have current presence in a different, non-overlapping location, then the confidence level of both may be lowered, especially if the user devices are of the same type (for example, two tablets rather than a smart phone and a tablet, in which case the smart phone may be given a higher confidence because a smart phone is more likely to be used by a single user than another type of device). In an aspect, other factors to determine a confidence level can be contemplated such as login information, time of day, type of content requested, combinations thereof, and the like.

In an aspect, the proximity platform 214 can send any user device identifier associated with the media device identifier as well as any confidence levels of any users associated with the user device identifiers to the user information system 222. The user information system 222 can retrieve user demographic information from the data warehouse 220 based on the user device identifier and the confidence level of the identified user. In an aspect, the user information system 222 can send the CMS 322 the user demographic information of the user identified as the user interacting with the media device 320. In an aspect, the user information system 222 can provide the CMS 322 with the user demographic information of the user in which the proximity platform 214 has the most confidence is interacting with the media device 320. In an aspect, the user information system 222 can provide the CMS 322 with the user demographic information of a predefined number users having the highest confidence levels. For example, the user demographic information of the users having the top three confidence levels can be sent to the CMS 322. In an aspect, the user information system 222 can be configured to send user demographic information of the users meeting a threshold confidence level. For example, user demographic information of users having a confidence level of 50% or higher can be sent to the CMS 322. In another example, user demographic information of users having a confidence level of 75% or higher can be sent to the CMS 322.

In an aspect, the CMS 322 can determine, based on the user demographic information, which campaigns to present with the content requested by the media device 320. The CMS 322 can send to the content server 404 a playlist of campaigns (e.g., content, advertisements, and the like) to insert into the content requested. The content server 404 can then select campaigns to incorporate into the requested content from the playlist of campaigns. The content server 404 can then send the content requested and the inserted campaigns to the media device 320. In an aspect, the CMS 322 can select campaigns for the playlist based on business rules. For example, the CMS 322 can select campaigns based on which campaigns for the particular user will generate the most revenue. As another example, the CMS 322 can select campaigns based on which campaigns have been consumed by the user of the media device 320 so that campaigns are not overly repetitive. As another example, the language of the campaign can be tailored to the user/users proximate to the presentation device 321. As another example of the business rule, a campaign can be selected to be inserted into the requested content based on previous purchase history or interest. In an aspect, the content server 404 can select the campaigns to be inserted based on the business rules.

In an aspect, the CMS 322 can report to a billing system which campaigns have been consumed by the user and the confidence level that a particular user viewed the campaign. The billing system can determine a charge to a provider of the campaign based on the similarity of user demographics of the user consuming the campaign to user demographics of users the provider has identified as targeted consumers and the confidence level that the user consuming the campaign is the user associated with the user demographics. The more similarity and/or higher confidence level can result in the charge being higher.

Figure 5:
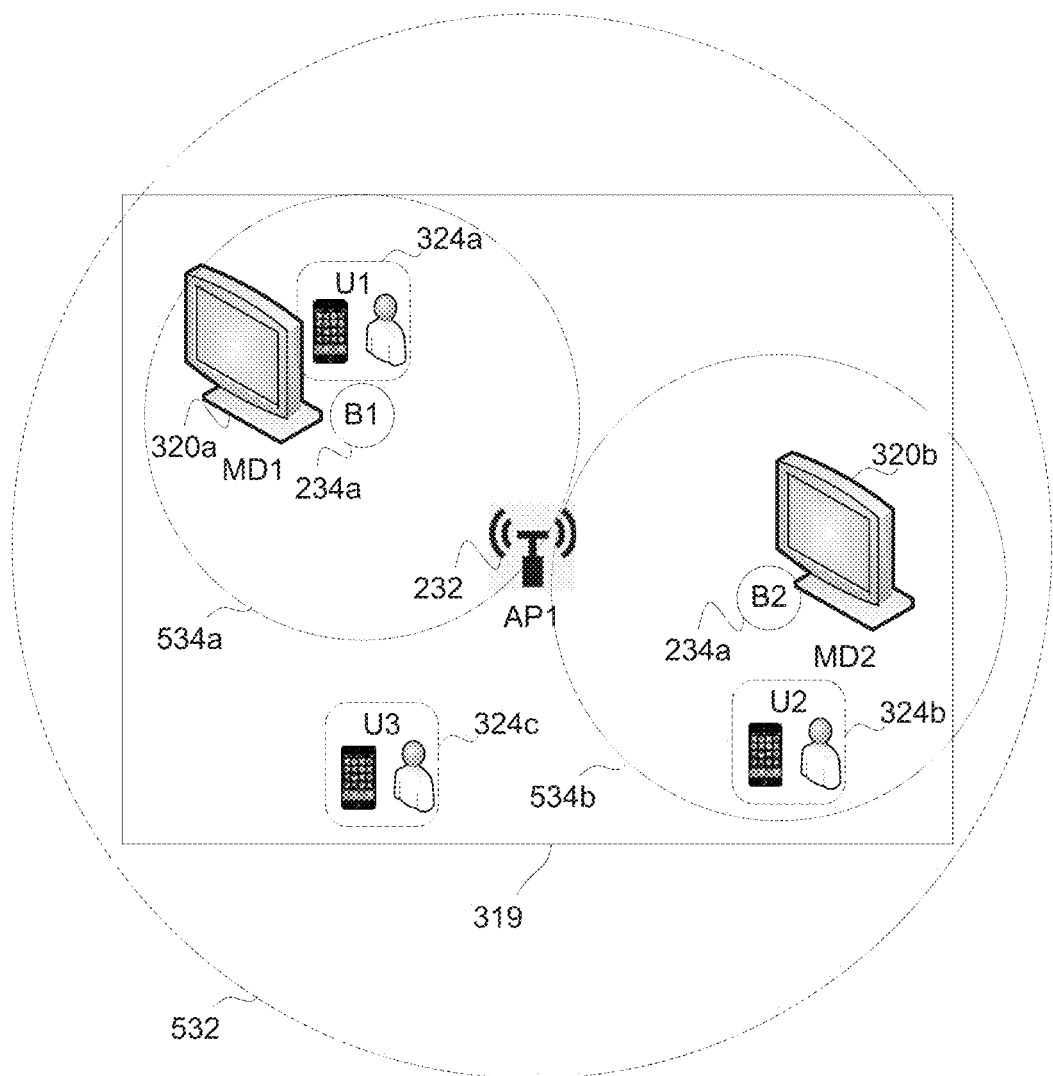
FIG. 5 is a block diagram of an example system at an example location.

FIG. 5 illustrates an example system at the location 319 comprising devices and methods described in FIG. 3 and FIG. 4. The location 319 in the example can have a plurality of premises devices 206. The premises devices 206 can comprise a wireless access point (API) 232, a first low energy beacon (B1) 234a, and a second low energy beacon (B2) 234b. The location 319 can also comprise a first media device (MD1) 320a and a second media device (MD2) 320b. The location 319 can also comprise a first user with a first user device (U1) 324a, a second user with a second user device (U2) 324b, and a third user with a third user device (U3) 324c. In an aspect, the AP1 232 can have a signal range 532 and can comprise an access point identifier that is associated with a first media device identifier of MD1 320a and a second media device identifier of MD2 320b. A first beacon identifier transmitted by B1 234a can be associated with the first media device identifier and can have a signal range 534a. A second beacon identifier transmitted by B2 234b can be associated with the second media device identifier and can have a signal range 534b.

FIG. 5 illustrates the location 319 at a point in time. If U1 324a, U2 324b, and U3 324c enter the location 319 or are activated within the location 319 and U1 324a, U2 324b, and U3 324c are authorized to establish a connection with the AP1 232, an association can be made between each user device and the AP1 232. An indication can be sent for each association made between the user devices U1 324a, U2 324b, and U3 324c and the AP1 232 to the proximity platform 214. Furthermore, at the point in time U1 324a can be within the signal range 534a of B1 234a. Also, U2 324b can be within the signal range 534b of B2 234b. An indication can be sent to the proximity platform 214 that there is a detection between B1 234a and U1 324a. An indication can be sent to the proximity platform 214 that there is a detection between B2 234b and U2 324a. The indication can comprise user device identifiers U1 324a and U2 324b as well as the associated beacon identifiers of B1 234a and B2 234b. The proximity platform 214 can determine one or more users associated with each user device identifier. The proximity platform 214 can map user device identifiers to the media device identifier of MD1 320a and media device identifier of MD2 320b through shared premises device identifiers.

As an example, a user of U1 324a can request content at MD1 320a. The proximity platform 214 can receive a request for a user of MD1 320a. The proximity platform 214 can determine possible users of MD1 320a by searching the mappings of user identifiers to the media device identifier of MD1 320a. The proximity platform 214 can determine that U1 324a, U2 324b, and U3 324c are associated with MD1 320a through access point 232 and that U1 324a is associated to MD1 320a through B1 234a. Therefore, because U1 324a is associated with the MD1 320a through both the AP1 232 and B1 234a, the proximity platform 214 can assign a higher confidence level to the identified user of the U1 324 than a confidence level of the users of U2 324b and U3 324c. The proximity platform 214 can send, in response to the request for content at MD1 320a, the user device identifier of U1 324a, the identified user of the U1 324a, and the confidence level that the user of U1 324a is the user of the MD1 320a.

Figure 6:
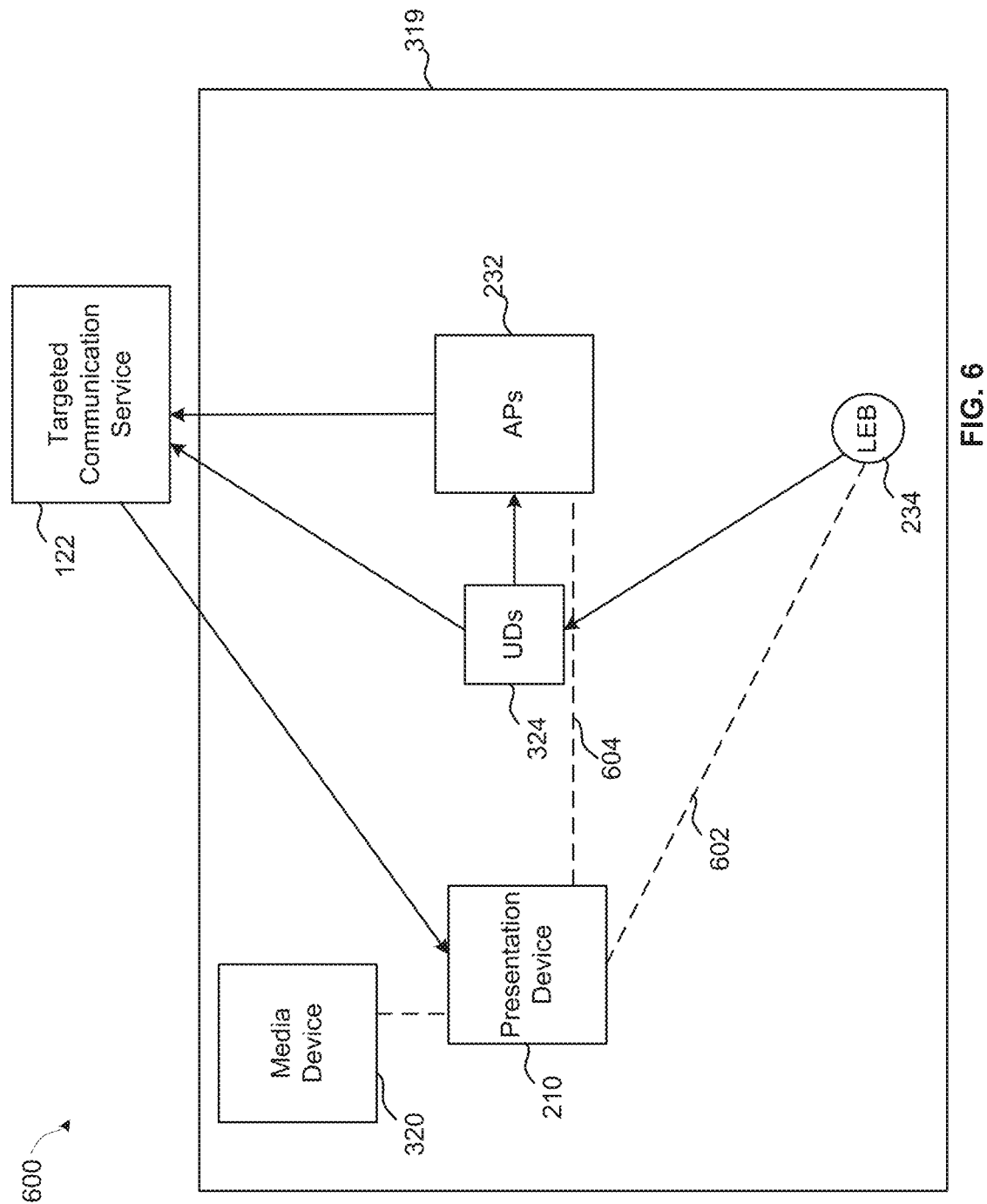
FIG. 6 is a block diagram of an example system.

FIG. 6 illustrates a system 600 where targeted campaigns can be presented at presentation devices 210 without interaction by the user with a media device 320 of FIG. 3. In an aspect, the location 319 can be a venue such as a sports arena, a stadium, a mall, a theme park, an office building, and the like that has a plurality of presentation devices 210 placed or scattered throughout the location 319. In an aspect, the presentation device 210 can be digital signage where advertisements, other campaigns, or any information or content can be displayed. In an aspect, the presentation device 210 can be a standalone display device and/or audio device or have a media device 320 in communication with the presentation device 210. In an aspect, the presentation device 210 can be associated with one or more premises devices 206. For example, the presentation device 210 can be associated with a low energy beacon 234 and/or a wireless access point 232. In an aspect, a premises device identifier (e.g., a beacon identifier, access point identifier, and the like) can be associated with a presentation device identifier of the presentation device 210. Line 602 illustrates an association between the low energy beacon 234 and the presentation device 210. Line 604 illustrates an association between the wireless access point 232 and the presentation device 210.

In an aspect, a user of a user device 324 can enter the location 319 and associate with the nearest wireless access point 232. The association can be logged with the targeted communication service 122 and stored in the data warehouse 220. The association can comprise the time the association was made and a user device identifier of the user device 324 and an access point identifier of the wireless access point 232.

In an aspect, the user can authenticate the user device 324 by logging into the service provider of the wireless access point 232. The authentication can include user credentials that can identify a user of the user device 324. An authentication event can be logged with the targeted communication service 122 including the user credentials. In an aspect, based on the user credentials, the targeted communication service 122 can access user demographic information. In an aspect, there may not be an authentication by the user of the user device 324 and the targeted communication service 122 can identify a user based on known users of the user device 324 that is associated with the wireless access point 232. As the user roams within the location 319, the user can transition from the wireless access point 232 to other access points. The targeted communication service 122 can log the associations and dissociations from various wireless access points at the location 319. In an aspect, the targeted communication service 122 can determine a campaign to present to the presentation device 210 based on one or more user devices communicating with the wireless access point 232 that is associated with the presentation device 210 for a given time period. The time period can be the length of the campaign being presented on the presentation device 210. The proximity platform 214 can determine which users and user devices 324 are in proximity to the presentation device 210 for the user information system 222 to determine user demographic information. The targeted communication service 122 can comprise a campaign management system that can determine which campaigns to present at the various presentation devices 210. The campaigns can be incorporated with other content from a content server or can be presented separately.

In an aspect, the location 319 can comprise one or more low energy beacons 234. The one or more low energy beacons 234 can provide a finer granularity of proximity detection of user devices 324 because of the shorter range of the low energy beacon signal. In an aspect, the one or more low energy beacons 234 can comprise a beacon identifier. In an aspect, the beacon identifier can be mapped to a presentation device identifier. In an aspect, the one or more low energy beacons 234 can transmit a beacon identifier. In an aspect, the user device 324 can comprise an application that is configured to have an operating system of the user device 324 monitor for one or more beacon identifiers. In an aspect, if the beacon identifier of the low energy beacon 234 is a beacon identifier for which the user device 324 is monitoring, then the user device 324 can detect the low energy beacon 234. The user device 324 can send an indication to the targeted communication service 122, comprising the user device identifier and the beacon identifier, that an association between the user device 324 and the low energy beacon 234 was made. The user device 324 can continue to monitor for the beacon identifier at various time intervals (e.g., 0.1 seconds, 1 second, 5 seconds, 10 seconds, 1 minute, and the like). When the user device 324 no longer detects the beacon identifier, then the user device 324 can communicate to the targeted communication service 122 that the user device 324 is dissociated with the low energy beacon 234. In an aspect, the user device 324 can communicate to the targeted communication service 122 through the wireless access point 232. In an aspect, the user device 324 can communicate to the targeted communication service 122 through a cellular data network.

In an aspect, based on the mapping between the beacon identifier and the user device identifier and the mapping of the beacon identifier and the presentation device identifier, the proximity platform 214 of the targeted communication service 122 can map the user device identifier to the presentation device identifier where the beacon identifiers are the same. In an aspect, the proximity platform 214 can determine a user of the user device 324 and a confidence level that the user is in viewing range of the presentation device 210 based on mapping of the user device identifier to the presentation device identifier. In an aspect, the targeted communication service 122 can determine user demographic information of the users that are associated with the presentation device 210. The targeted communication service 122 can determine a campaign to present at presentation device 210 based on the user demographic information of the user device 324 or aggregated user demographic information of other user devices associated with the presentation device 210.

In an aspect, the targeted communication service 122 can receive a plurality of indications where each indication results from a detection of a user device 324 to a premises device such as the wireless access point 232 and low energy beacon 234. The indication can comprise a user device identifier of the user device 324 and a premises device identifier of the premises device. In an aspect, the indication can comprise any user identifiers of a user using the user device 324 such as authentication data. In an aspect, the targeted communication service 122 can store a mapping of a presentation device identifier of a presentation device 210 that is associated with the premises device identifier of the premises device. In an aspect, the targeted communication service 122 can map a user device identifier to the presentation device identifier based on equivalent premises device identifiers. In an aspect, the targeted communication service 122 can determine a confidence level for each user of the plurality of user devices is within a presentation area of the presentation device 210 associated with the premises device (e.g., the wireless access point 232 and/or the low energy beacon 234). In an aspect, the confidence level can comprise position information of the plurality of user devices in relation to the presentation device 210. In an aspect, the targeted communication service 122 can determine a first campaign to provide to the presentation device 210. Determining the first campaign can be based on the confidence levels for each of the user devices associated with the presentation device 210 and the user demographic information. In an aspect, the first campaign can be transmitted to the presentation device 210. The first campaign can be consumed at the presentation device 210.

In an aspect, the targeted communication service 122 can determine a continued presence of one or more user devices of the plurality of user devices 324 determined to be proximate to the presentation device 210 when the first campaign was determined. The continued presence can be determined based on the log of associations and dissociations of user devices 324. In an aspect, continued presence can also be determined by garnering additional information from or about a user device. For example, a user device 324 can provide information regarding its orientation and altitude. When these measurements change, the proximity platform 214 can assume that the user device 324 is moving, however slightly, thus indicating that a user is interacting with the user device 324, and that the user device 324 has not been left somewhere. Separately, a WiFi connected device is likely to have changing RSSI levels as the user device 324 moves closer to or further from a wireless access point. The RSSI levels can be transmitted by the WiFi infrastructure to the proximity platform, giving more information than a binary indication of a user's continued presence.

In an aspect, the user device 324, the low energy beacon 234, and/or the wireless access point 232 can send an indication to the targeted communication service 122 when there is no longer a detection between the user device 324 and the low energy beacon 234 and/or the wireless access point 232. The indication of dissociation can comprise the user device identifier and the premises device identifier. The targeted communication service 122 can log the dissociations in the data warehouse 220. In an aspect, the targeted communication service 122 can determine whether a user device has maintained a continued presence by querying the data warehouse 220 to determine which user devices 324 have been associated with the presentation device 210 continuously for a time period. The targeted communication service 122 can then determine a second campaign to transmit to the presentation device 210 to be presented. The second campaign can be determined based on the user identifier of one or more user devices that have been determined to have a continued presence and based on the confidence levels for each of the users of the user devices 324. The targeted communication service 122 can then transmit the second campaign to the presentation device 210 for the presentation device 210 to present.

Figure 7:
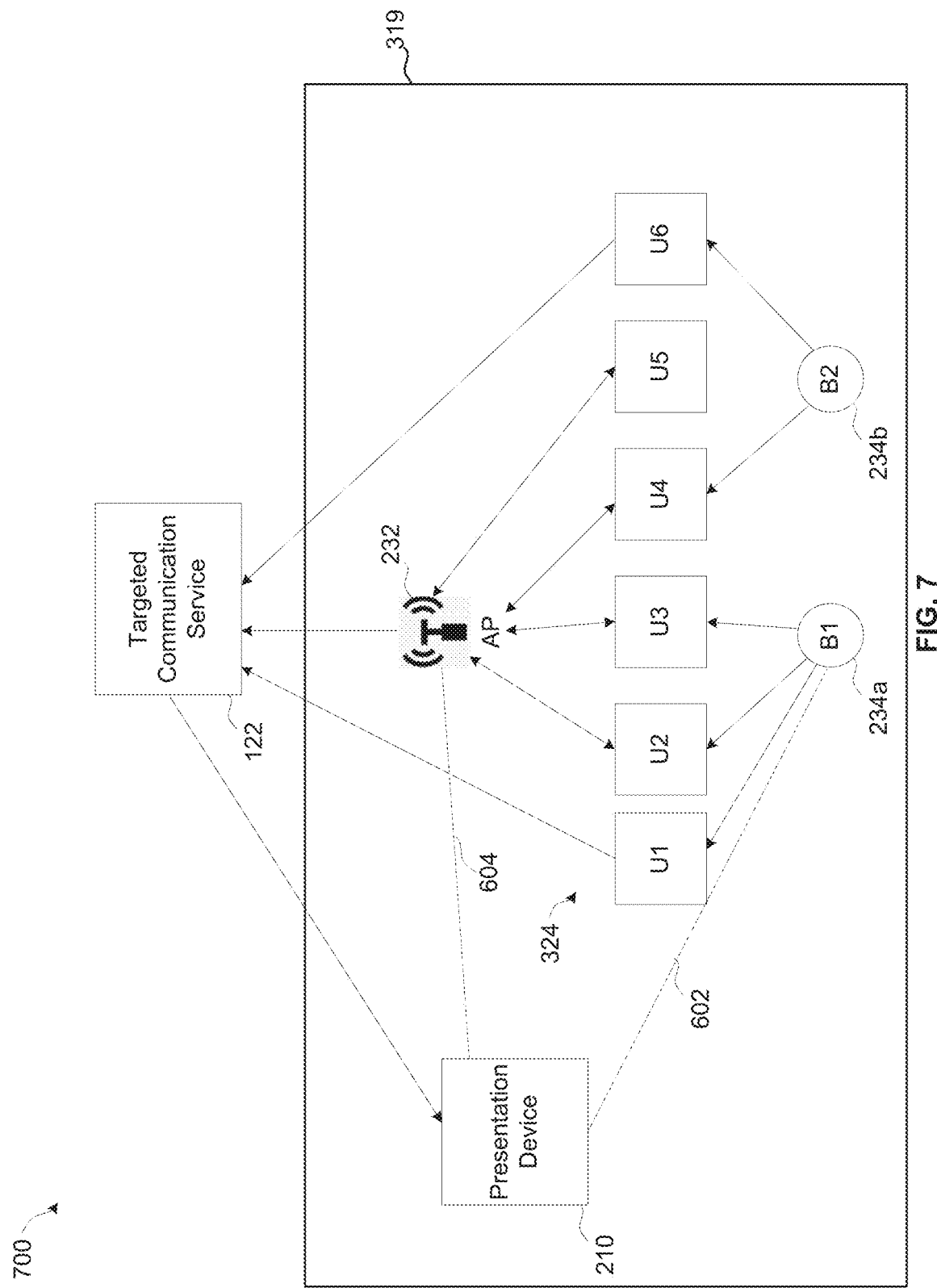
FIG. 7 is a block diagram of an example system.
Figure 8:
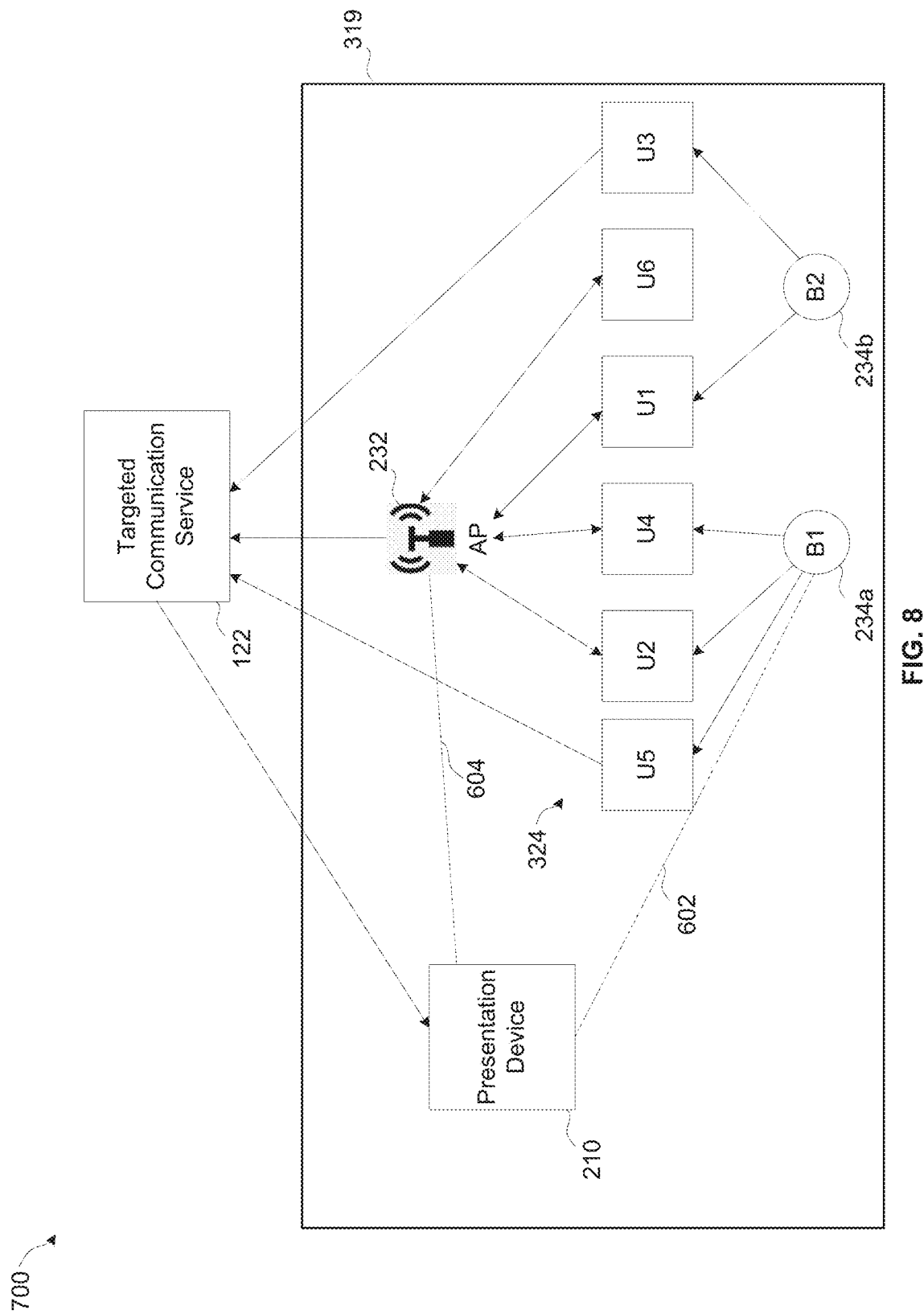
FIG. 8 is a block diagram of an example system.

FIG. 7 and FIG. 8 illustrate an example system 700 at a location 319. FIG. 7 illustrates the system 700 at a first time according to various aspects. The system 700 can comprise a presentation device 210 that is associated with a premises device such as the premises device 206 of FIG. 2. The premises device can be a wireless access point (AP) 232 and/or a first low energy beacon (B1) 234a. A line 604 and a line 602 represent associations between the presentation device 210 and the AP 232 or the B1 234a, respectively. In an aspect, the AP 232 can be in communication with the targeted communication service 122 over a network. In an aspect, the system 700 can comprise other premises devices such as a second low energy beacon (B2) 234b. The location 319 can comprise a plurality of user devices 324 (U1, U2, U3, U4, U5, and U6) in communication with the system 700. As an example, at the first time, U1 can detect a transmitted beacon identifier of B1 234a. U1 can send an indication through a cellular data network that U1 has detected B1 234a. The indication can comprise the beacon identifier of B1 234a and the user device identifier of U1. As a further example, U2 and U3 can be detected by AP 232 and U2 and U3 can detect a beacon identifier of B1 234a. The AP 232 can send an indication for each detection to the targeted communication service 122 comprising the user device identifiers of U2 and U3 as well as the access point identifier of AP 232. U2 and U3 can each send an indication to the targeted communication service 122 comprising the beacon identifier of B1 234a and the user device identifier respectively. An indication can be sent to the targeted communication service 122 for the detection between U4 and AP 232, U5 and AP 232, U4 and B2 234b, and U6 and B2 234b.

The targeted communication service 122 can determine a confidence level for each user device 324 as to the proximity of the user devices 324 to the presentation device 210 and/or each user of the user device 324. U1-U5 can be mapped to the presentation device 210 due to common premises devices (e.g., AP 232 and B1 234a). Because U6 is not mapped to presentation device 210, a confidence level is not determined. The confidence level is not determined because there is a very low likelihood that a particular user of U6 will consume the campaign at the presentation device 210. The targeted communication service 122 may determine the confidence levels from highest to lowest of U1-U5 as U2 and U3 having the highest confidence level because of their association to two premises devices that are mapped to the presentation device 210. U1 can have the next highest confidence level because it is associated with B1 which has a shorter communication range which can indicate that the user of U1 is close to the presentation device 210. However, the targeted communication service 122 may not know with complete certainty the user of U1 because the user has not authenticated the user's self through the AP 232. As another example, U1 can be a tablet rather than a mobile phone which is more likely to be a communal device for a family resulting in a possibility of more than one user. U5 can have the next highest confidence level because U5 is only associated with AP 232. Since AP 232 can have a greater signal range than B1, U5 can be further away so there is less certainty U5 is within viewing range of the presentation device 210. U4 can have the lowest confidence level. Even though U4 has an association with AP 232, U4 also has an association with B2 234b which is not mapped to presentation device 210. B2 can be far away from presentation device 210. Therefore, the targeted communication service 122 can determine that it is unlikely for a user of U4 to be able to consume the campaign at presentation device 210.

Based on all of the confidence levels and identified users of U1-U5, the targeted communication service 122 can determine a first campaign to present at the presentation device 210. The targeted communication service 122 can determine the first campaign based on aggregated user demographic data of U1-U5. As another example, the targeted communication service 122 can determine the first campaign based on user demographic data of the users of user devices 324 that have a threshold confidence level. The targeted communication service 122 can transmit the first campaign to the presentation device 210.

After a time period between the first time of FIG. 7 and a second time of FIG. 8, the targeted communication service 122 can determine whether there is a continued presence of any of the user devices U1-U6 and premises devices B1 234a, B2 234b, and AP 232. An indication can be sent to the targeted communication service 122 for the detection between U5 and B1 234a, U2 and AP 232, U2 and B1 234a, U4 and AP 232, U4 and B1 234a, U1 and AP 232, U1 and B2 234b, U6 and AP 232, and U3 and B2 234b. Dissociations during the time period between the user devices 324 U1-U6 and the premises devices can also be logged with the targeted communication service 122. Because U2 was the only user device 324 to not dissociate with both AP 232 and B1 234a during the time period between the first time in FIG. 7 and the second time in FIG. 8, the targeted communication service 122 can determine that U2 has a continued presence at or near the presentation device 210. The targeted communication service 122 can determine a second campaign to transmit to the presentation device 210 for the presentation device 210 to present based on the user demographic information of the user of U2. In another example, another user device 324 can have a continued presence at presentation device 210 and the second campaign can be determined based on the aggregated user demographic information of a user of U2 and users of other user devices 324. After determining the second campaign, the targeted communication service 122 can transmit the second campaign to the presentation device 210 to be presented at the presentation device 210 for the users to consume the campaign. In another aspect, the second campaign can be sent to U2 for the user of U2 to view on U2. A third campaign and/or a different asset of the second campaign can be sent to the presentation device 210 based on aggregated user demographic information.

Figure 9:
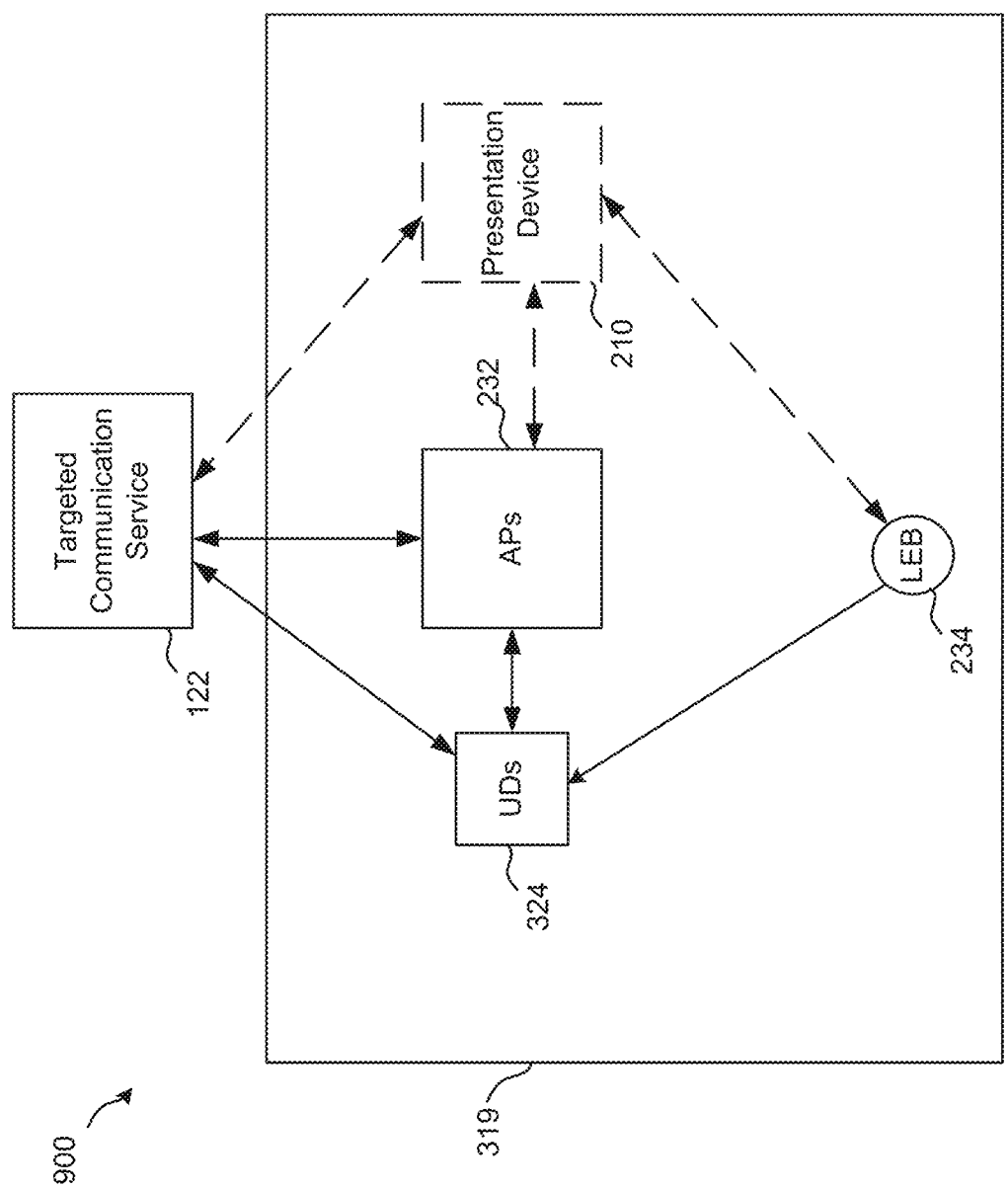
FIG. 9 is a block diagram of an example system.

FIG. 9 illustrates an example system 900 according to various aspects. In an aspect, the location 319 can comprise one or more wireless access points 232, one or more low energy beacons 234, and optionally one or more presentation devices 210. In an aspect, a detection can be made between a wireless access point 232 and a user device 324 of one or more user devices 324. An indication can be transmitted to and received by the targeted communication service 122. The indication can comprise a user device identifier and a premises device identifier (e.g., beacon identifier, access point identifier). The targeted communication service 122 can utilize the premises device identifier to determine a campaign that is associated with the premises device identifier. The targeted campaign service can send the campaign to an optional presentation device 210 that is associated with the premises device identifier. In an aspect, the targeted communication service 122 can send the campaign directly to the user device 324 that has an association with the premises device identifier. As an example, the low energy beacon 234 can broadcast a beacon identifier. A user device 324 can monitor for beacon identifiers including the beacon identifier of the low energy beacon 234. The user device 324 can detect the beacon identifier and send an indication to the targeted communication service 122 that comprises the beacon identifier and the user device identifier of the user device 324. The targeted communication service 122 can send a campaign to the user device 324. The campaign can be specific to the low energy beacon 234 or if there are several campaigns associated with the beacon identifier of the low energy beacon 234 then the targeted communication service 122 can make a determination as to the identity of the user of the user device 324. The targeted communication service 122 can determine a confidence level as to the identity of the user of the user device 324. The targeted communication service 122 can determine a campaign to send to the user device 324 based on the confidence level. In an aspect, the campaign can be determined based on a continued presence. In an aspect, the targeted campaign service can record which campaigns have been presented to the user device 324. If a campaign has been presented to the user device 324 a number of times that exceeds a threshold for a period of time, then the targeted communication service 122 can stop transmitting the campaign to the user device 324 until the time period has passed or the targeted communication service 122 can determine a second campaign to transmit to the user device 324 instead of the original campaign.

In an aspect, the campaign can be based on the access point identifier of the wireless access point 232. The wireless access point 232 can send one or more indications to the targeted communication service 122 comprising the user device identifier of all the user devices 324 associated with the wireless access point 232 as well as the wireless access point identifier. The targeted communication service 122 can determine one or more campaigns that are associated with the access point identifier. The targeted communication service 122 can transmit the campaign to each user device 324 that is associated with the wireless access point 232. In an aspect, the targeted communication service 122 can comprise video multicasting 230 of FIG. 2. The targeted communication service 122 can transmit the multicast campaign to the user devices 324. The multicast can comprise a base data layer with one or more enhancement data layers that further enhance the base data layer that provides minimum requirements to consume the campaign. Multicasting allows for a server to transmit as single data stream to multiple recipients where the user device can then decode the data layers necessary based on the user device's capabilities. Video multicasting can reduce bandwidth consumption on the network. In an aspect, multicasting can permit content to be received and cached until a condition occurs to present the content for the campaign. In an aspect, the content can be associated with a location. The content can be stored for a period of time on the user device 324 and removed from storage after the period of time expires. In an aspect, the content can be stored while the user device 324 is associated with one or more of the wireless access points 232 and/or the low energy beacons 234 at the location 319. Once the user device 324 leaves the location 319 and is no longer associated with any of the wireless access points 232 and/or the low energy beacons 234 the stored content can be removed from the storage of the user device 324

Figure 10:
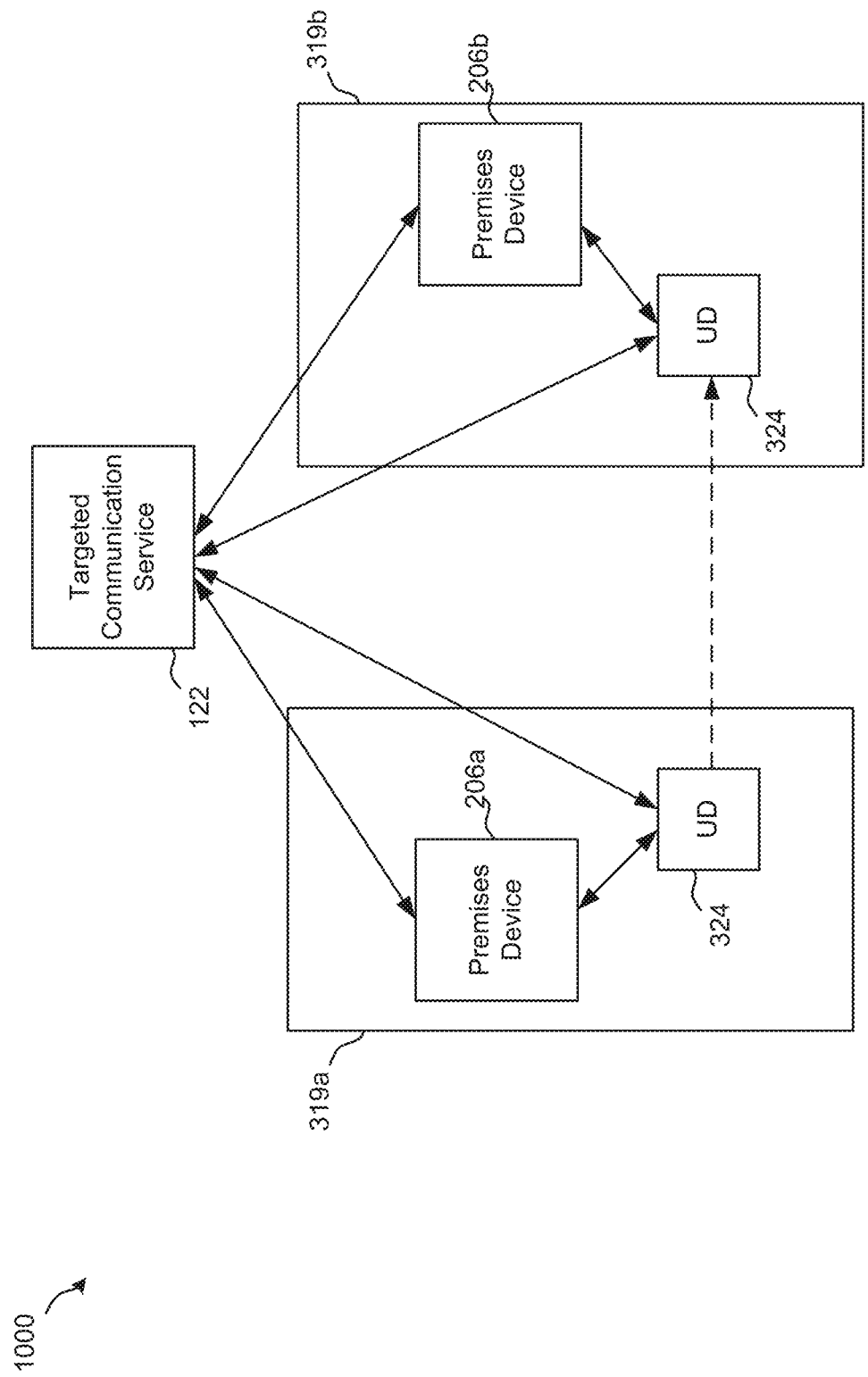
FIG. 10 is a block diagram of an example system.

FIG. 10 illustrates a block diagram of a system 1000 according to various embodiments. In an aspect, the targeted communication service 122 can be configured to provide a campaign to a user of a user device 324 or a user near a presentation device 210 (not shown) based on more than one campaign and/or more than one campaign provider. In an aspect, the user device 324 can monitor for one or more predetermined premises device identifiers such as a beacon identifier. In an aspect, the user device 324, while traversing space, can detect a first predetermined premises device identifier from a first premises device 206a. In an aspect, the user device 324 can transmit an indication of the detection between the user device 324 and the first premises device 206a to the targeted communication service 122. The indication can be stored as an association of the user device 324 and the first premises device 206a. The indication can comprise the user device identifier and the premises device identifier. In an aspect, the association of the user device 324 to the first premises device 206a can comprise a time stamp, the user device identifier, and the premises device identifier. In an aspect, the user device 324 can store the detection of the transmission of the first premises device identifier locally at the user device 324.

In an aspect, the user device 324 can traverse from the first location 319a to a second location 319b. In an aspect, the user device 324 can monitor for one or more predetermined premises device identifiers such as a beacon identifier. In an aspect, the user device 324, while traversing from the first location 319a to the second location 319b, can detect a second predetermined premises device identifier from a second premises device 206b. In an aspect, the user device 324 can transmit an indication of the detection between the user device 324 and the second premises device 206b to the targeted communication service 122. The indication can be stored as an association of the user device 324 and the second premises device 206b. The indication can comprise the user device identifier and the second predetermined premises device identifier. In an aspect, upon receiving the second predetermined premises device identifier at the targeted communication service 122, the targeted communication service 122 can determine whether a campaign is associated with the second predetermined premises device identifier. If there is a campaign associated with the second predetermined premises device identifier, then the targeted communication service 122 can determine whether any conditions are required before activating the campaign for the user device 324. In an aspect, a condition can be the detection of the first predetermined premises device identifier at a certain time. The targeted communication service 122 can query the associations stored within the data warehouse 220. In an aspect, upon determining that the condition of the first predetermined premises device identifier was detected by the user device 324, then the campaign can be activated for the user device. The targeted communication service 122 can send the campaign to the user device 324 for the user of the user device 324 to consume.

An example of this aspect can be a cross platform campaign where one entity is associated with another entity for providing a campaign. For example, a user of the user device 324 can go to a local sporting event at first location 319a such as a sports venue. The sports venue can have a plurality of first premises devices 206a such as low energy beacons scattered throughout the sports venue. Each of the plurality of low energy beacons can have a first premises device identifier such as a beacon identifier that each of the plurality of low energy beacons transmits. Furthermore, the second location 319b can be a local restaurant that can have a campaign which activates if one or more business rules are satisfied. The business rules can comprise a condition that if a customer of the local restaurant attended the sporting event the night before, the customer can receive a coupon when the customer visits the local restaurant and/or other conditions are met. For example, the sports team may have needed to win for the campaign to activate. The user of the user device 324 can detect a beacon identifier in the sports venue and an association can be made and stored at the targeted communication service 122. The next day, when the user enters the local restaurant, an application for the sports event or an application for the local restaurant can cause the operating system of the user device 324 to monitor for transmissions of second premises device identifiers from second premises devices 206b. The local restaurant can have one or more second premises devices 206b (e.g., low energy beacons and/or a wireless access point) transmitting second premises device identifiers. Upon associating the user device 324 with one of the second premises devices 206b, the targeted communication service 122 can determine whether there are any campaigns associated with a detection of the second premises device identifiers of the local restaurant. If there is a campaign associated with the detection, the targeted communication service 122 can determine whether there are any other conditions associated with the campaign that need to be fulfilled before the campaign can be transmitted to the user device. One such condition can be that the user attended the previous night's sports venue. The targeted communication service 122 can access the data warehouse 220 to determine whether the user device 324 was at the sports venue. The targeted communication service 122 can search for the user device identifier to determine whether any other associations that were made between the user device 324 and a first premises device 206a. If any of the premises device identifiers associated with the user device identifier match the first premises device identifiers that the targeted communication service 122 is searching for to satisfy the campaign, then the targeted communication service 122 can cause the user device 324 to present the user with the campaign (e.g., coupon) of the local restaurant.

In a related example, a first location 319a can serve as an entitlement for campaign delivery at a second location 319b within a defined time period. For example, a user device 324 can make an association with a first premises device 206a. The association can cause an entitlement to a campaign such as content. For example, if the user device 324 of a user made an association with a first premises device 206a at a stadium the previous night, the user can gain entitlement to watch highlights of last night's game on demand at home (e.g., second location 319b) because the user attended the game. In an aspect, entitlement is confirmed by the conditions triggered by the proximity platform 214. The entitlement can be generated by the targeted communication service 122 or a third party entitlement engine. In an aspect, the entitlement can have an expiration and the targeted communication service 122 can comprise an accounting system to capture content viewed for payment to the content programmers based on viewership.

Figure 11:
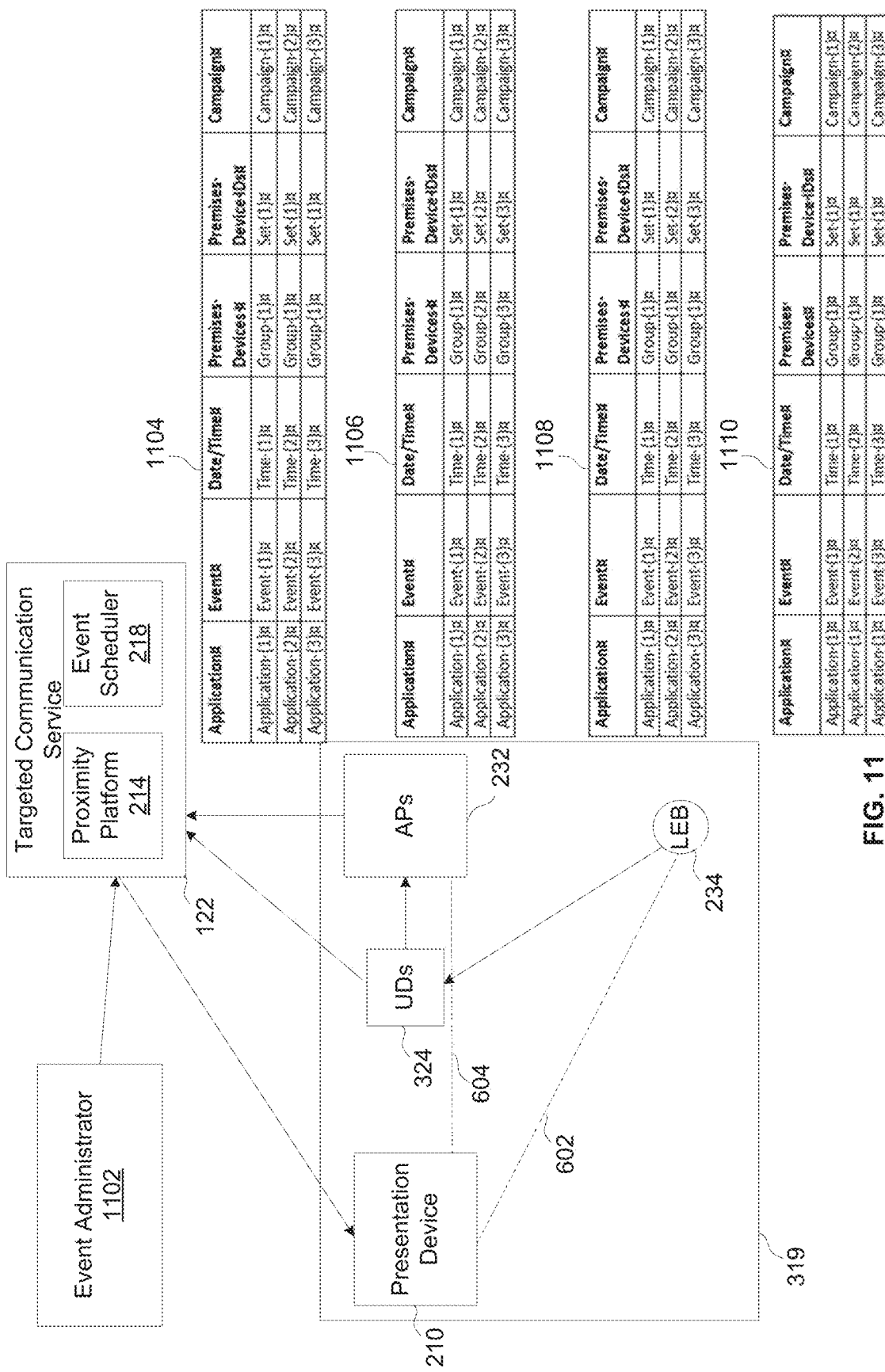
FIG. 11 is a block diagram of an example system.

FIG. 11 illustrates a block diagram of an example execution of an event scheduler 218 for a given location 319, according to various aspects. In an aspect, a location 319 can have a plurality of events scheduled at the location 319 and/or multiple applications can be used at the location 319. For example, an arena can have multiple teams, concerts, conventions, and the like taking place at different times at the arena. In an aspect, an event administrator 1102 for the location 319 can create an event schedule (e.g., event schedules 1104, 1106, 1108, and 1110) for a plurality of events (e.g., event(1), event(2), and event(3) of the event schedule 1104) at the location 319. The event administrator 1102 can create the event schedule for the location 319 with the event scheduler such as event scheduler 218 of the targeted communication service 122 of FIG. 2. In an aspect, the event administrator 1102 can input the various times and dates (e.g., time(1), time(2), and time(3) of the event schedule 1104) of each of the plurality of events. The event scheduler 218 can then cause the proximity platform 214 to assign one or more premises devices (e.g., group(1) of the event schedule 1104) and/or respective premises device identifiers (e.g., set(1) of the event schedule 1104) to each of the plurality of events. The proximity platform 214 can map the one or more premises devices and/or respective premises device identifiers to one or more applications (e.g., application(1), application(2), application(3) of the event schedule 1104) of user devices 324 that support the event, campaigns (e.g., campaign(1), campaign(2), and campaign (3) of the event schedule 1104) mapped with the event, time of the event, combinations thereof and the like. The applications can be one or more of a hockey team application, a basketball team application, a concert application, a convention application, a vendor application, a general location application for a particular venue, and the like. In an aspect, the proximity platform 214 can dissociate applications from premises device identifiers that are mapped with a different event than that of a current event.

In an aspect, an event schedule 1104 of FIG. 11 illustrates an example of how the event scheduler 218 can reassign a first group (e.g., group(1)) of premises devices having static premises device identifiers (e.g., set(1)) to various events (e.g., event(1), event(2), and event(3)) and applications (e.g., application(1), application(2), and application(3)) based on time (e.g., time(1), time(2), and time(3)).

In an aspect, the proximity platform 214 can refer to the event scheduler 218 to determine that a first event (e.g., event(1)) is scheduled to begin. The proximity platform 214 can determine that the first event is scheduled to begin by monitoring time and comparing the time to a scheduled time (e.g., time(1)) when the first event occurs. In an aspect, after determining that the first event is scheduled to begin, the proximity platform 214 can send an indication to the one or more user devices 324 having a first application (e.g., application(1)) corresponding to the first event beginning. The indication can cause the first application to monitor for the one or more premises device identifiers (e.g., set(1)) transmitted by one or more premises devices (e.g., wireless access point 232 and/or low energy beacon 234) at the location 319 during the first event. The one or more premises devices can be part of a first group of premises devices (e.g., group(1)). In an aspect, the indication can cause any other applications, such as a second application (e.g., application (2)), associated with the location 319 and not associated with the first event to discontinue monitoring for the premises device identifiers. In an aspect, the first application can cause the user device 324 to continue monitoring for the one or more premises device identifiers of the location until the end of the event. In an aspect, a first campaign (e.g., campaign(1)) can be associated with the event and the premises device identifiers. In an aspect, the indication can comprise an end time indicating when to discontinue monitoring for premises device identifiers. In an aspect, the proximity platform 214 of the targeted communication service 122 can send a second indication to cause the user device 324 to discontinue monitoring for the premises device identifiers for the first application.

In an aspect, instead of transmitting an indication to the user device 324, the event scheduler 218 can cause the proximity platform 214 to activate and deactivate applications based on the event schedule at the targeted communication service 122. In an aspect, a first application and a second application at the user device 324 can cause the operating system of the user device to monitor for one or more premises device identifiers. The first application and the second application can be monitoring for the same and/or different premises device identifiers. In an aspect, when the operating system of user device 324 detects a premises device identifier for the first application, then the user device 324 can send an indication comprising the user device identifier and the detected premises device identifier to the targeted communication service 122. The proximity platform 214 can determine whether there is an event occurring for the first application. If there is an event occurring for the first application, then the targeted communication service 122 can log the indication comprising the user device identifier and the detected premises device identifier in the data warehouse 220 of FIG. 2. The targeted communication service 122 can determine a campaign to be transmitted to the user device 324, a presentation device 210, and/or a media device (not shown) or initiate any other method described herein that depends on a detection between a user device and a premises device. In an aspect, if the proximity platform determines that there is not an event associated with the first application and the detected premises device, then the targeted communication service 122 can ignore the indication received by the user device 324 and/or premises device sending the indication of the detection of the user device 324 and the premises device of the premises device identifier. In another aspect, the proximity platform 214 can still cause the targeted communication service 122 to store the indication of the detection in the data warehouse but suspend any action associated with the first application because there is no event scheduled with the first application.

In an aspect, the event scheduler 218 can cause the targeted communication service 122 to only provide campaigns associated with a first application on the user device 324 associated with an event that is occurring at the location during the scheduled time per the event scheduler 218. Other applications on the user device 324 can be running and detecting the premises device identifiers. However, the other applications do not receive or activate campaigns since none are scheduled at the given time for the other applications besides the first.

In an aspect, an event schedule 1106 illustrates an example of the location 319 having a different group (e.g., group(1), group(2), and group(3)) of premises devices based on the event (e.g., event(1), event(2), and event(3)) that is occurring at the location 319. Each premises device from each group of premises devices can have a unique premises device identifier (e.g., set(1), set(2), and set(3)). Each application (e.g., application(1), application(2), and application (3)) can monitor for their respective set of premises device identifiers. Certain events may have certain locations within the location 319 that are only applicable for that specific event. As an example in the event schedule 1106 a first application (application (1)) for a first event (event(1)) at a first time (time(1)) can monitor for a first set (set(1)) of premises device identifiers of a first group (group(1)) of premises devices. Detection between a user device and at least one of the first set of premises device identifiers can cause a first campaign (campaign(1)) to activate if the detection is at the first time. Likewise, a second application (application (2)) for a second event (event(2)) at a second time (time(2)) can monitor for a second set (set(2)) of premises device identifiers of a second group (group(2)) of premises devices. Detection between a user device and at least one of the second set of premises device identifiers can cause a second campaign (campaign(2)) to activate if the detection is at the second time. Finally, a third application (application (3)) for a third event (event(3)) at a third time (time(3)) can monitor for a third set (set(3)) of premises device identifiers of a third group (group(2)) of premises devices. Detection between a user device and at least one of the third set of premises device identifiers can cause a third campaign (campaign(3)) to activate if the detection is at the third time.

In an aspect, event schedule 1108 illustrates a function of the event scheduler 218 where the event scheduler 218 can cause the proximity platform 214 to change a first premises device identifier of a first premises device to a second premises device identifier. In an aspect, the user device 324 can monitor for a first set (set(1)) of premises device identifiers for a first application (application(1)), a second set (set(2)) of premises device identifiers for a second application (application(2)), and a third set of premises device identifiers for a third application (application(3)). If the applications are for events at the same location, then the event scheduler 218, based on the event schedule 1108, can cause the proximity platform 214 to assign each premises device 206 a new premises device identifier based on the event that is occurring at the location and the event's corresponding application. The user's first, second, and third applications can still monitor for their respective premises device identifiers in the background of the user device 324 but only one of the applications will detect premises device identifiers because the location's premises devices are only transmitting one application's set of premises device identifiers.

In an aspect, event schedule 1110 illustrates a function of the event scheduler 218 where the event scheduler 218 can cause the proximity platform 214 to alter the campaign based on time. In an aspect, the user device 324 can monitor for a set (set(1)) of premises device identifiers with an application (application(1)). A first event (event(1)), a second event (event(2)), and a third event (event(3)) can use the application for the location. Furthermore, the first event, the second event, and the third event can share the same premises devices (group(1)), which have a static set (set(1)) of premises device identifiers for all events. The proximity platform 214 can reference the event scheduler 218 or the event scheduler 218 can signal to the proximity platform 214 which event is taking place. The proximity platform 214 can then start and stop campaigns (campaign(1), campaign(2), and campaign(3)) based time and the event. At a first time (time(1)) for the first event (event(1)), the proximity platform 214 can activate a first campaign (campaign(1)). At a second time (time(2)) for the second event (event(2)), the proximity platform 214 can activate a second campaign (campaign(2)) and deactivate the first campaign. At a third time (time(3)) for the third event (event(3)), the proximity platform 214 can activate a third campaign (campaign(3)) and deactivate the second campaign. In an aspect, the campaigns can be presented to the application. In an aspect, each event can be associated with its own application (e.g., application(1), application(2), and application(3)). The applications can be running on the user device and detecting the premises device identifiers of the location 319. However, the proximity platform 214 knows which campaigns are active for which applications and therefore would only present those active campaigns to the user device 324 and/or presentation device 210 running those applications.

In an aspect, the event scheduler 218 and proximity platform 214 can combine any of the methods of scheduling events described in event schedules 1104, 1106, 1108, and 1110. As an example, the type of premises device (e.g., wireless access point 232 or low energy beacon 234) may influence which method that the event scheduler 218 and proximity platform 214 may implement for that premises device 206. For example, the methods illustrated for event schedules 1104 and 1106 can be more suitable for low energy beacons 234 because the low energy beacons 234 may only be transmitting a beacon identifier and cannot receive communication from the targeted communication service 122 and/or user device 324. Therefore, the targeted communication service 122 or a user device cannot change the beacon identifier of the low energy beacons 234.

Figure 12:
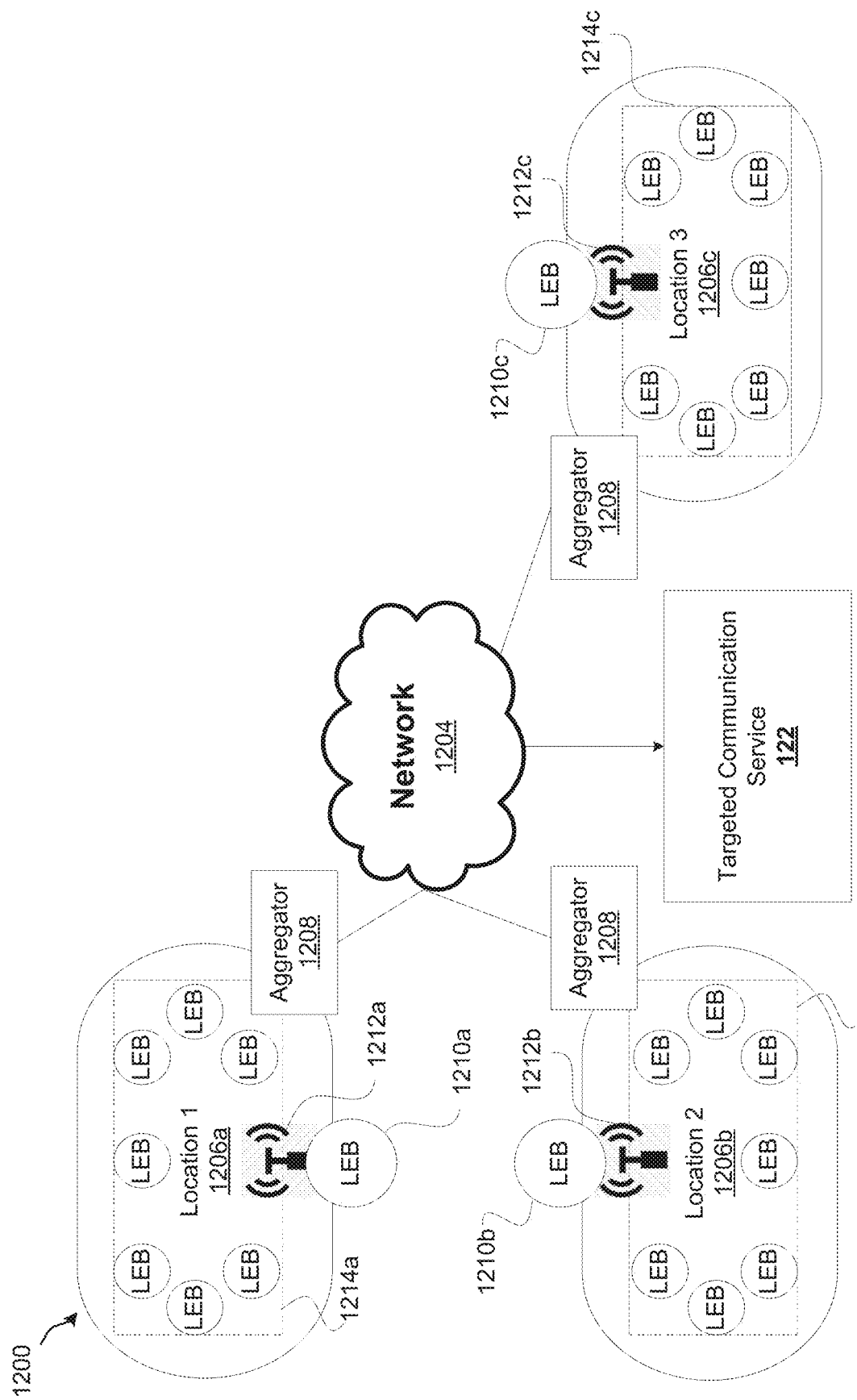
FIG. 12 is a block diagram of an example system.

FIG. 12 illustrates a block diagram of a hierarchical premises device configuration over a plurality of locations according to various aspects. In an aspect, a system 1200 can be established where a plurality of locations (e.g., a first location 1206a, a second location 1206b, and a third location 1206c) receive services over a network 1204 from the targeted campaign or data service 122. Each location 1206a, 1206b, and 1206c can have an aggregator 1208 that aggregates information from user devices 324 at the locations 1206a, 1206b, and 1206c and other information from interactions of user devices 324 with premises devices at the locations 1206a, 1206b, and 1206c. The aggregated information can be stored by the targeted communication service 122. Each location 1206a, 1206b, and 1206c can comprise a plurality of premises devices. The premises devices can comprise a set of low energy beacons (e.g., a first set of low energy beacons 1214a, a second set of low energy beacons 1214b, and a third set of low energy beacons, respectively) 1214c. The premises devices can also comprise one or more wireless access points. For example, the first location 1206a can comprise a wireless access point 1212a, the second location 1206b can comprise a wireless access point 1212b, and the third location 1206c can comprise a wireless access point 1212c. Each location 1206a, 1206b, and 1206c can also comprise a primary low energy beacon (e.g., a first primary low energy beacon 1210a, a second primary low energy beacon 1210b, and a third primary low energy beacon 1210c, respectively). The primary low energy beacons 1210a, 1210b, and 1210c can be configured to identify respective sets of low energy beacons 1214a, 1214b, and 1214c.

In an aspect, low energy beacons 1214a, 1214b, and 1214c can be configured to broadcast or otherwise transmit a set of beacon identifiers (e.g., a hierarchical combination of Universally Unique Identifier UUID—and "major" and "minor" numbers or a hierarchical combination of a namespace and an instance) establishing a geofence for which user devices 324 can monitor for the set of beacon identifiers. In an aspect, applications installed on the user device 324 can register the beacon identifiers with the operating system of the user device 324 for monitoring. When the user device 324 detects a beacon identifier that is registered with the operating system, the operating system awakens those applications (if any) that registered the beacon identifier. The application then decides what action to take based on the detection, often with the assistance of the targeted communication service 122 that maintains detailed information on locations (e.g., 1206a, 1206b, and 1206c) and actions/campaigns to execute. In an aspect, the operating system of the user device 324 can impose a limitation that an application can only register for a defined number of beacon identifiers at one time. Having the limitation helps reduce the amount of energy the user device 324 uses to monitor for beacon identifiers in the background.

However, the limitation on the number of beacon identifiers for which the operating system monitors can present a problem as it is possible that an application, especially one supporting multiple locations, is interested in receiving a location notification in excess of the limitation of the number beacon identifiers set by the operating system and/or there more low energy beacons at a location than the limitation. In an aspect, a location can be limited to a number of low energy beacons that represents the limitation imposed by the operating system on the maximum number of beacon identifiers. In an aspect, each location 1206a, 1206b, and 1206c can use the same set of beacon identifiers across the locations 1206a, 1206b, and 1206c transmitted by the low energy beacons 1214a, 1214b, and 1214c respectively. In an aspect, the user device 324 monitoring for the set of beacon identifiers can enter one of the locations and detect a beacon identifier for which it is monitoring. However, the application on the user device 324 and/or the targeted communication service 122 does not know which location 1206a, 1206b, or 1206c the user device 324 is at and therefore does not know which action/campaign to perform unless each location has the same logic for identical beacon identifiers. In an aspect, the user device 324 can determine its present location through another type of premises device besides the low energy beacons 1214a, 1214b, and 1214c. In an aspect, the user device 324 can establish communication with a wireless access point such as wireless access points 1212a, 1212b, and/or 1212c. A wireless access point identifier of a wireless access point 1212a, 1212b, and/or 1212c can be used by targeted communication service 122 to determine which location 1206a, 1206b, or 1206c the user device 324 is at. The targeted communication service 122 can then determine an action/campaign the targeted communication service 122 and/or the user device 324 can perform based on the detected beacon identifier and/or wireless access point identifier. In another aspect, another location identifying service can be used besides the wireless access point identifier such as a global positioning system that can provide a latitude and longitude of the detected beacon identifier. This aspect can support multiple sites; for example, an application for a chain department store or an application supporting multiple sports teams at multiple stadiums. Because the beacon identifiers are reused across sites, the identifiers are not sufficient for determining the specific site where the user device 324 and beacon encounter took place. For example, an application can register for, and be informed of, an encounter with a beacon broadcasting beacon identifier "1111", but the application and the targeted communication service 122 supporting the application would not know if the encounter happened at Stadium A or across the town/city/state/country at Stadium B. By obtaining wireless access point identifiers and/or GPS determined latitude and longitude, an application can determine, in conjunction with the targeted communication service 122 supporting the application, the site at which the user device 324 is located, and what campaign to execute when encountering a beacon identifier at that site.

The method above has the benefit of operating across multiple locations, but within the beacon identifier limitation set by the operating system of the user device 324. At an individual location that requires more beacon identifiers than the beacon identifier limitation, the application must dynamically update the beacon identifiers for which the operating system of the user device 324 is monitoring. The application can accomplish this dynamic updating by dynamically deregistering beacon identifiers that are not immediately relevant, and registering beacon identifiers with the operating system that are relevant. Again, the application registers a set of primary beacon identifiers (e.g., primary low energy beacons 1210a, 1210b, and 1210c) with the operating system. Those primary beacon identifiers (one or several) can be used to mark the entrances to the location. As the user device 324 detects one or more of the primary low energy beacons, the operating system can launch the application. As in the aspect described above, the application, in conjunction with the targeted communication service 122, can determine which site the device has entered through a combination of beacon identifier and GPS coordinates and/or wireless access point identifiers. In an aspect, the application and targeted campaign service can determine what locations are adjacent to the user device's current location. Having knowledge of the user device's adjoining locations, and the beacon identifiers specific to those locations, the application registers the beacon identifiers with the operating system. To free up space and stay within the beacon identifier limitation, the application may deregister identifiers that are either spatially remote or temporally distant (in other words, "timed out"). In this way, a device may move through a site containing large numbers of locations (e.g., geofences), and maintaining beacon identifier registrations for those locations that are proximate to the current location of the user device 324.

In an aspect, the beacon identifier limitation imposed by an operating system when determining location can be overcome by detection of beacon identifiers by the user device without additional location services such as detection of wireless access points or GPS coordinates. A combination of primary beacon identifiers to determine the location can be implemented depending on the maximum number of beacon identifiers set by the operating system. For example, an entrance at a location can have one or more primary low energy beacons installed, each transmitting a primary beacon identifier. Upon detection of a combination of the primary beacon identifiers by the operating system the application, the targeted communication service 122 can determine the location for that particular combination of primary beacon identifiers. The targeted communication service 122 can send the user device 324 a secondary set of beacon identifiers for beacons at the location. The application can register the secondary set of beacon identifiers with the operating system so that the operating system of the user device can monitor for the secondary set of beacons identifiers.

In another example, a primary beacon could be employed at the entrance(s) to a location (e.g., geofence). This primary beacon can broadcast a UUID and one or more additional identifiers (e.g., major and minor numbers; namespace and instance, and the like.). The same UUID could be used for a large number of locations, but the one or more additional identifiers would be different for those locations. The mobile application registers the UUID with the operating system of the user device 324. When the user device encounters that UUID, the operating system awakens the application. The application then gathers the one or more additional identifiers and reports the one or more additional identifiers and the UUID to the targeted communication service 122. The targeted communication service 122 can then determine where the user device 324 is located and send a set of UUIDs specific to the encountered location to the user device 324. In this way, GPS and WiFi and other services are not required.

FIG. 13 illustrates a flowchart of a method 1300 of proximity detection, according to various aspects. In step 1302, a proximity platform (e.g., the proximity platform 214) of a targeted campaign service (e.g., targeted communication service 122) can receive an indication of a detection between a user device (e.g., the user device 324) and a premises device (e.g., the premises device 206). The user device 324 can be associated with a user. The indication can comprise a signal transmission that communicates a user device identifier of the user device 324 and a premises device identifier of the premises device 206. The indication can be received from the user device 324 when the user device 324 detects the premises device 206. For example, a user device 324 can detect a beacon identifier transmitted by a low energy beacon. In an aspect, the premises device 206 can send the indication when the premises device 206 detects the user device 324. For example, a wireless access point 232 can detect a user device identifier transmitted by the user device 324. The indication can comprise the access point identifier and the user device identifier. In an aspect, the indication can comprise a user identifier of the user device 324. The user identifier can comprise authentication information or other credentials to access the user device 324, application on the user device 324, connect with a network, combinations thereof, and the like.

In step 1304, the proximity platform 214 can associate a media device identifier of a media device (e.g., the media device 320) to the user device identifier based on the premises device identifier. In an aspect, the proximity platform 214 can first associate the user device identifier to the premises device identifier upon receiving the indication comprising the premises device identifier and the user device identifier. The proximity platform 214 can determine that the media device identifier is associated with the premises device identifier. For example, the proximity platform 214 can search a database for the premises device identifier. The database can comprise one or more associations of premises device identifiers to media device identifiers. The proximity platform 214 can access the associations of any media device identifiers that the premises device 206 is associated with. The proximity platform 214 can combine the association of the user device identifier and the premises device identifier to the association of the premises device identifier to the media device identifier to associate the user device identifier to the media device identifier.

In step 1306, the proximity platform 214 can receive a request to identify a user of the media device 320 when the media device 320 detects an interaction by the user of the media device 320. In an aspect, the request can be received from the media device 320. A user can interact with the media device 320 by requesting content or performing any command at the media device 320. In an aspect, the interaction with the media device 320 can cause a user information system to request from the proximity platform 214 the user interacting with the media device 320 to determine user demographic information of the user. The user demographic information can comprise, for example, age, sex, address, pre-defined interests, gathered interests, education level, occupation, religion, ethnicity, education, and the like.

In step 1308, the proximity platform 214 can determine a confidence level that the user of the user device 324 is the user of the media device 320. In an aspect, the confidence level that the user of the user device 324 is the user of the media device 320 can be based on at least one of an identity confidence level of the identity of the user of the user device 324 and a proximity confidence level of proximity of the user of the user device 324 to the media device 320. As an example, the proximity platform 214 can determine the identity confidence level based on stored associations between the user device identifier and one or more user identifiers. As another example, the identity confidence level can be based on authentication information from the indication or other credentials from the user device 324. In an aspect, the proximity confidence level can be determined based on a signal range of the premises device 206. For example, a low energy beacon can have a smaller signal range than a wireless access point. Therefore, if the premises device identifier is from a low energy beacon, then the proximity platform 214 can determine that there is a higher confidence level that the user device 324 is in closer proximity to the media device 320 than from the premises device identifier being from a wireless access point.

In step 1310, the proximity platform 214 can provide the user device identifier mapped with the media device identifier and the confidence level that the user of the user device identifier is the user of the media device 320 in response to the request to identify the user of the media device 320. The proximity platform 214 can send the user identifier and confidence level to the user information system. Once the user information system knows the user and the confidence level that the user of is the user of the media device 320, then the user information system can retrieve user demographic information for the particular user so that a campaign management system can determine an action, campaign, content, combinations thereof and the like to present to the user at the media device 320.

In an aspect, the presence engine of the proximity platform 214 can further dissociate the user device identifier from the premises device identifier when the detection between the user device 324 and the premises device 206 no longer exists. The proximity platform 214 can then dissociate the association of the user device identifier and the media device identifier that is based on the dissociated premises device identifier. The determination of the confidence level that the user of the user device 324 is the user of the media device 320 can be based on whether the user device 324 maintains a continued presence near the media device 320. The continued presence can be based on a threshold time period between the association of the user device identifier to the premises device identifier and the dissociation of the user device identifier to the premises device identifier.

FIG. 14 illustrates a flowchart of a method 1400 of proximity detection and targeted campaigns, according to various aspects. In step 1402, a targeted campaign service (e.g., the targeted communication service 122) can receive an indication of a detection between a user device (e.g., the user device 324) and a premises device (e.g., the premises device 206). The user device 324 can be associated with a user. The indication can comprise a signal transmission that communicates a user device identifier of the user device 324 and a premises device identifier of the premises device 206.

The indication can be received from the user device 324 when the user device 324 detects the premises device 206. For example, a user device 324 can detect a beacon identifier transmitted by a low energy beacon. In an aspect, the premises device 206 can send the indication when the premises device 206 detects the user device 324. For example, a wireless access point can detect a user device identifier transmitted by the user device 324. The indication can comprise the access point identifier and the user device identifier. In an aspect, the indication can comprise a user identifier of the user device 324. The user identifier can comprise authentication information or other credentials to access the user device 324, application on the user device 324, connect with a network, combinations thereof, and the like.

In step 1404, the targeted communication service 122 can receive an indication from a media device (e.g., the media device 320) when the media device 320 detects an interaction of a user with the media device 320. The indication can require an action to be performed based on the user of the media device 320. For example, the user can interact with the media device 320 by requesting content or performing any command at the media device. The interaction can comprise a content request. The interaction can cause an action that can use user demographic information to customize the action to be performed based on the user of the media device 320. The user demographic information can comprise, for example, age, sex, address, pre-defined interests, gathered interests, education level, occupation, religion, ethnicity, education, and the like. The interaction with the media device 320 can cause a user information system of the targeted communication service 122 to request from a proximity platform of the targeted communication service 122 the identity of the user interacting with the media device 320 to determine user demographic information of the user. In an aspect, the action can comprise an insertion of a campaign (e.g., advertisement, overlay, video content, audio content, authorization ticket, combinations thereof and the like) into the content provided to the media device 320 in response to the content request.

In step 1406, the targeted communication service 122 can associate the media device identifier of the media device 320 with the user device identifier based on the premises device identifier. In an aspect, the targeted communication service 122 can first associate the user device identifier to the premises device identifier upon receiving the indication comprising the premises device identifier and the user device identifier. The proximity platform can determine that the media device identifier is associated with the premises device identifier. For example, the proximity platform can search a database or a third party database for the premises device identifier. The database can comprise one or more associations of premises device identifiers to media device identifiers. The proximity platform can obtain the associations of any media device identifiers that the premises device 206 is associated with. The proximity platform can combine the association of the user device identifier and the premises device identifier to the association of the premises device identifier and the media device identifier to associate the user device identifier to the media device identifier.

In step 1408, the targeted communication service 122 can determine a confidence level that the user of the user device 324 is the user of the media device 320 performing the interaction. The confidence level can be based on the indication of the detection between the user device 324 and the premises device and the association of the media device identifier of the media device 320 to the user device identifier. In an aspect, the confidence level that the user of the user device 324 is the user of the media device 320 can be based on at least one of an identity confidence level of the identity of the user of the user device 324 and proximity of the user of the user device 324 to the media device 320. As an example, the targeted communication service 122 can determine the identity confidence level based on stored associations between the user device identifier and one or more user identifiers. As another example, the identity confidence level can be based on authentication information from the indication or other credentials from the user device 324. As yet another example, the identity confidence level can be based on a type of user device 324. For example, a smart phone is more likely to have a single user rather than a tablet which may be a communal user device for multiple people in a household.

In an aspect, proximity of the user device 324 to the media device 320 can be determined based on a signal range of the premises device 206. The signal range can be based on a communication protocol for the premises device 206. For example, a low energy beacon utilizing BLE protocol can have a shorter signal range than a wireless access point utilizing WiFi protocol. Therefore, if the premises device identifier is from a low energy beacon, then the proximity platform 214 can determine that there is a higher confidence level that the user device 324 is in closer proximity to the media device 320 than from the premises device identifier being from a wireless access point. In an aspect, proximity of the user device 324 to the media device 320 can be based on signal strength between the user device 324 and the premises device 206. For example, the signal strength can be an RSSI value. The RSSI value can fluctuate enough to make a determination that the user device 324 is moving around the location and therefore is less likely to be interacting with the media device 320. If the RSSI value is substantially constant, then it is more likely that the user device 324 is stationary. Therefore, the user of the user device 324 may be more likely to be interacting with the media device 320. The RSSI value can also be used to approximate distance of the user device 324 to the premises device 206.

In step 1410, the targeted communication service 122 can determine user demographic information of the user if the confidence level indicates the user of the user device is the user of the media device. In an aspect, the confidence level that the user of the user device 324 is the user of the media device 320 can be based on at least one of an identity confidence level of the identity of the user of the user device 324 and a proximity confidence level of proximity of the user of the user device 324 to the media device 320. As an example, the proximity platform can determine the identity confidence level based on stored associations between the user device identifier and one or more user identifiers. As another example, the identity confidence level can be based on authentication information from the indication or other credentials from the user device 324. The identity confidence level can indicate that a particular user is using the user device 324. Therefore, demographic information known to the targeted communication service 122 about the user can be accessed. In an aspect, the targeted communication service 122 can obtain the user demographic information from a database or a third party data feed. The user demographic information can comprise, for example, age, sex, address, pre-defined interests, gathered interests, education level, occupation, religion, ethnicity, education, and the like.

In step 1412, the targeted communication service 122 can determine, in response to the interaction, the action to perform at the media device 320 based on the user demographic information. For example, the action can comprise a set of business rules. The targeted communication service 122 can compare one or more user demographics to the business rules to determine whether or not to have the action performed at the media device 320. In an aspect, the action to be performed can comprise an insertion of a campaign with content provided to the media device 320 in response to a content request. In an aspect, the targeted communication service 122 can store user demographic information of the interaction of the user with the media device 320 to provide additional demographic information when the user interacts with the media device 320 again or any other interaction causing user demographic information to be accessed by the targeted communication service 122.

In step 1414, the targeted communication service 122 can cause the action to be performed at the media device 320. In an aspect, the targeted communication service 122 can send instructions to the media device 320 to perform the action. For example, the targeted communication service 122 can send a campaign to the media device 320 that the media device 320 can insert into content the media device 320 receives. In an aspect, the targeted communication service 122 can perform the action before a product of the action can be sent to the media device 320. The targeted communication service 122 can send instructions to a campaign management system to perform the action to content to be sent to the media device 320. For example, a campaign can be inserted into content sent to the media device 320 in response to the content request by the campaign management system.

FIG. 15 illustrates a flowchart of a method 1500 of proximity detection and targeted campaigns, according to various aspects. In step 1502, a targeted campaign service (e.g., the targeted communication service 122) can receive a first indication from a first media device (e.g., a set-top box, a digital streaming device, a gaming device, a media storage device, a digital recording device, a digital sign, a combination thereof, and/or the like) indicating the first media device has detected an interaction of a first user with the first media device. In an aspect, the targeted communication service 122 can receive the indication directly from the first media device. In an aspect, the interaction by the user can be a request for content from a content server by the first media device which provides content to the first media device. A campaign management system and/or a user information system can receive the indication from the content server and/or first media device of the content request. The campaign management system and/or user information system can forward the indication to a proximity platform (e.g., the proximity platform 214) of the targeted communication service 122 to determine a user of the first media device.

In step 1504, the targeted communication service 122 can receive a second indication from a second media device indicating the second media device has detected an interaction of a second user with the second media device. The interactions at the first media device and the second media device can require a first action to be performed and second action to be performed, respectively, based on user demographic information associated with the user/users of the first media device and the second media device. The user demographic information can comprise, for example, age, sex, address, pre-defined interests, gathered interests, education level, occupation, religion, ethnicity, education, and the like. As an example, a user of a media device (e.g., first media device or second media device) can interact with the media device by requesting content or performing any command at the media device. The interaction can therefore be a content request. The interaction can cause an action that can use user demographic information to customize the action for the user causing the interaction. The interaction with the media device can cause a user information system of the targeted communication service 122 to request from the proximity platform 214 of the targeted communication service 122 the identity of the user interacting with the first media device and/or second media device. The identity of the user can be used to determine user demographic information of the user. In an aspect, the action can comprise insertion of a campaign (e.g., advertisement, overlay, video content, audio content, authorization ticket, combinations thereof and the like) into the content provided to the media device in response to the content request.

In step 1506, the targeted communication service 122 can determine user demographic information associated with the first user of the first media device and user demographic information associated with the second user of the second media device based on a proximity of a plurality of user devices (e.g., a smartphone, a tablet, a laptop, a wearable device, and the like) to at least one of the first media device and second media device. The targeted communication service 122 can associate the plurality of user devices to at least one of the first media device and second media device based on at least one common premises device (e.g., premises device 206) associated with the plurality of user devices and at least one of the first media device and the second media device. The targeted communication service 122 can associate the plurality of user devices to the at least one of the first media device and the second media device by mapping user device identifiers for the plurality of user devices to a first media device identifier of the first media device and a second media device identifier of the second media device based on common premises device identifiers of one or more premises devices 206 that are associated with the user device identifiers and at least one of the first media device identifier and the second media device identifier.

In an aspect, the targeted communication service 122 can then determine at least one of the plurality of user devices that meets a proximity threshold based on the associations of the plurality of user devices to at least one of the first media device and second media device. In an aspect, the proximity of the plurality of user devices to the first media device and second media device can be determined based on a signal range of the at least one common premises device. In an aspect, the proximity of the plurality of user devices to the first media device and second media device can be determined based on a number of common premises devices a user device of the plurality of user devices is associated with and a location of the number of common premises devices (e.g., premises device 206) in relation to the first media device and the second media device.

In an aspect, the targeted communication service 122 can determine an identity confidence level of each user of the at least one of the plurality of users devices that meets the proximity threshold. The targeted communication service 122 can determine the identity confidence level based on stored associations between a user device identifier and one or more user identifiers. As another example, the identity confidence level can be based on authentication information from an indication comprising data of the user device. As yet another example, the identity confidence level can be based on a type of user device. For example, a smart phone is more likely to have a single user rather than a tablet which may be a communal user device for multiple people in a household. Based on the identity confidence level and the proximity, the targeted communication service 122 can determine the user of the first media device and the user of the second media device. The users whose devices are within the proximity threshold and whose identity confidence level meets an identity confidence level threshold can be the determined user or users. The user information system of the targeted communication service 122 can determine which user demographic information based on the determined users. The user information system can access user profiles from a database that comprise user demographic information by matching the user and/or users determined to user profiles within the database. The user information system of the targeted communication service 122 can transmit the user demographic information of the first user and the second user to the campaign management system.

In step 1508, the targeted communication service 122 can determine a first action in response to the interaction of the user with the first media device and a second action in response to the interaction of the user with the second media device. The first action and second action can be determined based on the users of the first media device and the second media device respectively. The targeted communication service 122 can access user demographic information of each of the users of the first media device and the second media device and the user demographic information can be used to determine a customized action. The campaign management system of the targeted communication service 122 can determine possible actions based on the user demographic information of the users of the first media device and the second media device. For example, the campaign management system can determine, based on the user demographic information, which campaigns to present with the content requested by the first media device and the second media device. In an aspect, the campaign management system can send to the content server the possible actions for the first action and the second action. In an aspect, the first action and/or the second action to be performed can be an insertion of a campaign with content provided to one of the first media device and/or second media device in response to a content request. For example, the campaign management system can send a playlist of campaigns to insert into content requested by the first media device and the second media device. The content server can then select campaigns to incorporate into the requested content from the playlist of campaigns. The content server can then send the content requested and the inserted campaigns to the first media device and the second media device. In an aspect, the targeted communication service 122 can store information of the interaction of the users to provide additional demographic information when a user interacts with a media device again or any other interaction causing user demographic information to be accessed by the targeted communication service 122.

In an aspect, the targeted communication service 122 can cause to perform the first action at the first media device and the second action at the second media device. In an aspect, the targeted communication service 122 can perform an action before a product of the action can be sent to the first media device and/or the second media device. For example, a campaign can be inserted into content sent to the first media device and/or the second media device in response to a content request. In another aspect, the targeted communication service 122 can send instructions to the first media device and/or the second media device that can cause the first media device and/or the second media device to perform the action.

FIG. 16 illustrates a flowchart of a method 1600 of proximity detection and targeted campaigns, according to various aspects. In step 1602, targeted campaign service (e.g., the targeted communication service 122) can receive an indication of a detection between at least one premises device (e.g., the premises device 206) and a plurality of user devices (e.g., a smartphone, a tablet, a laptop, a wearable device, and the like). Each indication of the detection can comprise a user device identifier of a user device of the plurality of user devices and a premises device identifier of a premises device of the at least one premises device 206. In an aspect, the targeted communication service 122 can receive the indication of the detection from the user device and/or the at least one premises device 206. In an aspect, a presentation device (e.g., presentation device 210) can be associated with one or more premises devices 206. For example, the presentation device 210 can be associated with a low energy beacon (e.g., BLE beacon) and/or a wireless access point. In an aspect, a premises device identifier (e.g., a beacon identifier, an access point identifier, and the like) can be associated with a presentation device identifier of the presentation device 210.

In step 1604, the targeted communication service 122 can determine a confidence level for each of the plurality of user devices that the plurality of user devices is within a presentation area of the presentation device 210 associated with the at least one premises device 206. In an aspect, the confidence level can be based on a proximity confidence level of the proximity of each of the plurality of user devices to the presentation device 210. In an aspect, the confidence level can be based on an identity confidence level of a user of each of the plurality of user devices. In an aspect, the confidence level can be based on a continued presence of each of the plurality of user devices within the presentation area of the presentation device 210. The continued presence can exist after a threshold period of time after the detection between a user device of the plurality of user devices and the at least one premises device 206 without any dissociations of the user device from the at least one premises device 206.

In step 1606, the targeted communication service 122 can determine a first user device of the plurality of user devices that is within the presentation area of the presentation device 210 based on the confidence level. The targeted communication service 122 can compare the confidence levels of the plurality of user devices within the presentation area to determine which user device of the user devices within the presentation area has the highest confidence level. The user device that has the highest confidence level can be determined to be the first user device. That is the user of user device with the highest confidence level is likely the closest user to the presentation device 210 to consume what is on the presentation device 210.

In step 1608, the targeted communication service 122 can determine, based on a user device identifier of the first user device and the confidence level, a communication, campaign or message to be presented on the presentation device 210. The targeted communication service 122 can use the user device identifier of the first user device and the confidence level to determine an identity of a user for the first user device. The targeted communication service 122 can use the identity of the user of the first user device to access user demographic information of the user from a database. As an example, a user information system of the targeted communication service 122 can access the user demographic information of the user identified to be the user of the first user device. In an aspect, the targeted communication service 122 can determine a playlist of campaigns to be presented at the presentation device 210 based on the user demographic information. For example, a campaign management system of the targeted communication service 122 can determine possible campaigns to present at the presentation device 210. The campaigns can be determined by comparing the user demographic information to business rules such as whether or not the user of the first user device has recently viewed a campaign, campaigns that align with the user's user demographic information, how many campaigns the user has viewed recently, combinations thereof, and the like. In an aspect, the campaigns can be ordered on the playlist based on the most revenue that the targeted communication service 122 can generate for displaying the campaign. In an aspect, the targeted communication service 122 can then select from the possible campaigns a campaign that meets the business rules by selecting the campaign that is at the top of the playlist. In another aspect, the campaign to be presented on the presentation device 210 can be determined based on when the campaign was previously presented at the presentation device 210.

In step 1610, the targeted communication service 122 can transmit the communication, campaign or message to the presentation device 210. In an aspect, the campaign can be transmitted to the first user device. In an aspect, the campaign can be transmitted to both the first user device and the presentation device 210. In an aspect, the campaign can be transmitted over a network (e.g., an internet).

FIG. 17 illustrates a flowchart of a method 1700 of proximity detection and targeted campaigns, according to various aspects. In step 1702, targeted campaign service (e.g., the targeted communication service 122) can receive an indication of a detection between at least one premises device (e.g., the premises device 206) and a plurality of user devices (e.g., a smartphone, a tablet, a laptop, a wearable device, and the like). Each indication can comprise a user device identifier of a user device of the plurality of user devices and a premises device identifier of a premises device of at the least one premises device 206. In an aspect, the targeted communication service 122 can receive the indication of the detection from the indication's respective user device and/or premises device 206. In an aspect, a presentation device (e.g., the presentation device 210) can be associated with the at least one premises devices 206. For example, the presentation device 210 can be associated with a low energy beacon (e.g., BLE beacon) and/or a wireless access point. In an aspect, a premises device identifier (e.g., a beacon identifier, an access point identifier, and the like) can be associated with a presentation device identifier of the presentation device 210.

In step 1704, the targeted communication service 122 can determine a confidence level for each of the plurality of user devices that the plurality of user devices are within a presentation area of a presentation device 210 associated with the at least one premises device 206. The targeted communication service 122 can determine a user associated with each of the plurality of user devices based on the confidence level to determine a campaign to present at the presentation device 210. In an aspect, the confidence level can comprise an identity confidence level of a user of each of the plurality of user devices. In an aspect, the confidence level can comprise a proximity confidence level of the plurality of user devices to the presentation device 210. The identity confidence level can be determined based on users associated with a user device of the plurality of user devices. The targeted communication service 122 can compare the user device identifier of the user device of each indication to a database comprising users associated with that user device identifier. If there is more than one user, then the targeted communication service 122 can assign a lower identity confidence level to the user device identifier. If there is additional information to determine the user such as login credentials, then a higher identity confidence level can be given the user determined. In an aspect, the targeted communication service 122 can determine the identity confidence level based on the type of user device. For example, a wearable user device is likely more associated with one user rather than a tablet that may be associated with more than one user. In an aspect, the proximity confidence level can be determined based on the types of premises devices 206 each user device is associated with. For example, if the user device is associated with a low energy beacon that is associated with the presentation device 210, then there is a higher proximity confidence level that the user device is in close proximity to the presentation device 210 because the low energy beacon has a shorter range of communication than, for example, a WiFi access point which can have a longer range of communication. In another example, proximity confidence level can be determined based on signal strength between the user device and the premises device 206. For example, the signal strength can be an RSSI value. The RSSI value can fluctuate enough to make a determination that the user device is moving around the premises and therefore is less likely to be interacting with the presentation device 210. If the RSSI value is substantially constant, then it is more likely that the user device is stationary. Therefore, the user of the user device may be more likely to be interacting with the presentation device 210. The RSSI value can also be used to approximate distance of the user device to the premises device 206. The targeted communication service 122 can use the identity confidence level and the proximity confidence level to determine the confidence level overall for each user device being within the presentation area of the presentation device 210.

In step 1706, the targeted communication service 122 can determine a first communication, campaign or message to transmit to the presentation device 210 based on the confidence levels and user device identifiers for each of the plurality of user devices. The targeted communication service 122 can use the user device identifiers of the plurality of user devices and their respective confidence levels to determine the identities of the users for the first user device and their proximity to the presentation device 210. The targeted communication service 122 can use the identities of the users of the plurality of user devices to access user demographic information of the users from a database. As an example, a user or subscriber information system of the targeted communication service 122 can access the user demographic information of the users identified to be the users of the plurality of user devices. In an aspect, the targeted communication service 122 can determine a playlist of campaigns to be presented at the presentation device 210 based on the combined user demographic information. As an example, a campaign management system of the targeted communication service 122 can determine possible campaigns to present at the presentation device 210. The campaigns can be determined by comparing the user demographic information to business rules such as whether or not the users of the plurality of user devices have recently viewed a campaign, campaigns that align with the users' user demographic information, how many campaigns the users have viewed recently, global campaigns for the presentation device 210 and associated premises device identifiers, combinations thereof, and the like. In an aspect, the targeted communication service 122 can then select from the possible campaigns a campaign that meets the business rules by selecting the campaign that is at the top of the playlist. In an aspect, the campaigns can be ordered on the playlist based on the most revenue that the targeted campaign service 210 can generate for displaying the campaign.

In step 1708, the targeted communication service 122 can transmit the first communication, campaign or message to the presentation device 210. In an aspect, the targeted communication service 122 can transmit the first campaign to the plurality of user devices. In an aspect, the targeted communication service 122 can transmit the campaign to both the presentation device 210 and the plurality of user devices.

In step 1710, the targeted communication service 122 can detect a presence of at least one user device of the plurality of user devices within the presentation area of the presentation device 210. The detected presence can be a continued presence or a combination of intermittent presences over a period of time. In an aspect, the continued presence can exist after a threshold period of time after detection between a user device 324 of the plurality of user devices and the at least one premises device 206 without any dissociations of the user device 324 from the at least one premises device 206. Alternatively, continued presence can be determined based on a sufficient or predetermined amount of intermittent presence activities.

In step 1712, the targeted communication service 122 can determine a second campaign to transmit based on the user device identifier of the at least one user device 324 having the presence of the at least one user device. The targeted communication service 122 can determine the second campaign to transmit as described in step 1706 with regard to the first campaign, but can be based on the user demographic information of a user of the at least one user device.

In step 1714, the targeted communication service 122 can transmit the first campaign to the presentation device 210. In an aspect, the second campaign can be transmitted to the at least one user device of the plurality of user devices based at least in part on the detected presence, e.g., for a device having a continued presence. The second campaign can be transmitted to the at least one user device having continued presence in addition to transmitting to the presentation device 210 or the second campaign can be transmitted only to the at least one user device having continued presence. In an aspect, the targeted communication service 122 can determine a third campaign to transmit to the presentation device 210 based on the user device identifiers and confidence levels for the plurality of user device not having a continued presence while the second campaign is transmitted to the at least one user device having continued presence.

In an aspect, the targeted communication service 122 can receive a notification of consumption of at least one of the first campaign and second campaign by a user of a user device of the plurality of user devices. The targeted communication service 122 can store the notification with user demographic information of the user. The user demographic information can comprise, for example, age, sex, address, pre-defined interests, gathered interests, education level, occupation, religion, ethnicity, education, and the like. The targeted communication service 122 can receive a request for a third campaign. The targeted communication service 122 can determine the third campaign based on the user demographic information comprising the notification of consumption.

FIG. 18 illustrates a flowchart of a method 1800 of proximity detection and targeted campaigns, according to various aspects. In step 1802, targeted campaign service (e.g., the targeted communication service 122) can receive an indication for a detection between at least one premises device (e.g., the premises device 206) and a plurality of user devices (a smartphone, a tablet, a laptop, a wearable device, and the like), wherein each indication for the detection comprises a user device identifier of a user device of the plurality of user devices and a premises device identifier of a premises device 206 of the at least one premises device. In an aspect, the targeted communication service 122 can receive the indication of the detection from the indication's respective user device and/or premises device 206. In an aspect, a presentation device (e.g., the presentation device 210) can be associated with one or more premises devices 206. For example, the presentation device 210 can be associated with a low energy beacon (e.g., BLE beacon) and/or a wireless access point.

In step 1804, the targeted communication service 122 can determine a confidence level for each of the plurality of user devices that the plurality of user devices are within a presentation area of the presentation device 210 associated with the at least one premises device. In an aspect, a premises device identifier (e.g., a beacon identifier, an access point identifier, and the like) can be associated with a presentation device identifier of the presentation device 210. In an aspect, the confidence level for each of the plurality of user devices can comprise a proximity confidence level of each of the plurality of user devices to the presentation device 210. In an aspect, the confidence level can comprise an identity confidence level of each user of the plurality of user devices. The identity confidence level can be determined based on users associated with a user device of the plurality of user devices. The targeted communication service 122 can compare the user device identifier of the user device of each indication to a database comprising users associated with that user device identifier. If there is more than one user, then the targeted communication service 122 can assign a lower identity confidence level to the user device identifier. If there is additional information to determine the user such as login credentials, then a higher identity confidence level can be given the user determined. In an aspect, the targeted communication service 122 can determine the identity confidence level based on the type of user device 324. For example, a wearable user device is likely more associated with one user rather than a tablet that may be associated with more than one user. In an aspect, the proximity confidence level can be determined based on the types of premises devices 206 each user device is associated with. For example, if the user device is associated with a low energy beacon that is associated with the presentation device 210, then there is a higher proximity confidence level that the user device is in close proximity to the presentation device 210 because the low energy beacon has a shorter range of communication than, for example, a WiFi access point which can have a longer range of communication. In another example, proximity confidence level can be determined based on signal strength between the user device and the premises device 206. For example, the signal strength can be an RSSI value. The RSSI value can fluctuate enough to make a determination that the user device is moving around the location and therefore is less likely to be interacting with the presentation device 210. If the RSSI value is substantially constant, then it is more likely that the user device is stationary. Therefore, the user of the user device may be more likely to be interacting with the presentation device 210. The RSSI value can also be used to approximate distance of the user device to the premises device 206. The targeted communication service 122 can use the identity confidence level and the proximity confidence level to determine the confidence level overall for each user device being within the presentation area of the presentation device 210.

In an aspect, the confidence level can be based on a continued presence of each of the plurality of user devices within the presentation area of the presentation device 210. In an aspect, the continued presence can exist after a threshold period of time after the detection between a user device of the plurality of user devices and the at least one premises device without any dissociations of the user device from the at least one premises device.

In step 1806, the targeted communication service 122 can determine, based on the user device identifiers of the plurality of user devices and each confidence level of the plurality of user devices, a communication, campaign or message to be presented on the presentation device 210. In an aspect, the campaign to be presented at the presentation device 210 can be based on when a candidate campaign was previously presented. The targeted communication service 122 can use the user device identifiers of the plurality of user devices and their respective confidence levels to determine the identities of the users for the first user device and their proximity to the presentation device 210. The targeted communication service 122 can use the identities of the users of the plurality of user devices to access user demographic information of the users from a database. As an example, a user information system of the targeted communication service 122 can access the user demographic information of the users identified to be the users of the plurality of user devices. In an aspect, the targeted communication service 122 can determine a playlist of campaigns to be presented at the presentation device 210 based on the combined user demographic information. As an example, a campaign management system of the targeted communication service 122 can determine possible campaigns to present at the presentation device 210. The campaigns can be determined by comparing the user demographic information to business rules such as whether or not the users of the plurality of user devices have recently viewed a campaign, campaigns that align with the users' user demographic information, how many campaigns the users have viewed recently, global campaigns for the presentation device 210 and associated premises device identifiers, combinations thereof, and the like. In an aspect, the campaigns can be ordered on the playlist based on the most revenue that the targeted communication service 122 can generate for displaying the campaign. In an aspect, the targeted communication service 122 can then select from the possible campaigns a campaign that meets the business rules by selecting the campaign that is at the top of the playlist.

In step 1808, the targeted communication service 122 can transmit the campaign to the presentation device 210. In an aspect, the campaign can be transmitted to the plurality of user devices. In an aspect, the campaign can be transmitted by multicasting the campaign to the plurality of user devices. The targeted communication service 122 can transmit the campaign to the user devices and/or the presentation device 210 over a network such as the Internet. As an example, the campaign can be transmitted targeted communication service 122 by video multicasting which can be used to send video to multiple users using the same bitstream which conserves network resources by reducing a number of unicast bitstreams to multiple users consuming the same content. The video multicasting can be scalable in that the video multicasting comprises a scalable video coding (SVC) technique. A SVC can encode a video multicast into one base layer and one or more enhancement layers. The base layer can ensure the basic video quality of all users and each additional enhancement layer enhances the quality of the video depending on the capabilities of the end user device. Video multicast consumption can be managed and analyzed by the various dashboards such as the behavioral analytics dashboard. In an aspect, multicasting can permit content to be received and cached until a condition occurs. In an aspect, the content can be associated with a location. The content can be stored for a period of time and removed from storage after the period of time outside the location.

FIG. 19 illustrates a flowchart of a method 1900 of proximity detection and targeted campaigns, according to various aspects. In step 1902, a user device (e.g., the user device 324) can monitor for a plurality of premises device identifiers of a plurality of premises devices (e.g., the premises device 206). The user device 324 can have an application installed comprising at least one premises device identifier registered with an operating system of the user device 324 so that the operating system can monitor for the at least one premises device identifier of a premises device 206. For example, the operating system of the user device 324 can monitor for premises device identifiers, such as UUIDs, of premises devices 206 that are of interest to the application installed on the user device 324. As the user device 324 traverses space by the user of the user device 324 moving around, the user device 324 can detect transmissions from one or more premises devices 206.

In step 1904, the user device 324 can detect a first premises device identifier of the plurality of premises device identifiers. The detection of the first premises device identifier can be caused by a first application on the user device 324. The first premises device identifier can be transmitted by a first premises device at a first location belonging to a first entity.

In step 1906, the user device 324 can optionally store the detection of the transmission of the first premises device identifier. In an aspect, the user device 324 can store the detection of the transmission of the first premises device identifier by transmitting the detection of the transmission of the first premises device identifier to a targeted campaign service (e.g., targeted communication service 122) for storage. In an aspect, the user device 324 can store the detection of the transmission of the first premises device identifier locally at the user device 324.

In step 1908, the user device 324 can detect a transmission of a second premises device identifier of the plurality of premises device identifiers. In an aspect, the detection of the second premises device identifier can be caused by the first application on the user device 324 and/or a second application on the user device 324. The second premises device identifier can be transmitted by a second premises device at a second location belonging to a second entity.

In step 1910, the user device 324 can determine whether an action exists based on detecting the first premises device identifier and the second premises device identifier. In an aspect, the user device 324 can send a request to the targeted campaign service 324 to determine whether an action exists based on a condition existing between detecting the transmission of the first premises device identifier and the second premises device identifier. An action can be providing a targeted campaign to the user device 324. An action can be "waking up" the second application, causing a function of the application to be performed, causing the premises device 206 to establish a communication session between a user device 324 and premises device 206. In an aspect, the action can exist based on a plurality of conditions. For example, a condition can be continued presence. As another example, the condition can be based on a time of the detection of the first premises device identifier and a time of the detection of the second premises device identifier. In an aspect, a condition of the plurality of conditions can be based an occurrence at the first location of the first premises device. For example, a team of an arena has to win the game for the action to exist such as providing a campaign of a coupon at a local restaurant.

In step 1912, the user device can perform the action associated with the condition at the user device when the condition exists. In another example, the user device 324 can receive instructions to perform the action associated with the condition at the user device 324 when the condition exists. In an aspect, the user device 324 can execute the instructions of the action. The user device 324 can determine whether the user of the user device 324 interacted with results of the action. In an aspect, the user device 324 can send an indication to the targeted communication service 122 comprising details of any interaction. The details of the interaction can be used by the targeted communication service 122 to determine a customized action (e.g., campaign) for a user of the user device 324 based on the details of the interaction.

In an aspect, the user device 324 can receive a campaign from the targeted communication service 122. The campaign comprises one or more of content, actions on interactive applications, ticketing for events, point of sale integration and ordering, loyalty/shopping rewards programs, advertisement content and the like. The action can comprise performing the campaign.

FIG. 20 illustrates a flowchart of a method 2000 of proximity detection and targeted campaigns, according to various aspects. In step 2002, a targeted campaign service (e.g., the targeted communication service 122) can receive a first indication of an association between a user device (e.g., the user device 324) and a first premises device (e.g., the premises device 206) at a first time. In an aspect, the first premises device can be at a first location of a first entity. The user device 324 can comprise an installed application comprising at least one premises device identifier registered with an operating system of the user device 324 so that the operating system can monitor for the at least one premises device identifier of a premises device 206. For example, the operating system of the user device 324 can monitor for premises device identifiers, such as UUIDs, of premises devices 206 that are of interest to the application installed on the user device 324. As the user device 324 traverses space by the user of the user device 324 moving around, the user device 324 can detect transmissions from one or more premises devices 206. Upon detection, the user device 324 and/or the first premises device can transmit the first indication to the targeted communication service 122. The first indication can comprise a user device identifier of the user device 324, the premises device identifier of the first premises device, a user identifier of a user of the user device 324, combinations thereof, and the like.

In step 2004, the targeted communication service 122 can receive a second indication of dissociation between the user device 324 and the first premises device at a second time. When the user device 324 does not detect the premises device identifier of the first premises device or vice versa, then the user device 324 and/or the first premises device can send the second indication to the targeted communication service 122 indicating that the first premises device and the user device 324 are no longer associated. The targeted communication service 122 can update a database of current associations between premises device identifiers and user device identifiers. The second indication can comprise the user device identifier of the user device 324, the premises device identifier of the first premises device, the user identifier of the user of the user device 324, combinations thereof, and the like.

In step 2006, the targeted communication service 122 can receive a third indication comprising a location of the user device 324. In an aspect, the location of the user device 324 of the third indication can be a second location of a second entity. In an aspect, the location can be determined based on GPS or other secondary communications channels such as WiFi access point. In an aspect, the third indication can comprise an association between the user device 324 and a second premises device. The second premises device can indicate the location. The user device 324 can monitor for a premises device identifier of the second premises device or vice versa. In an aspect, upon detection of the premises device identifier of the second premises device, the user device 324 and/or the second premises device can transmit the third indication to the targeted communication service 122. The third indication can comprise a user device identifier of the user device 324, the premises device identifier of the first premises device, a user identifier of a user of the user device 324, the location, combinations thereof, and the like.

In step 2008, the targeted communication service 122 can determine that the location has a campaign associated with the location. In an aspect, the targeted communication service 122 can determine the location has a campaign associated with it by comparing coordinates at the location to coordinates associated with campaigns which can be stored and accessed by the targeted campaign service 122. In an aspect, the campaign can be determined based on comparing the second premises device identifier to a database comprising campaigns associated with premises device identifiers. In an aspect, a condition for the campaign to be activated at the second location can be based on whether the user device 324 had a continued presence at the first premises device. The targeted communication service 122 can activate the campaign depending on continued presence of the user device 324 at the first premises device.

In step 2010, the targeted communication service 122 can determine that a time period between the first time and the second time meets a threshold time period for the continued presence. In an aspect, the continued presence can exist after a threshold period of time after the detection between a user device 324 of the plurality of user devices and the at least one premises device without any dissociations of the user device 324 from the at least one premises device. In an aspect, the continued presence can be determined based on the log of associations and dissociations of user devices 324 to premises device identifiers. In an aspect, continued presence can also be determined by garnering additional information from or about the user device 324. For example, the user device 324 can provide information regarding its orientation and altitude. When these measurements change, the targeted communication service 122 can assume that the user device 324 is moving, however slightly, thus indicating that a user is interacting with the user device 324, and that the user device 324 has not been left somewhere. Separately, a WiFi connected device is likely to have changing RSSI levels as the user device 324 moves closer to or further from a wireless access point. The RSSI levels can be transmitted by the WiFi infrastructure to the targeted campaign service 122, giving more information than a binary indication of a user's continued presence.

In step 2012, the targeted communication service 122 can transmit the campaign to the user device 324. In an aspect, the campaign can be transmitted to the user device 324 over a network (e.g., the Internet) through one or more premises devices or through a direct connection over the network between the user device 324 and the targeted campaign service 122.

In an aspect, the targeted communication service 122 can determine customized content of the campaign based on user demographic information of a user of the user device 324. The user demographic information can comprise, for example, age, sex, address, pre-defined interests, gathered interests, education level, occupation, religion, ethnicity, education, and the like. In an aspect, the user can be determined based on an identity confidence level of the user.

FIG. 21 illustrates a flowchart of a method 2100 of proximity detection and targeted campaigns, according to various aspects. In step 2102, a targeted campaign service (e.g., the targeted communication service 122) can receive a first indication of a detection between a user device (e.g., the user device 324) and a first premises device (e.g., the premises device 206). In an aspect, the first premises device can be at a first location of a first entity. The user device 324 can comprise a first installed application comprising at least one premises device identifier registered with an operating system of the user device 324 so that the operating system can monitor for the at least one premises device identifier of a premises device 206. For example, the operating system of the user device 324 can monitor for premises device identifiers, such as UUIDs, of premises devices 206 that are of interest to the first application installed on the user device 324. As the user device 324 traverses space by the user of the user device 324 moving around, the user device 324 can detect transmissions from one or more premises devices 206. Upon detection, the user device 324 and/or the first premises device can transmit the first indication to the targeted communication service 122. The first indication can comprise a user device identifier of the user device 324, the premises device identifier of the first premises device, a user identifier of a user of the user device 324, combinations thereof, and the like.

In step 2104, the targeted communication service 122 can store the first indication of the detection between the user device 324 and the first premises device comprising a user device identifier of the user device 324 and a first premises device identifier of the first premises device. The targeted communication service 122 can comprise a data warehouse such as a database for storing associations of user device identifiers and premises device identifiers.

In step 2106, the targeted communication service 122 can receive a second indication of a detection between the user device 324 and a second premises device. In an aspect, the second premises device can be at a second location of a second entity. In an aspect, the detection of a second premises device identifier of the second device can be caused by a first application on the user device 324 and/or a second application on the user device 324. The second premises device identifier can be transmitted by a second premises device at a second location belonging to a second entity. The second indication can comprise the user device identifier of the user device 324 and/or the second user device identifier of the second premises device. The targeted communication service 122 can store the second indication of the detection between the user device 324 and the second premises device comprising a user device identifier of the user device 324 and the second premises device identifier of the second premises device.

In step 2108, the targeted communication service 122 can determine whether the second premises device is associated with a campaign. In an aspect, the campaign can be determined based on comparing the second premises device identifier to a database comprising campaigns associated with premises device identifiers. In an aspect, a condition for the campaign to be activated at the second location can be whether the user device 324 had a continued presence at the first premises device. The targeted communication service 122 can activate the campaign depending on continued presence of the user device 324 at the first premises device.

In step 2110, the targeted communication service 122 can, in response to determining the second premises device is associated with the campaign, determine whether at least one condition to trigger the campaign is met. A condition of the at least one conditions can be based on the detection comprising the first premises device identifier. In an aspect, the condition of the at least one condition can be continued presence of the user device 324 at the first premises device. In an aspect, the condition of the at least one condition can be proximity of the user device 324 to the first premises device. In an aspect, the at least one condition can be satisfying a threshold based on an identity confidence level of the user of the user device 324.

In step 2112, the targeted communication service 122 can transmit the campaign when the at least one condition is met. In an aspect, the targeted communication service 122 can transmit the campaign to the user device 324. In an aspect, the campaign can be transmitted to the user device 324 over a network (e.g., the Internet) through one or more premises devices or through a direct connection over the network between the user device 324 and the targeted communication service 122. In an aspect, the campaign can be transmitted to a media device (e.g., the media device 320) and/or a presentation device (e.g., the presentation device 210) that is associated with the second premises device identifier.

In an aspect, the targeted communication service 122 can determine customized content of the campaign based on user demographic information of a user of the user device 324. The user demographic information can comprise, for example, age, sex, address, pre-defined interests, gathered interests, education level, occupation, religion, ethnicity, education, and the like. The user can be determined based on an identity confidence level of the user.

FIG. 22 illustrates a flowchart of a method 2200 of proximity detection and targeted campaigns, according to various aspects. In step 2202, a user device (e.g., the user device 324) can receive an event schedule of a first event and a second event. In an aspect, the first event and second event can be at the same location. In an aspect, the first event and the second event can be at different times. In an aspect, the first event and the second event can be at the same time at the same location but can have a different group of premises devices (e.g., the premises device 206) and/or a different set of premises device identifiers associated with the first event and the second event. In an aspect, the targeted campaign service (e.g., the targeted communication service 122) can comprise an event scheduler. An event manager can schedule events for one or more locations with the event scheduler. Each event can comprise one or more campaigns which need to be active when the event is occurring. The targeted communication service 122 can manage premises devices 206 and premises device identifiers based on which campaigns are active. In an aspect, the premises device 206 can be at a location that has more than one event. For example, some arenas can be used for professional basketball games, professional hockey games, and concerts. In some aspects, the events can be at different times during the same day. A first event can occur for a first time duration and a second event can occur for a second time duration at the location. In an aspect, the event scheduler can cause the targeted communication service 122 to associate the premises device identifiers of the premises devices 206 with the particular event that is occurring at the location at a particular time. In an aspect, the targeted communication service 122 can activate or deactivate campaigns based on the events defined by the event scheduler. For example, an hour before a basketball game and an hour after the basketball game the event scheduler can have scheduled one or more campaigns. The event scheduler, based on the scheduled campaigns can cause the targeted communication service 122 to associate premises device identifiers of the premises device 206 with a mobile application associated with the basketball game.

In step 2204, the user device 324 can activate a first application associated with the first event during the first event. In an aspect, the user device 324 can deactivate a second application that is not associated with the first event and that monitors for at least one of the premises device identifiers associated with the first application. The user device 324 can activate the first application by referencing the event schedule determining which applications are associated with an event based on the current time and date.

In step 2206, the user device 324 can monitor for a premises device identifier transmitted by a premises device 206 during the first event in association with the first application. In an aspect, the user device 324 can monitor for premises device identifiers associated with the first application for the first event. The user device 324 can comprise the first application installed comprising at least one premises device identifier registered with an operating system of the user device 324 so that the operating system can monitor for the at least one premises device identifier of a premises device 206. For example, the operating system of the user device 324 can monitor for premises device identifiers, such as UUIDs, of premises devices 206 that are of interest to the first application installed on the user device 324. As the user device 324 traverses space by the user of the user device 324 moving around, the user device 324 can detect transmissions from one or more premises devices 206. Upon detection, the user device 324 and/or the premises device 206 can transmit an indication to the targeted communication service 122. The indication can comprise a user device identifier of the user device 324, the premises device identifier of the premises device 206, a user identifier of a user of the user device 324, combinations thereof, and the like.

In an aspect, a second application can be running in the background on the user device 324 which may share one or more of the same premises device identifiers for which the first application is monitoring. The second application can remain active. However, any detection by the second application of the premises device 206 can result in no campaign taking place at the user device 324 with the second application because there are no campaigns associated with the second application at the time of the first event according to the event schedule.

In step 2208, the user device 324 can discontinue monitoring for the premises device identifier by the first application when the first event has ended. The user device 324 can activate the first application by referencing the event schedule and determining which applications are associated with an event based on the current time and date. In an aspect, the user device 324 can detect the premises device identifier when the first application is activated. The user device 324 can send a first indication of the detection between the user device 324 and the premises device 206 to a targeted communication service 122. In an aspect, the user device 324 can receive a first campaign associated with the first event based on a user device identifier of the user device 324 and a premises device identifier of the premises device 206.

In an aspect, the user device 324 can activate the second application associated with the second event during the second event based on the event schedule. The user device 324 can monitor for the premises device identifier transmitted by the premises device during the second event in association with the second application. The user device 324 can discontinue monitoring for the premises device identifier by the second application when the second event has ended.

In an aspect, the user device 324 can detect the premises device identifier when the second application is activated. The user device 324 can send a second indication of the detection between the user device 324 and the premises device 206 to the targeted communication service 122. The user device 324 can receive a second campaign associated with the second event based on a user device identifier of the user device 324 and the premises device identifier of the premises device 206.

In an aspect, the user device 324 can activate the first application associated with the second event during the second event based on the event schedule. The user device 324 can monitor for a second premises device identifier transmitted by the premises device 206 during the second event in association with the first application. The user device 324 can discontinue monitoring for the second premises device identifier by the first application when the second event has ended.

FIG. 23 illustrates a flowchart of a method 2300 of proximity detection and targeted campaigns, according to various aspects. In step 2302, a targeted campaign service (e.g., the targeted communication service 122) can determine a first event occurring at a location. In an aspect, the targeted communication service 122 can determine when the first event is occurring by accessing an event schedule to determine when one or more events are occurring at the location. The location can comprise a plurality of premises devices (e.g., the premises device 206) each transmitting a respective premises device identifier. In an aspect, the first event can be associated with a first application. The first event can be associated with a first set of campaigns.

In step 2304, the targeted communication service 122 can associate the respective premises device identifiers with the first event. In an aspect, the targeted communication service 122 can associate the respective premises device identifiers with the first event based on the event schedule. In an aspect, the targeted communication service 122 can receive an indication of a detection between a user device (e.g., the user device 324) and a premises device 206 of the plurality of premises devices 206. The user device 324 can comprise the first installed application comprising at least one premises device identifier registered with an operating system of the user device 324 so that the operating system can monitor for the at least one premises device identifier of a premises device 206. For example, the operating system of the user device 324 can monitor for premises device identifiers, such as UUIDs, of premises devices 206 that are of interest to the first application installed on the user device 324. As the user device 324 traverses space by the user of the user device 324 moving around, the user device 324 can detect transmissions from one or more premises devices 206. Upon detection, the user device 324 and/or the premises device can transmit the indication to the targeted communication service 122. The indication can comprise a user device identifier of the user device 324, the premises device identifier of the premises device 206, a user identifier of a user of the user device 324, combinations thereof, and the like.

In an aspect, the targeted communication service 122 can determine a campaign from the first set of campaigns based on at least one of the user device identifier and the premises device identifier. In an aspect, the targeted communication service 122 can determine some other action to perform. In an aspect, the targeted communication service 122 can transmit the campaign to the user device 324. In an aspect, the targeted communication service 122 can perform the action or campaign at the targeted communication service 122. In an aspect, the targeted communication service 122 can transmit or cause to perform the action/campaign at another user device 324, a presentation device (e.g., the presentation device 210), and/or a media device (e.g., the media device 320).

In step 2306, the targeted communication service 122 can determine a second event occurring at the location. In an aspect, the second event can be associated with a second application. In an aspect, the second event can be associated with the first application. The second event can have a second set of campaigns. In an aspect, the targeted communication service 122 can determine the first event and second event based on an event schedule. In an aspect, the targeted communication service 122 can activate and deactivate campaigns based on which event is currently active.

In step 2308, the targeted communication service 122 can dissociate respective premises device identifiers from the first event. In an aspect, the targeted communication service 122 can comprise a database that stores associations of events and premises device identifiers associated with the event for the current time. Furthermore, each event can be associated with a set of campaigns. Therefore, the premises device identifiers can be dissociated from the event to prevent campaigns from being provided that are not supposed to be provided at the current time according to the event schedule.

In step 2310, the targeted communication service 122 can associate the respective premises device identifiers to the second event. After the premises device identifiers are dissociated from the first event, the premises device identifiers can be associated with the second event when the event schedule indicates the second event is occurring. In an aspect, the second event can be associated with a second set of campaigns which can be active when the premises device identifiers are associated with the second event. In an aspect, the targeted communication service 122 can provide a campaign from the second set of campaigns to the user device 324, a presentation device (e.g., the presentation device 210), and/or a media device (e.g., the media device 320).

Figure 24:
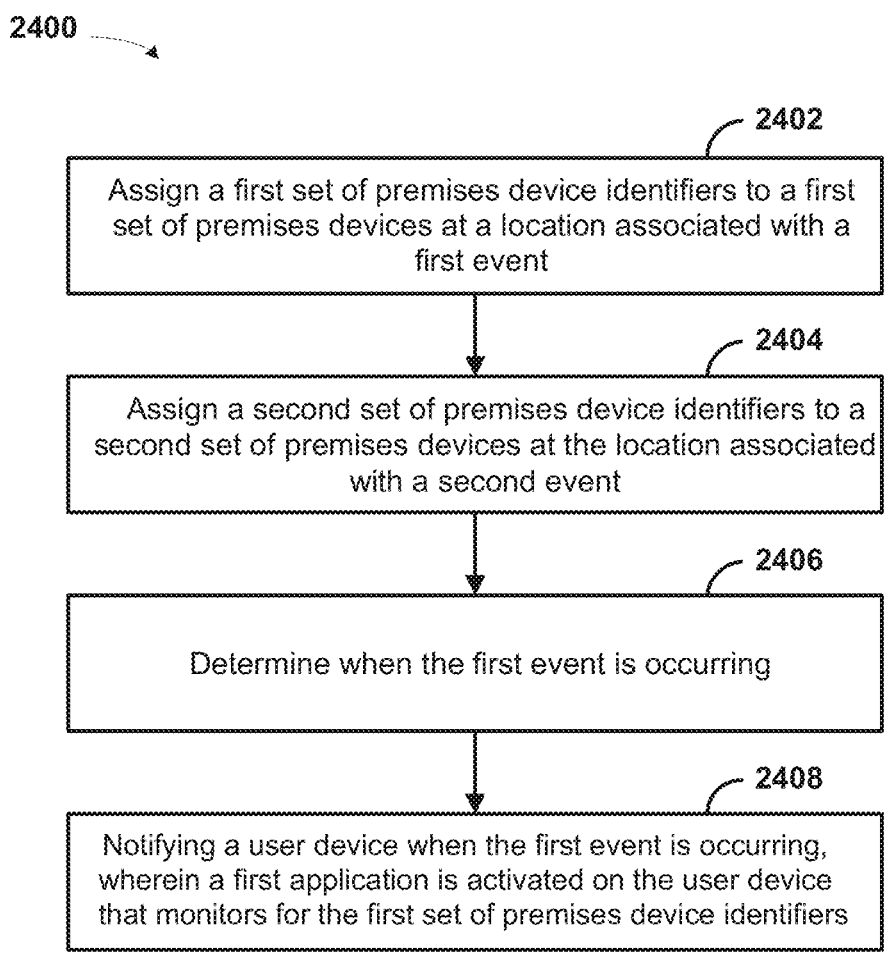
FIG. 24 is a flowchart illustrating another example method.

FIG. 24 illustrates a flowchart of a method 2400 of proximity detection and targeted campaigns, according to various aspects. In step 2402, a targeted campaign service (e.g., the targeted communication service 122) can assign a first set of premises device identifiers to a first set of premises devices (e.g., the premises device 206) at a location associated with a first event. The first event can be associated a first set of campaigns. In an aspect, the targeted communication service 122 can determine when the first event is occurring based on an event schedule. The event schedule can comprise a schedule of the first event and a second event. In an aspect, the first event and second event can be at the same location. In an aspect, the first event and second event can be at different times. In an aspect, the first event and the second event can be at the same time at the same location but can have a different group of premises devices 206 and/or a different set of premises device identifiers associated with the first event and the second event. In an aspect, the targeted communication service 122 can comprise an event scheduler. An event manager can schedule events for one or more locations with the event scheduler to create the event schedule. Each event can be associated with one or more campaigns which need to be active when the event is occurring. The targeted communication service 122 can manage premises devices 206 and premises device identifiers based on which campaigns are active. In an aspect, a premises device 206 can be at a location that has more than one event. A first event can occur for a first time duration and a second event can occur for a second time duration at the location.

In step 2404, the targeted communication service 122 can assign a second set of premises device identifiers to a second set of premises devices 206 at the location associated with a second event. The second event can be associated with a second set of campaigns. In an aspect, the targeted communication service 122 can determine when the first event is occurring based on an event schedule. In an aspect, the premises devices 206 at the location can comprise dynamic premises device identifiers. The targeted communication service 122 can assign new premises device identifiers to the premises devices 206 depending on which event is taking place according to the event schedule. The targeted communication service 122 can transmit the second set of premises device identifiers to the first set of premises devices 206 and/or the second set of premises devices 206.

In step 2406, the targeted communication service 122 can determine when the first event is occurring. In an aspect, the targeted communication service 122 can determine when the first event is occurring by accessing an event schedule to determine when one or more events are occurring at the location. The targeted communication service 122 can receive indications from one or more user devices 324 that are at the first event. The indications can comprise the premises device identifier. The targeted communication service 122 can determine and transmit campaigns that are associated with the first event based on the premises device identifier. The campaigns can be transmitted to the user device 324, a presentation device (e.g., the presentation device 210), and/or a media device (e.g., the media device 320).

In step 2408, the targeted communication service 122 can notify a user device 324 when the first event is occurring. The first application can be activated on the user device 324 that monitors for the first set of premises device identifiers. Alternatively, the first application can be active or running on a different, remote device, with data or results of the application being presented to the user device 324. In an aspect, the targeted communication service 122 can notify the user device 324 when the first event has ended. The first application can be deactivated on the user device 324. In an aspect, the targeted communication service 122 can notify the user device 324 when the second event is occurring. The first application can be activated on the user device 324 that monitors for the second set of premises device identifiers.

In an aspect, the targeted communication service 122 can notify the user device 324 when the first event has ended. The first application is deactivated on the user device 324. The targeted communication service 122 can notify the user device 324 when the second event is occurring. A second application can be activated on the user device 324 that monitors for the second set of premises device identifiers.

In an aspect, the targeted communication service 122 can notify the user device 324 when the first event has ended.

The first application can be deactivated on the user device 324. The targeted communication service 122 can notify the user device 324 when the second event is occurring. A second application can be activated on the user device 324 that monitors for the first set of premises device identifiers.

Figure 25:
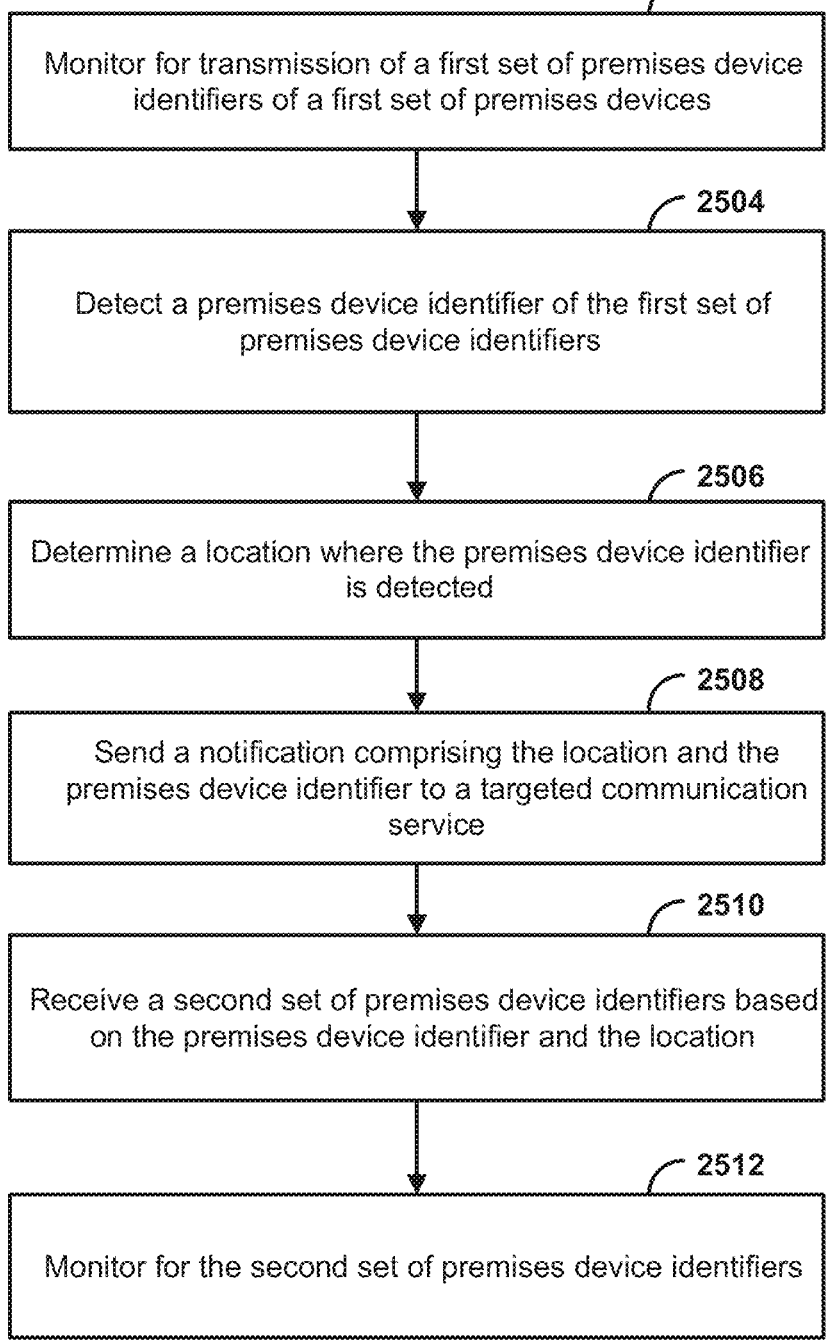
FIG. 25 is a flowchart illustrating another example method.

FIG. 25 illustrates a flowchart of a method 2500 of proximity detection and targeted campaigns, according to various aspects. In step 2502, a user device (e.g., the user device 324) can monitor for transmission of a first set of premises device identifiers of a first set of premises devices (e.g., the premises device 206). In an aspect, the operating system of the user device 324 can impose a limitation that an application can only register for a defined number of premises device identifiers (e.g., BLE beacon identifiers) at one time. Having the limitation helps reduce the amount of energy the user device 324 uses to monitor for premises device identifiers in the background. However, the limitation on the number of premises device identifiers for which the operating system monitors can present a problem as it is possible that an application, especially one supporting multiple locations, is interested in receiving a location notification in excess of the limitation of the number premises device identifiers set by the operating system and/or there more premises devices 206 at a location than the limitation. In an aspect, a location can be limited to a number of premises devices 206 that represents the limitation imposed by the operating system on the maximum number of beacon identifiers. In an aspect, a plurality of locations can have an identical premises device identifier associated with each location that indicates a category that the location falls under. For example, a premises device identifier of the first set may define a category of sports venues, residential location, restaurants, department store, and the like. The premises device identifier for each category can be associated with location information for each location utilizing the application.

In step 2504, the user device 324 can detect a premises device identifier of the first set of premises device identifiers. The user device 324 can comprise the first installed application comprising the first set of premises device identifiers registered with an operating system of the user device 324 so that the operating system can monitor for the first set of premises device identifiers of a plurality of premises devices 206. For example, the operating system of the user device 324 can monitor for premises device identifiers, such as UUIDs, of premises devices 206 that are of interest to the first application installed on the user device 324. As the user device 324 traverses space by the user of the user device 324 moving around, the user device 324 can detect transmissions from one or more premises devices 206. Upon detection, the user device 324 and/or the premises device 206 can transmit a n indication to a targeted campaign service (e.g., the targeted communication service 122). The indication can comprise a user device identifier of the user device 324, the premises device identifier of the premises device 206, a user identifier of a user of the user device 324, combinations thereof, and the like.

In step 2506, the user device 324 can determine a location where the premises device identifier is detected. In an aspect, the location can be determined based on coordinates determined by a global positioning system. In an aspect, the location can be determined based on a detection of a wireless access point. In an aspect, the location can be determined based on detecting a combination of premises device identifiers of the first set of premises device identifiers.

In step 2508, the user device 324 can send a notification comprising the location and the premises device identifier to the targeted communication, campaign or messaging service 122. The notification can be transmitted over a network to the targeted communication service 122. The notification can be transmitted via a premises device 206 (e.g., a WiFi access point) over the network to the targeted communication service 122.

In step 2510, the user device 324 can receive a second set of premises device identifiers based on the premises device identifier and the location. In an aspect, the targeted communication service 122 can determine a second set of premises device identifiers based on the premises device identifier of the first set of premises device identifiers and the location. The targeted communication service 122 can comprise a database that comprises entries of premises device identifiers that are associated with a location and a premises device identifier from the first set of premises device identifiers. When the targeted communication service 122 receives a notification comprising a premises device identifier of the first set of premises devices identifiers and a location. The targeted communication service 122 can compare the premises device identifier and the location to entries in the database to determine any other premises device identifiers associated with that location and premises device identifier of the first set of premises device identifiers. The targeted communication service 122 can then transmit the second set of premises device identifiers over the network to the user device 324. In an aspect, the user device 324 can already have the second set of premises device identifiers and the targeted communication service 122 sends instructions in the notification to have the operating system monitor for the second set of premises device identifiers. In an aspect, the second set of premises device identifiers can be received from a plurality of sets of premises device identifiers based on an event schedule.

In step 2512, the user device 324 can monitor for transmission of the second set of premises device identifiers. In an aspect, the user device 324 can detect a premises device identifier of the second set of premises device identifiers. In an aspect, the user device 324 can send an indication of the detection to the targeted communication service 122. The indication can comprise a user device identifier and the premises device identifier of the second set of premises device identifiers. In an aspect, the user device 324 can receive an instruction to perform an action based on the user device identifier and the premises device identifier of the second set of premises device identifiers. In an aspect, the user device 324 can receive the instruction from the targeted communication service 122. In an aspect, the targeted communication service 122 can send a campaign, in response to detecting the premises device identifier of the second set of premises device identifiers, to the user device 324. In an aspect, the user device 324 can receive and provide to the user of the user device 324 the campaign.

Figure 26:
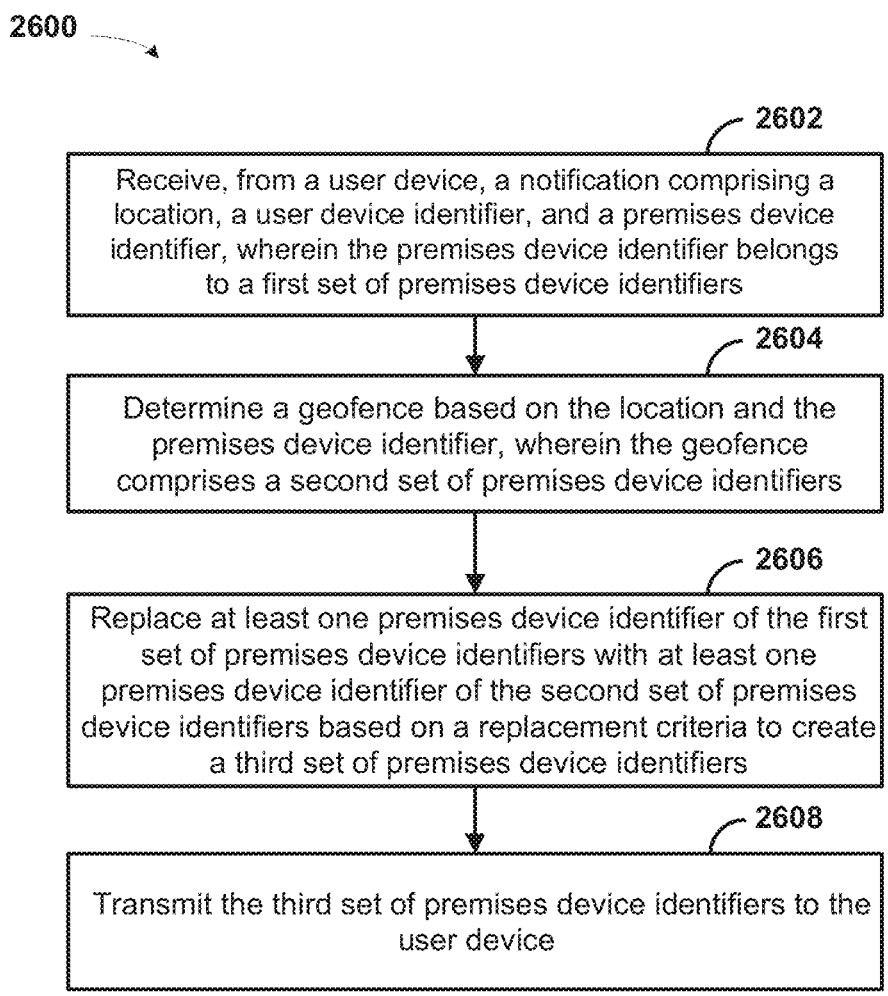
FIG. 26 is a flowchart illustrating another example method.

FIG. 26 illustrates a flowchart of a method 2600 of proximity detection and targeted campaigns, according to various aspects. In step 2602, a targeted campaign service (e.g., the targeted communication service 122) can receive, from a user device (e.g., the user device 324), a notification comprising a location, a user device identifier, and a premises device identifier. The premises device identifier can belong to a first set of premises device identifiers. In an aspect, the location can be determined based on coordinates determined by a global positioning system. In an aspect, the location can be determined based on a detection of a wireless access point. In an aspect, the location can be determined based on detecting a combination of premises device identifiers of the first set of premises device identifiers.

In step 2604, the targeted communication service 122 can determine a geofence based on the location and the premises device identifier. The geofence can be defined by one or more sets of premises device identifiers and not necessarily a geographical location. The geofence can comprise a second set of premises device identifiers. In an aspect, the second set of premises device identifiers can be selected from a plurality of sets of premises device identifiers based on an event schedule. In an aspect, the targeted communication service 122 can determine a second set of premises device identifiers based on the premises device identifier of the first set of premises device identifiers and the location. The targeted communication service 122 can comprise a database that comprises entries of premises device identifiers that are associated with a location and a premises device identifier from the first set of premises device identifiers. When the targeted communication service 122 receives a notification comprising a premises device identifier of the first set of premises devices identifiers and a location. The targeted communication service 122 can compare the premises device identifier and the location to entries in the database to determine any other premises device identifiers associated with that location and premises device identifier of the first set of premises device identifiers.

In step 2606, the targeted communication service 122 can replace at least one premises device identifier of the first set of premises device identifiers with at least one premises device identifier of the second set of premises device identifiers based on a replacement criterion to create a third set of premises device identifiers. In an aspect, the replacement criterion can comprise determining whether one or more premises device identifier of the first set of premises device identifiers represents one or more adjacent geofences that are within a proximity threshold of the determined geofence. The one or more premises device identifiers of adjacent geofences can remain in the third set of premises device identifier for which the user device 324 monitors so that if the user device 324 moves to an adjacent geofence the user device 324 can detect the premises device identifier of that adjacent geofence and receive the corresponding premises device identifiers for that adjacent geofence.

In step 2608, the targeted communication service 122 can transmit the third set of premises device identifiers to the user device 324. The targeted communication service 122 can then transmit the third set of premises device identifiers over the network to the user device 324. The user device 324 can receive the third set of premise device identifiers. The user device 324 can then register the third set of premises device identifiers with the operating system of the user device 324. The operating system of the user device 324 can then monitor for the third set of premises device identifiers. In an aspect, the user device 324 can detect a premises device identifier of the third set of premises device identifiers and send an indication comprising the at least the user device identifier premises device identifier detected.

In an aspect, the targeted communication service 122 can receive an indication comprising the user device identifier of the user device 324 and a premises device identifier of the third set of premises device identifiers. The targeted communication service 122 can determine the premises device identifier of the third set of premises device identifiers matches a premises device identifier of the second set of premises device identifiers. In an aspect, the targeted communication service 122 can determine a campaign to transmit to the user device 324 based on the user device identifier and the premises device identifier of the third set of premises device identifiers. The targeted communication service 122 can transmit the campaign to the user device 324.

In an aspect, the targeted communication service 122 can receive an indication comprising the user device identifier of the user device 324 and a premises device identifier of the third set of premises device identifiers. In an aspect, the targeted communication service 122 can determine the premises device identifier of the third set of premises device identifiers matches a premises device identifier of the first set of premises device identifiers. In an aspect, the targeted communication service 122 can determine a fourth set of premises device identifiers associated with the premises device identifier of the first set of premises device identifiers. In an aspect, the targeted communication service 122 can replace at least one premises device identifier of the third set of premises device identifiers with at least one premises device identifier of the fourth set of premises device identifiers based on the replacement criterion to create a fifth set of premises device identifiers. In an aspect, the targeted communication service 122 can transmit the fifth set of premises device identifiers to the user device 324.

Figure 27:
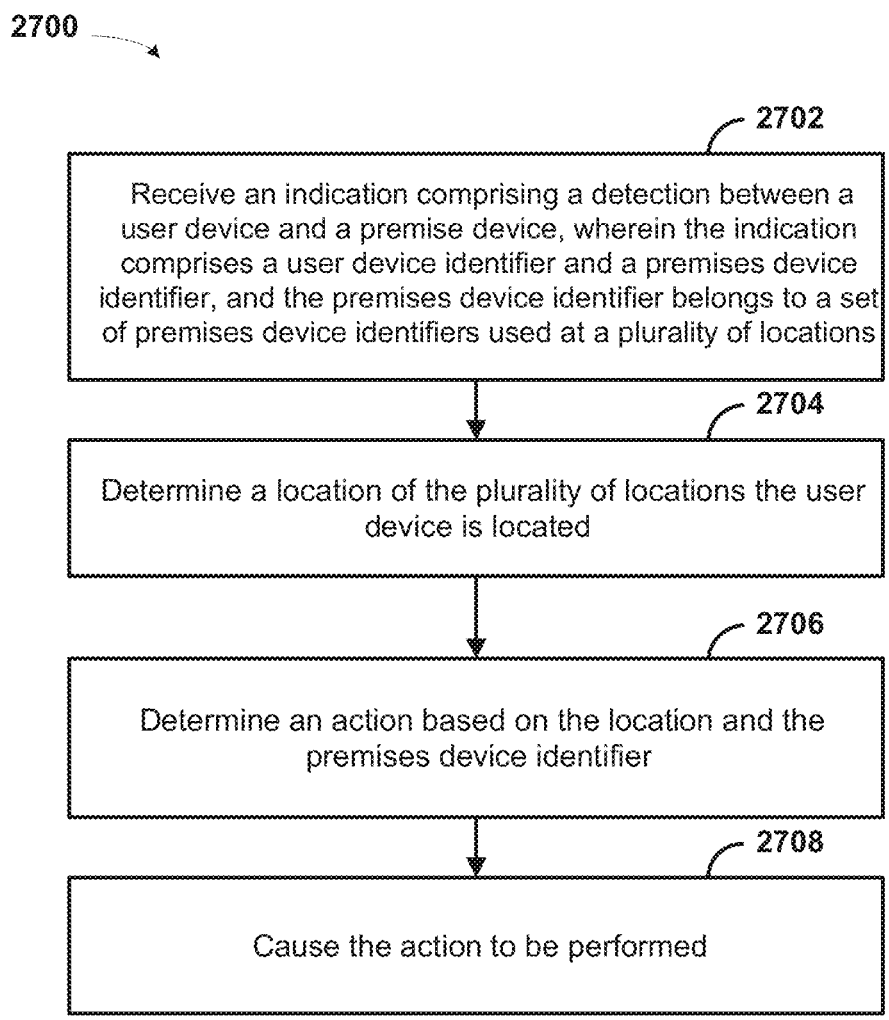
FIG. 27 is a flowchart illustrating another example method.

FIG. 27 illustrates a flowchart of a method 2700 of proximity detection and targeted campaigns, according to various aspects. In step 2702, a targeted campaign service (e.g., the targeted communication service 122) can receive an indication comprising a detection between a user device (e.g., the user device 324) and a premises device (e.g., the premises device 206). The indication can comprise a user device identifier and a premises device identifier. The premises device identifier can belong to a set of premises device identifiers used at a plurality of locations. The user device 324 can comprise a first installed application comprising the set of premises device identifiers registered with an operating system of the user device 324 so that the operating system can monitor for the set of premises device identifiers of a plurality of premises devices 206. For example, the operating system of the user device 324 can monitor for premises device identifiers, such as UUIDs, of premises devices 206 that are of interest to the first application installed on the user device 324. As the user device 324 traverses space by the user of the user device 324 moving around, the user device 324 can detect transmissions from one or more premises devices 206. Upon detection, the user device 324 and/or a premises device 206 can transmit the indication to the targeted communication service 122. The indication can comprise a user device identifier of the user device 324, the premises device identifier of the premises device 206, a user identifier of a user of the user device 324, combinations thereof, and the like.

In step 2704, the targeted communication service 122 can determine a location of the plurality of locations at where the user device is located. In an aspect, the location can be determined based on coordinates determined by a global positioning system. In an aspect, the location can be determined based on a detection of a wireless access point. In an aspect, the location can be determined based on detecting a combination of premises device identifiers of the first set of premises device identifiers.

In step 2706, the targeted communication service 122 can determine an action based on the location and the premises device identifier. In an aspect, the action can comprise accessing an event schedule to determine one or more campaigns to transmit to the user device. In an aspect, the action can be based on the user demographic information of the user of the user device 324. The user demographic information can comprise, for example, age, sex, address, pre-defined interests, gathered interests, education level, occupation, religion, ethnicity, education, and the like. For example, the action can comprise a set of business rules. The targeted communication service 122 can compare one or more user demographics to the business rules to determine whether or not to have the action performed at user device 324.

In step 2708, the targeted communication service 122 can cause the action to be performed. In an aspect, the action can be performed at least one of the user device 324, the targeted communication service 122, another user device, a presentation device (e.g., the presentation device 210), a premises device 206, a media device (e.g., the media device 320) combinations thereof, and the like. In an aspect, the action to be performed can comprise an insertion of a campaign with content provided to the media device 320 in response to a content request. In an aspect, the action to be performed can comprise sending a campaign to the user device 324.

Figure 28:
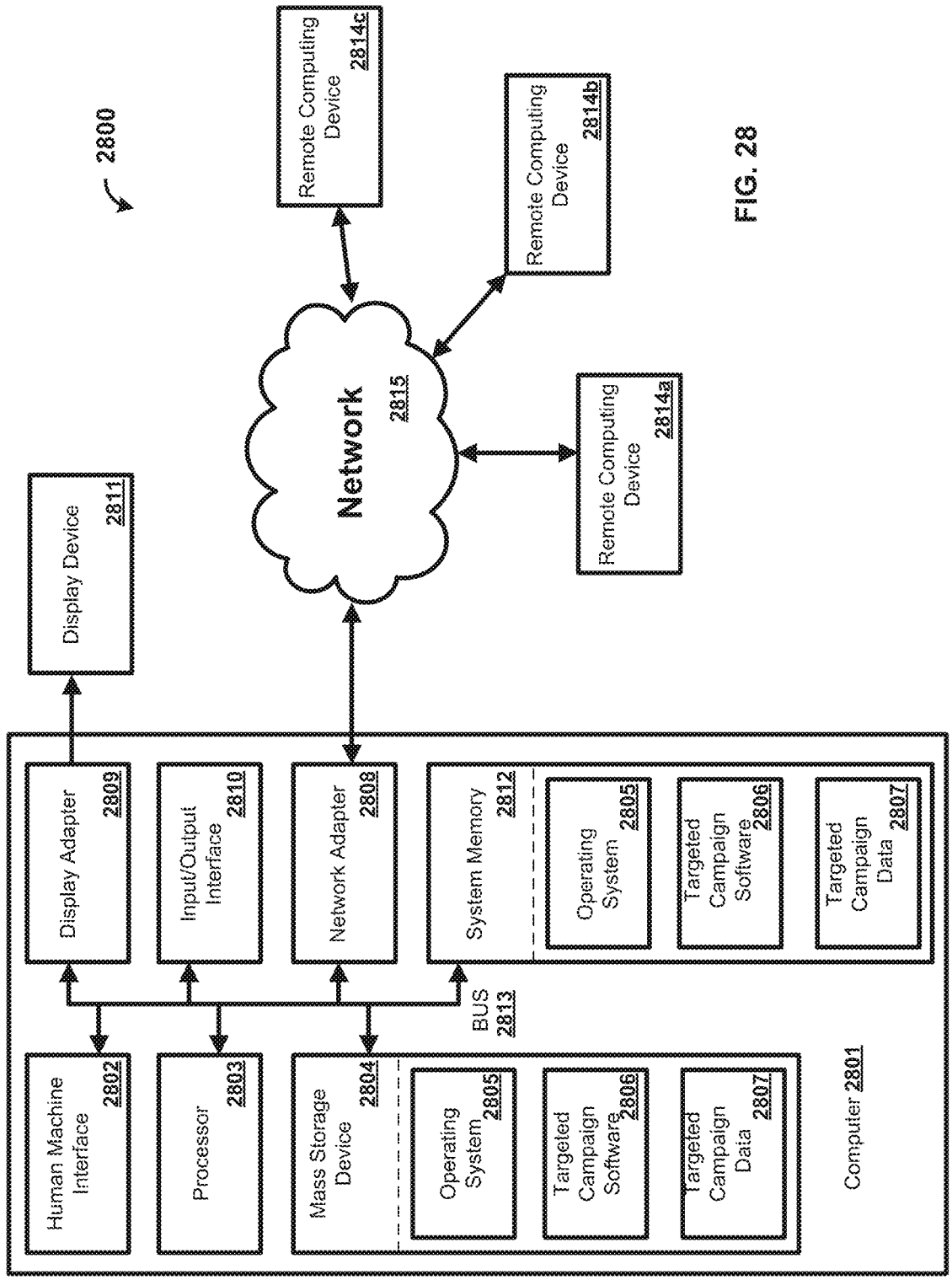
FIG. 28 is a block diagram of an example computer system.

In an exemplary aspect, the methods and systems can be implemented on a computer 2801 as illustrated in FIG. 28 and described below. By way of example, a user device 102, a media device 320 and/or a computing device 104 of FIG. 1 can be a computer as illustrated in FIG. 28. Similarly, the methods and systems disclosed can utilize one or more computers to perform one or more functions in one or more locations. FIG. 28 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2801. The components of the computer 2801 can comprise, but are not limited to, one or more processors or processing units 2803, a system memory 2812, and a system bus 2813 that couples various system components including the processing unit 2803 to the system memory 2812. In the case of multiple processing units 2803, the system can utilize parallel computing.

The system bus 2813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like. The bus 2813, and all buses specified in this description can also be implemented over a wired or wireless network connection and each of the subsystems, including the processing unit 2803, a mass storage device 2804, an operating system 2805, targeted campaign software 2806, targeted campaign data 2807, a network adapter 2808, system memory 2812, an Input/Output Interface 2810, a display adapter 2809, a display device 2811, and a human machine interface 2802, can be contained within one or more remote computing devices 2814a,b,c at physically separate locations, connected through buses of this form, in effect implementing a fully distributed system.

The computer 2801 typically comprises a variety of computer readable media. Exemplary readable media can be any available media that is accessible by the computer 2801 and comprises, for example and not meant to be limiting, both volatile and non-volatile media, removable and non-removable media. The system memory 2812 comprises computer readable media in the form of volatile memory, such as random access memory (RAM), and/or non-volatile memory, such as read only memory (ROM). The system memory 2812 typically contains data such as targeted campaign data 2807 and/or program modules such as operating system 2805 and targeted campaign software 2806 that are immediately accessible to and/or are presently operated on by the processing unit 2803.

In another aspect, the computer 2801 can also comprise other removable/non-removable, volatile/non-volatile computer storage media. By way of example, FIG. 28 illustrates a mass storage device 2804 which can provide non-volatile storage of computer code, computer readable instructions, data structures, program modules, and other data for the computer 2801. For example and not meant to be limiting, a mass storage device 2804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2804, including by way of example, an operating system 2805 and targeted campaign software 2806. Each of the operating system 2805 and targeted campaign software 2806 (or some combination thereof) can comprise elements of the programming and the targeted campaign software 2806. Targeted campaign data 2807 can also be stored on the mass storage device 2804. Targeted campaign data 2807 can be stored in any of one or more databases known in the art. Examples of such databases comprise, DB2®, Microsoft® Access, Microsoft®

SQL Server, Oracle®, mySQL, PostgreSQL, Mongo DB, Riak, HBase, Cassandra, and the like. The databases can be centralized or distributed across multiple systems.

In another aspect, the user can enter commands and information into the computer 2801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2803 via a human machine interface 2802 that is coupled to the system bus 2813, but can be connected by other interface and bus structures, such as a parallel port, game port, an IEEE 1394 Port (also known as a Firewire port), a serial port, or a universal serial bus (USB).

In yet another aspect, a display device 2811 can also be connected to the system bus 2813 via an interface, such as a display adapter 2809. It is contemplated that the computer 2801 can have more than one display adapter 2809 and the computer 2801 can have more than one display device 2811. For example, a display device can be a monitor, an LCD (Liquid Crystal Display), or a projector. In addition to the display device 2811, other output peripheral devices can comprise components such as speakers (not shown) and a printer (not shown) which can be connected to the computer 2801 via Input/Output Interface 2810. Any step and/or result of the methods can be output in any form to an output device. Such output can be any form of visual representation, including, but not limited to, textual, graphical, animation, audio, tactile, and the like. The display 2811 and computer 2801 can be part of one device, or separate devices.

The computer 2801 can operate in a networked environment using logical connections to one or more remote computing devices 2814a,b,c. By way of example, a remote computing device can be a personal computer, portable computer, smartphone, a server, a router, a network computer, a peer device or other common network node, and so on. Logical connections between the computer 2801 and a remote computing device 2814a,b,c can be made via a network 2815, such as a local area network (LAN) and/or a general wide area network (WAN). Such network connections can be through a network adapter 2808. A network adapter 2808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2805 are illustrated herein as discrete blocks, although it is recognized that such programs and components reside at various times in different storage components of the computer 2801, and are executed by the data processor(s) of the computer. An implementation of targeted campaign software 2806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining a first set of premises device identifiers of a first set of premises devices;
   determining a first premises device identifier of the first set of premises device identifiers;
   determining a location associated with discovery of the first premises device identifier;
   sending, to a computing device, a notification that indicates the location and the first premises device identifier;
   receiving, based on the location and the first premises device identifier, a second set of premises device identifiers; and
   monitoring for the second set of premises device identifiers.

2. The method of claim 1, wherein the location is determined based on at least one of:
   Global Positioning System (GPS) coordinates;
   detecting a combination of premises device identifiers of the first set of premises device identifiers; or
   discovery of a wireless access point.

3. The method of claim 1, wherein the first set of premises devices are configured to send at least one premises device identifier of the first set of premises device identifiers, and wherein the first set of premises device identifiers are determined based on a plurality of sent premises device identifiers.

4. The method of claim 1, wherein the computing device is associated with a targeted campaign service.

5. The method of claim 1, wherein the second set of premises device identifiers is received from a plurality of premises devices based on an event schedule.

6. The method of claim 1, further comprising:
discovering a second premises device identifier of the second set of premises device identifiers;
sending an indication of the discovery of the second premises device identifier, wherein the indication comprises a user device identifier and the second premises device identifier; and
receiving, based on the user device identifier and the second premises device identifier, an instruction to perform an action.

7. A method, comprising:
receiving, from a user device, a notification comprising a location, a user device identifier, and a first premises device identifier, wherein the first premises device identifier is associated with a first set of premises device identifiers;
determining, based on the location and the first premises device identifier, a geofence, wherein the geofence is associated with a second set of premises device identifiers;
determining, based on replacement criteria, a third set of premises device identifiers; and
sending, to the user device, the third set of premises device identifiers.

8. The method of claim 7, wherein the replacement criteria indicates whether a premises device identifier of the first set of premises device identifiers is associated with an adjacent geofence that is within a proximity threshold of the determined geofence.

9. The method of claim 7, further comprising:
receiving an indication of the user device identifier associated with the user device and receiving a second premises device identifier associated with a premises device identifier of the third set of premises device identifiers;
determining that the second premises device identifier is associated with the second set of premises device identifiers;
determining, based on the user device identifier and based on the second premises device identifier being associated with the second set of premises device identifiers, a campaign; and
sending, to the user device, the campaign.

10. The method of claim 7, wherein the second set of premises device identifiers is selected from a plurality of premises device identifiers based on an event schedule, and wherein the third set of premises device identifiers is determined by replacing at least one premises device identifier of the first set of premises device identifiers with at least one premises device identifier of the second set of premises device identifiers.

11. The method of claim 7, further comprising,
receiving a premises device identifier of the third set of premises device identifiers;
determining, based on the premises device identifier of the third set of premises device identifiers being associated with the first set of premises device identifiers, a fourth set of premises device identifiers associated with the premises device identifier associated with the first set of premises device identifiers;
determining, based on the replacement criteria, a fifth set of premises device identifiers, wherein the fifth set of premises device identifiers is determined by replacing at least one premises device identifier of the third set of premises device identifiers with at least one premises device identifier of the fourth set of premises device identifiers; and
sending, to the user device, the fifth set of premises device identifiers.

12. The method of claim 7, wherein the location is determined based on Global Positioning System (GPS) coordinates.

13. The method of claim 7, wherein the location is determined based on detecting a combination of premises device identifiers of the first set of premises device identifiers.

14. The method of claim 7, wherein the location is determined based on a discovery of a wireless access point.

15. A method, comprising:
receiving a notification that indicates an association between a user device and a premises device, wherein the notification comprises a user device identifier and a premises device identifier that is associated with a set of premises device identifiers used at a plurality of locations;
determining a location of the plurality of locations where the user device is located;
determining, based on the location and the premises device identifier, an action; and
causing performance of the action.

16. The method of claim 15, wherein performance of the action occurs at the user device.

17. The method of claim 15, wherein the location is determined based on Global Positioning System (GPS) coordinates.

18. The method of claim 15, wherein the location is determined based on a discovery of a combination of premises device identifiers of the set of premises device identifiers.

19. The method of claim 15, wherein the location is determined based on a discovery of a wireless access point.

20. The method of claim 15, wherein the action is based on an event schedule.

* * * * *